US012715990B2

(12) United States Patent
Yamada et al.

(10) Patent No.: US 12,715,990 B2
(45) Date of Patent: Aug. 25, 2026

(54) COMPOSITION, TRANSFER FILM, MANUFACTURING METHOD FOR LAMINATE, MANUFACTURING METHOD FOR CIRCUIT WIRE, AND MANUFACTURING METHOD FOR ELECTRONIC DEVICE

(71) Applicant: FUJIFILM Corporation, Tokyo (JP)

(72) Inventors: Satoru Yamada, Fujinomiya (JP); Kazumasa Morozumi, Fujinomiya (JP); Kentaro Toyooka, Fujinomiya (JP)

(73) Assignee: FUJIFILM Corporation, Tokyo (JP)

( * ) Notice: Subject to any disclaimer, the term of this patent is extended or adjusted under 35 U.S.C. 154(b) by 702 days.

(21) Appl. No.: 18/156,557

(22) Filed: Jan. 19, 2023

(65) Prior Publication Data

US 2023/0167293 A1 Jun. 1, 2023

Related U.S. Application Data

(63) Continuation of application No. PCT/JP2021/027251, filed on Jul. 21, 2021.

(30) Foreign Application Priority Data

Jul. 22, 2020 (JP) ................................ 2020-125495

(51) Int. Cl.

| | |
|---|---|
| ***C08L 33/08*** | (2006.01) |
| ***C08G 65/34*** | (2006.01) |
| ***C08K 5/101*** | (2006.01) |
| ***G06F 3/044*** | (2006.01) |

(52) U.S. Cl.

CPC .............. *C08L 33/08* (2013.01); *C08G 65/34* (2013.01); *C08K 5/101* (2013.01); *G06F 3/044* (2013.01); *G06F 2203/04103* (2013.01)

(58) Field of Classification Search

None

See application file for complete search history.

(56) References Cited

U.S. PATENT DOCUMENTS

| | | | | |
|---|---|---|---|---|
| 4,882,245 A * | 11/1989 | Gelorme | H05K 3/287 | 428/209 |
| 6,447,980 B1 * | 9/2002 | Rahman | G03F 7/0395 | 430/326 |
| 2006/0165919 A1 * | 7/2006 | Suzuki | G02B 1/14 | 428/1.31 |
| 2013/0149493 A1 | 6/2013 | Takemura et al. | | |
| 2016/0154303 A1 * | 6/2016 | Itou | C09B 69/008 | 430/7 |
| 2019/0137874 A1 | 5/2019 | Aridomi et al. | | |

FOREIGN PATENT DOCUMENTS

| | | |
|---|---|---|
| CN | 105358628 A | 2/2016 |
| JP | 2013-122479 A | 6/2013 |
| JP | 2015-71743 A | 4/2015 |
| JP | 2018-10856 A | 1/2018 |
| JP | 2018-11856 A | 1/2018 |
| WO | 2014/034768 A1 | 3/2014 |
| WO | 2017/002430 A1 | 1/2017 |
| WO | 2018/008376 A1 | 1/2018 |
| WO | 2019/188653 A1 | 10/2019 |

OTHER PUBLICATIONS

C. Selve et al., "A Novel Procedure for the Synthesis of Ether-Bridged Perfluoro Non-Ionic Surfactants", Synthetic Communications: An International Journal for Rapid Communication of Synthetic Organic Chemistry, 1990, vol. 20, No. 6, pp. 799-807 (11 pages).
Chinese Office Action dated Apr. 14, 2025 in Application No. 202180060522.9.
Communication dated Feb. 5, 2025, issued in Taiwanese Application No. 110126787.
International Preliminary Report on Patentability dated Jan. 24, 2023 with a Translation of the Written Opinion of the International Searching Authority in Application No. PCT/JP2021/027251.
International Search Report dated Sep. 21, 2021 in Application No. PCT/JP2021/027251.
Written Opinion of the International Searching Authority dated Sep. 21, 2021 in Application No. PCT/JP2021/027251.
Communication issued Oct. 18, 2024 in Chinese Application No. 202180060522.9.
Office Action issued Dec. 5, 2023 in Japanese Application No. 2022-538034.

* cited by examiner

*Primary Examiner* — Christopher M Rodd
(74) *Attorney, Agent, or Firm* — Sughrue Mion, PLLC

(57) ABSTRACT

An object of the present invention is to provide a composition having excellent coatability. In addition, another object of the present invention is to provide a composition, a transfer film, a manufacturing method for a laminate, a manufacturing method for a circuit wire, and an electronic device, which are related to the composition.
A composition of the present invention contains an alkali-soluble resin, a polymerizable compound, and a compound A.
The compound A is a compound having a group represented by General Formula (1).

$*-CF_2-H$ General Formula (1):

In the formula, * represents a bonding position.

10 Claims, 1 Drawing Sheet

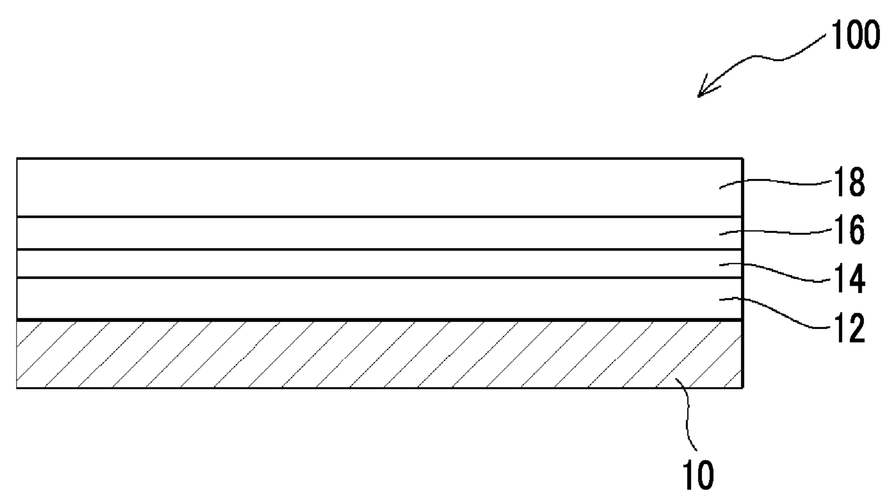
100
18
16
14
12
10

COMPOSITION, TRANSFER FILM, MANUFACTURING METHOD FOR LAMINATE, MANUFACTURING METHOD FOR CIRCUIT WIRE, AND MANUFACTURING METHOD FOR ELECTRONIC DEVICE

CROSS-REFERENCE TO RELATED APPLICATIONS

This application is a Continuation of PCT International Application No. PCT/JP2021/027251 filed on Jul. 21, 2021, which claims priority under 35 U.S.C. § 119(a) to Japanese Patent Application No. 2020-125495 filed on Jul. 22, 2020. The above applications are hereby expressly incorporated by reference, in its entirety, into the present application.

BACKGROUND OF THE INVENTION

1. Field of the Invention

The present invention relates to a composition, a transfer film, a manufacturing method for a laminate, a manufacturing method for a circuit wire, and a manufacturing method for an electronic device.

In recent years, a transfer film such as a photosensitive transfer material has been increasingly used in various fields.

Since the photosensitive transfer material can contribute to cost reduction of the product, it has been proposed to use the photosensitive transfer material as a film for an etching resist, a film for a wire protective film, or the like.

Accordingly, depending on each field, not only the properties of a polymer as a matrix but also the coatability in producing a transfer film has become important.

For example, in WO2018/008376A, a transfer film is produced by using a photosensitive composition to which an oligomer containing a fluorine-containing group and a lipophilic group is added (see [0211], [0214], [0215], and the like in WO2018/008376A).

SUMMARY OF THE INVENTION

As a result of studies by the inventors of the present invention, it was found that there is room for improvement in the coatability of such a composition (a photosensitive composition) as disclosed in WO2018/008376A.

It is noted that the excellent coatability of a composition is intended to mean that in a case where a composition is applied, the cissing of the composition is less likely to occur, the coating unevenness of the composition is less likely to occur, and thus a uniform film (a composition layer) is easily obtained.

An object of the present invention is to provide a composition having excellent coatability. In addition, another object of the present invention is to provide a transfer film, a manufacturing method for a laminate, a manufacturing method for a circuit wire, and a manufacturing method for an electronic device, which are related to the composition.

As a result of carrying out intensive studies to achieve the objects, the inventors of the present invention found that the objects can be achieved by the following configurations.

[1]A composition comprising:

an alkali-soluble resin;

a polymerizable compound; and a compound A, in which the compound A is a compound having a group represented by General Formula (1) described later.

[2] The composition according to [1], in which the compound A is a compound having a group represented by General Formula (2) described later.

[3] The composition according to [1] or [2], in which the compound A is a compound having a group represented by General Formula (3) described later.

[4] The composition according to any one of [1] to [3], in which the compound A is a high-molecular-weight compound having a weight-average molecular weight of 5,000 or more.

[5] The composition according to any one of [1] to [4], in which the compound A is a high-molecular-weight compound, and the high-molecular-weight compound contains a constitutional unit derived from a monomer represented by General Formula (4A) described later.

[6] The composition according to [5], in which the high-molecular-weight compound further contains a constitutional unit derived from a monomer represented by General Formula (5) described later.

[7] The composition according to any one of [1] to [3], in which a molecular weight of the compound A is 2,000 or less.

[8] The composition according to any one of [1] to [3] or [7], in which the compound A is a compound represented by General Formula (6A) described later.

[9] The composition according to [8], in which Z represents a monovalent organic group including a poly(oxyalkylene) structural moiety which may have a substituent.

[10] The composition according to any one of [1] to [9], further comprising a polymerization initiator.

[11] The composition according to any one of [1] to [9], in which the alkali-soluble resin is a thermoplastic resin.

[12] The composition according to any one of [1] to [11], further comprising black particles.

[13]A transfer film comprising:

a temporary support; and one or more composition layers, in which at least one layer of the composition layers is a layer formed of the composition according to any one of [1] to [12].

[14]A manufacturing method for a laminate, comprising:

an affixing step of bringing a substrate into contact with a surface of the transfer film according to [13] on a side opposite to the temporary support and affixing the transfer film to the substrate to obtain a transfer film-attached substrate;

an exposure step of subjecting the composition layer to pattern exposure;

a development step of developing the exposed composition layer to form a resin pattern; and a peeling step of peeling the temporary support from the transfer film-attached substrate, between the affixing step and the exposure step or between the exposure step and the development step.

[15]A manufacturing method for a circuit wire, comprising:

an affixing step of bringing a surface of the transfer film according to [13] on a side opposite to the temporary support into contact with a substrate having a conductive layer and affixing the transfer film to the substrate having the conductive layer to obtain a transfer film-attached substrate;

an exposure step of subjecting the composition layer to pattern exposure;

a development step of developing the exposed composition layer to form a resin pattern;

an etching step of subjecting the conductive layer in a region where the resin pattern is not disposed to an etching treatment; and a peeling step of peeling the temporary support from the transfer film-attached substrate, between the affixing step and the exposure step or between the exposure step and the development step.

[16]A manufacturing method for an electronic device, comprising:

the manufacturing method for a laminate according to [14], in which the electronic device includes the resin pattern as a cured film.

According to the present invention, it is possible to provide a composition having excellent coatability. In addition, it is possible to provide a transfer film, a manufacturing method for a laminate, a manufacturing method for a circuit wire, and a manufacturing method for an electronic device, which are related to the composition.

BRIEF DESCRIPTION OF THE DRAWINGS

The FIGURE is a schematic view illustrating an example of a configuration of a transfer film.

DESCRIPTION OF THE PREFERRED EMBODIMENTS

Hereinafter, the present invention will be described in more detail.

The following description of configuration requirements is based on representative embodiments of the invention; however, the present invention is not limited thereto.

In the present invention, the numerical value range indicated by using "to" means a range including the numerical values before and after "to" as the lower limit value and the upper limit value, respectively.

In addition, a bonding direction of a divalent group (for example, —CO—O—) described in the present specification is not particularly limited.

In the present specification, (meth)acrylate indicates acrylate and methacrylate. The (meth)acrylic acid indicates acrylic acid and methacrylic acid. The (meth)acryloyl group indicates a methacryloyl group or an acryloyl group.

In describing a group (an atomic group) of the present specification, in a case where a description does not indicate substitution and non-substitution, the description means the group includes a group having a substituent as well as a group having no substituent. For example, the description "alkyl group" includes not only an alkyl group that does not have a substituent (an unsubstituted alkyl group) but also an alkyl group that has a substituent (a substituted alkyl group). Further, the "organic group" in the present specification means a group containing at least one carbon atom.

Further, in the present specification, the kind of substituent, the position of substituent, and the number of substituents are not particularly limited in a case of being described as "may have a substituent". The number of substituents may be, for example, one, two, three, or more. In addition, it may be unsubstituted.

Examples of the substituent include a monovalent nonmetal atomic group excluding a hydrogen atom, and for example, the following substituent group T can be selected.

(Substituent T)

Examples of the substituent T include halogen atoms such as a fluorine atom, a chlorine atom, a bromine atom, and an iodine atom; alkoxy group such as a methoxy group, an ethoxy group, and a tert-butoxy group; aryloxy groups such as a phenoxy group and a p-tolyloxy group; alkoxycarbonyl groups such as a methoxycarbonyl group, a butoxycarbonyl group, and a phenoxycarbonyl group; acyloxy groups such as an acetoxy group, a propionyloxy group, and a benzoyloxy group; acyl groups such as an acetyl group, a benzoyl group, an isobutyryl group, an acryloyl group, a methacryloyl group, and a methoxalyl group; alkylsulfanyl groups such as a methylsulfanyl group and tert-butylsulfanyl group; arylsulfanyl groups such as a phenylsulfanyl group and a p-tolylsulfanyl group; an alkyl group; a cycloalkyl group; an aryl group; a heteroaryl group; a hydroxyl group; a carboxy group; a formyl group; a sulfo group; a cyano group; an alkylaminocarbonyl group; an arylaminocarbonyl group; a sulfonamide group; a silyl group; an amino group; a monoalkylamino group; a dialkylamino group; an arylamino group; and combinations thereof.

In the present specification, unless otherwise specified, the weight-average molecular weight (Mw) and the number-average molecular weight (Mn) are values calculated in terms of polystyrene by gel permeation chromatography (GPC).

The measurement by GPC is carried out under the following conditions.

[Eluent]tetrahydrofuran (THF)

[Device name] EcoSEC HLC-8320GPC (manufactured by Tosoh Corporation)

[Column] TSKgel SuperHZM-H, TSKgel SuperHZ4000, TSKgel SuperHZ200 (manufactured by Tosoh Corporation)

[Column temperature]40° C.

[Flow rate]0.35 ml/min

In the present specification, unless otherwise specified, the molecular weight of a compound having a molecular weight distribution is the weight-average molecular weight (Mw).

In the present specification, unless otherwise specified, the room temperature is 25° C.

In the present specification, "alkali-soluble" means that the solubility in 100 g of an aqueous solution of 1% by mass sodium carbonate at 22° C. is 0.1 g or more.

In the present specification, "water-soluble" means that the solubility in 100 g of water having a liquid temperature of 22° C. and a pH of 7.0 is 0.1 g or more.

In the present specification, the layer thickness (the film thickness) of each layer included in the transfer film or the like is measured by observing a cross section of a layer (a film) in a direction perpendicular to the main surface of the photosensitive transfer material with a scanning electron microscope (SEM), measuring the thickness of each layer at 10 points or more based on the obtained observation image, and calculating the average value thereof.

[Composition]

The composition according to the embodiment of the present invention contains an alkali-soluble resin, a polymerizable compound, and a compound A. The compound A is a compound having a group represented by General Formula (1) described later.

The mechanism by which the objects of the present invention are achieved by such configurations is not clear; however, the inventors of the present invention presume as follows.

The compound A contains, in the structure thereof, a fluoroalkyl group (a group represented by General Formula (1)) containing a hydrogen atom at a terminal portion. Such a compound A has good compatibility with a resin or the like in the composition and good solubility in an organic solvent (which may be a water-soluble solvent) to be added as desired. As a result, it is conceived that the aggregation of the compound A in the composition is less likely to occur, the coating unevenness of the composition is less likely to occur, and thus the coatability is improved.

In addition, in a case where the compound A further has a poly(oxyalkylene) structural moiety, it is conceived that the compound A is more likely to migrate to the surface of the coating film. Due to the presence of such a compound A in the composition, it is presumed that the surface tension of the coating film is further reduced, and the wettability of the composition with respect to the substrate and the plane shape of the surface of the coating film at the time of coating are further improved, whereby the coatability is further improved.

In addition, in a case where the compound A is a high-molecular-weight compound having a poly(oxyalkylene) structural moiety and the weight-average molecular weight thereof is 5,000 to 11,500 or less, it is presumed that the compound A has a higher rate of migration to the surface of the coating film, and thus the coatability is further improved.

[Compound A]

The composition according to the embodiment of the present invention contains a compound A.

The compound A is a compound having a group represented by General Formula (1).

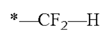 General Formula (1):

In the formula, * represents a bonding position.

The compound A may be a high-molecular-weight compound or may be a low-molecular-weight compound. In a case where the compound A is a high-molecular-weight compound, the compound A which is a high-molecular-weight compound may be referred to as a "high-molecular-weight compound A". In addition, in a case where the compound A is a low-molecular-weight compound, the compound A which is a low-molecular-weight compound may be referred to as a "low-molecular-weight compound A". The compound A is preferably a high-molecular-weight compound A since the effect of the present invention is more excellent.

The lower limit value of the weight-average molecular weight of the high-molecular-weight compound A is preferably 1,000 or more, more preferably 1,500 or more, still more preferably more than 2,000, and particularly preferably 5,000 or more. In addition, the upper limit value thereof is preferably 100,000 or less, more preferably 80,000 or less, still more preferably 60,000 or less, still more preferably 40,000 or less, particularly preferably 20,000 or less, and most preferably 11,500 or less.

The number-average molecular weight (Mn) of the high-molecular-weight compound A is preferably 500 to 40,000, more preferably 600 to 20,000, and still more preferably 600 to 10,000.

The dispersivity (Mw/Mn) of the high-molecular-weight compound A is preferably 1.00 to 12.00, more preferably 1.00 to 11.00, and still more preferably 1.00 to 10.00.

The high-molecular-weight compound A preferably contains a constitutional unit having a group represented by General Formula (1).

The molecular weight of the low-molecular-weight compound A is preferably 100 or more and more preferably 500 or more. The upper limit of the molecular weight of the low-molecular-weight compound A is preferably 5,000 or less, more preferably 3,000 or less, and still more preferably 2,000 or less.

The number of groups represented by General Formula (1) in the low-molecular-weight compound A is not particularly limited as long as it is 1 or more; however, it is, for example, preferably 1 to 3.

Specific aspects of the high-molecular-weight compound A and the low-molecular-weight compound A will be described in the latter part.

In addition, since the effect of the present invention is more excellent, the compound A is preferably a compound having a group represented by General Formula (2) described later (hereinafter, also referred to as a "compound Aa"), and it is more preferably a compound having a group represented by General Formula (3) (hereinafter, also referred to as a "Compound Ab") described later.

It is noted that the compound Aa corresponds to a compound in which the linking form of the group represented by General Formula (1) in the compound A is further limited. That is, $-CF_2-H$ present at the terminal portion of the group represented by General Formula (2) in the compound Aa corresponds to the group represented by General Formula (1) described above. In addition, the compound Ab is intended to be a compound in which the linking form of the group represented by General Formula (1) in the compound A and the linking form of the group represented by General Formula (2) in the compound Aa are further limited. That is, $-CF_2-H$ present at the terminal portion of the group represented by General Formula (3) in the compound Ab corresponds to the group represented by General Formula (1) described above, and $-CF_2-CF_2-H$ present at the terminal portion of the group represented by General Formula (3) in the compound Ab corresponds to the group represented by General Formula (2) described above.

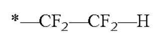 General Formula (2):

In the formula, * represents a bonding position.

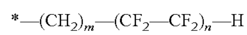 General Formula (3):

In the formula, m and n each independently represent an integer of 1 to 6, and m is preferably 1 to 4 and more preferably 1 or 2.

n is preferably 1 to 4 and more preferably 2 or 3.

*represents a bonding position.

Hereinafter, the high-molecular-weight compound A and the low-molecular-weight compound A will be described.

<High-Molecular-Weight Compound A>

As described above, the high-molecular-weight compound A is an aspect of the compound Ain a case where it is a high-molecular-weight compound. The suitable aspects of the weight-average molecular weight and the dispersivity of the high-molecular-weight compound A are as described above.

The high-molecular-weight compound A preferably contains a constitutional unit having a group represented by any one of General Formulae (1) to (3) described above, more preferably contains a constitutional unit derived from a monomer represented by General Formula (4) described later, and still more preferably contains a constitutional unit derived from a monomer represented by General Formula (4A) described later. It is noted that the constitutional unit derived from a monomer represented by General Formula (4) described later corresponds to the constitutional unit having a group represented by General Formula (1) or (2) described above, and the constitutional unit derived from a monomer represented by General Formula (4A) described later corresponds to the constitutional unit having a group represented by General Formula (3) described above.

(4)

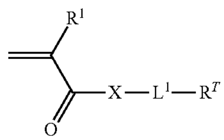

In General Formula (4), $R^1$ represents a hydrogen atom or a methyl group. X represents an oxygen atom, a sulfur atom, or —$N(R^2)$—. $R^2$ represents a hydrogen atom or an alkyl group having 1 to 4 carbon atoms. $L^1$ represents a divalent linking group. $R^T$ represents the group represented by General Formula (1) or (2) described above.

The alkyl group having 1 to 4 carbon atoms, which is represented by $R^2$, may be either linear, branched, or cyclic.

$R^1$ is preferably a hydrogen atom.

$R^2$ is preferably a hydrogen atom or an alkyl group having 1 or 2 carbon atoms and more preferably an alkyl group having 1 or 2 carbon atoms.

X is preferably an oxygen atom.

The divalent linking group represented by $L^1$ is not particularly limited. However, examples thereof include —O—, —CO—, —S—, —$SO_2$—, —$NR^X$— ($R^X$ is a hydrogen atom or a substituent), an alkylene group, an alkenylene group, an alkynylene group, an aromatic ring group, an alicyclic group, and a group obtained by combining these. The substituent represented by $R^X$ is not particularly limited, and examples thereof include the substituents exemplified in the substituent group T, where an alkyl group having 1 or 2 carbon atoms is preferable.

The alkylene group, the alkenylene group, the alkynylene group, the aromatic ring group, and the alicyclic group may further have a substituent. The substituent is not particularly limited, and examples thereof include the substituents exemplified in the substituent group T. Among them, the substituent is preferably a halogen atom and more preferably a fluorine atom.

The alkylene group, the alkenylene group, and the alkynylene group may be linear or branched.

In addition, the alkylene group preferably has 1 to 20 carbon atoms, more preferably 1 to 15 carbon atoms, still more preferably 1 to 11 carbon atoms, and particularly preferably 1 to 10 carbon atoms.

In addition, the alkenylene group and the alkynylene group preferably have 2 to 20 carbon atoms, more preferably 2 to 15 carbon atoms, still more preferably 2 to 11 carbon atoms, and particularly preferably 2 to 10 carbon atoms.

The aromatic ring group may be any one of an aromatic hydrocarbon ring group or an aromatic heterocyclic group.

The aromatic ring that constitutes the aromatic ring group may be a monocyclic ring or a polycyclic ring. The number of ring members of the aromatic ring that constitutes the aromatic ring group is not particularly limited; however, it is, for example, 5 to 15. In addition, the number of heteroatoms contained in the aromatic heterocyclic group is not particularly limited, and it is, for example, preferably 1 to 3. The kind of heteroatom is not particularly limited; however, examples thereof include a nitrogen atom, an oxygen atom, and a sulfur atom. Examples of the kind of the aromatic ring that constitutes the aromatic ring group include aromatic hydrocarbon rings such as a benzene ring, a naphthalene ring, an anthracene ring, and a phenanthroline ring; and aromatic heterocyclic rings such as a furan ring, a pyrrole ring, a thiophene ring, a pyridine ring, a thiazole ring, and a benzothiazole ring.

The alicyclic group may be any one of an aliphatic hydrocarbon ring group or an aliphatic heterocyclic group.

The alicyclic ring that constitutes the alicyclic group may be a monocyclic ring or a polycyclic ring. The number of ring members of the alicyclic ring that constitutes the alicyclic group is not particularly limited; however, it is, for example, 5 to 15. In addition, the number of heteroatoms contained in the aliphatic heterocyclic group is not particularly limited, and it is, for example, preferably 1 to 3. The kind of heteroatom is not particularly limited; however, examples thereof include a nitrogen atom, an oxygen atom, and a sulfur atom.

Examples of the alicyclic ring that constitutes the alicyclic group include cycloalkane rings such as a cyclopropane ring, a cyclobutane ring, a cyclopentane ring, a cyclohexane ring, a cyclooctane ring, a cyclodecane ring, an adamantane ring, a norbornane ring, and an exo-tetrahydrodicyclopentadiene ring, as well as a cyclohexene ring.

Among them, the divalent linking group represented by $L^1$ is preferably an alkylene group-$*^B$ which may be substituted with an $*^A$-fluorine atom, an alkenylene group_$*^B$ which may be substituted with an $*^A$-fluorine atom, or an alkynylene group_$*^B$ which may be substituted with an $*^A$-fluorine atom, and it is more preferably an alkylene group-*B which may be substituted with an $*^A$-fluorine atom. It is noted that $*^A$ represents a linking position to X in Formula (4), and $*^B$ represents a linking position to $R^T$ in Formula (4).

(4A)

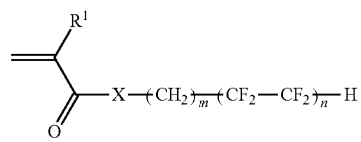

In Formula (4A), $R^1$ and X have the same meanings as $R^1$ and X in Formula (4), respectively, and the same applies to the preferred aspects thereof.

m and n each independently represent an integer of 1 to 6. m is preferably 1 to 4 and more preferably 1 or 2. n is preferably 1 to 4 and more preferably 2 or 3.

In the high-molecular-weight compound A, the lower limit value of the content of the constitutional unit having the group represented by any one of General Formulae (1) to (3) is preferably 2% by mass or more, more preferably 3% by mass or more, and still more preferably 5% by mass or more, with respect to the total mass of the high-molecular-weight compound A. In addition, the upper limit value thereof is preferably 100% by mass or less, more preferably 90% by mass, and still more preferably 80% by mass.

One kind of the constitutional unit having a group represented by any one of General Formulae (1) to (3) may be used alone, or two or more kinds thereof may be used.

The constitutional unit having a group represented by any one of General Formulae (1) to (3) can be synthesized by a known method.

The high-molecular-weight compound A may have a constitutional unit other than the constitutional unit having a group represented by any one of General Formulae (1) to (3) (hereinafter, also referred to as the "other constitutional unit").

The other constitutional unit is not particularly limited. However, it is preferable to include a constitutional unit having a poly(oxyalkylene) structure since the effect of the present invention is more excellent.

The poly(oxyalkylene) structure is preferably a structure represented by Formula (PAL).

(PAL)

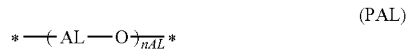

In Formula (PAL), nAL represents an integer of 2 or more, where it is more preferably 2 to 100, still more preferably 4 to 20, particularly preferably 4 to 15, and most preferably 4 to 12.

AL represents an alkylene group. The alkylene group may be linear or branched. The alkylene group represented by AL preferably has 1 to 10 carbon atoms, more preferably 1 to 6 carbon atoms, still more preferably 2 to 4 carbon atoms, and particularly preferably 2 or 3 carbon atoms.

The nAL pieces of AL's may be the same or different from each other.

Further, the alkylene group represented by AL may have a substituent. The substituent is not particularly limited, and examples thereof include the substituents exemplified in the substituent group T.

Among them, AL is preferably $—CH_2CH_2—$, $—CH_2CH_2CH_2—$, $—CH(CH_3)CH_2—$, or $—CH(CH_2CH_3)CH_2—$, and it is more preferably $—CH(CH_3)CH_2—$ or $—CH_2CH_2CH_2—$.

* represents a bonding position.

The constitutional unit having a poly(oxyalkylene) structure is preferably a constitutional unit having a poly(oxyalkylene) structure in a side chain, and it is more preferably a constitutional unit derived from a monomer represented by General Formula (5) described later.

(5)

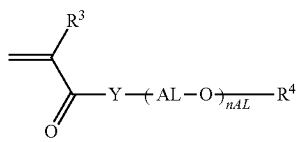

In the formula, $R^3$ represents a hydrogen atom or a methyl group. Y represents an oxygen atom, a sulfur atom, or $—N(R^5)—$. AL represents an alkylene group which may have a substituent. nAL represents an integer of 2 or more. $R^4$ represents a hydrogen atom or a substituent. $R^5$ represents a hydrogen atom or an alkyl group having 1 to 4 carbon atoms.

AL and nAL in Formula (5) have the same meanings as AL and nAL in Formula (PAL), respectively, and the same applies to the preferred aspects thereof.

The substituent represented by $R^4$ is not particularly limited, and examples thereof include the substituents exemplified in the substituent group T, where an alkyl group having 1 to 6 carbon atoms is preferable.

The alkyl group having 1 to 4 carbon atoms, which is represented by $R^5$, may be either linear, branched, or cyclic.

$R^3$ and $R^4$ are preferably a hydrogen atom.

$R^5$ is preferably a hydrogen atom or an alkyl group having 1 or 2 carbon atoms and more preferably an alkyl group having 1 or 2 carbon atoms.

Y is preferably an oxygen atom.

In a case where the high-molecular-weight compound A contains a constitutional unit having a poly(oxyalkylene) structure, the content thereof is preferably 10% by mass or more, more preferably 20% by mass or more, and still more preferably 50% by mass or more, with respect to the total mass of the high-molecular-weight compound A. In addition, the upper limit value thereof is preferably 95% by mass or less and more preferably 90% by mass or less.

One kind of constitutional unit having a poly(oxyalkylene) structure may be used alone, or two or more kinds thereof may be used.

In addition to the above-described constitutional units, the constitutional unit which can be contained in the high-molecular-weight compound A is, for example, preferably a constitutional unit derived from a (meth)acrylic acid ester or a constitutional unit derived from (meth)acrylic acid.

Examples of the (meth)acrylic acid ester include a (meth)acrylic acid alkyl ester having 1 to 18 carbon atoms in an alkyl group. Specific examples thereof include methyl (meth)acrylate, ethyl (meth)acrylate, n-butyl (meth)acrylate, isobutyl (meth)acrylate, 2-ethylhexyl (meth)acrylate, lauryl (meth)acrylate, and stearyl (meth)acrylate.

In a case where the high-molecular-weight compound A contains a constitutional unit selected from the group consisting of a constitutional unit derived from a (meth)acrylic acid ester and a constitutional unit derived from (meth)acrylic acid, the content thereof is preferably 10% by mass or more, more preferably 20% by mass or more, and still more preferably 30% by mass or more, with respect to the total mass of the high-molecular-weight compound A. In addition, the upper limit value thereof is preferably 90% by mass or less, more preferably 80% by mass or less, and still more preferably 70% by mass or less.

In a case where the high-molecular-weight compound A is a copolymer, it is also preferable that the high-molecular-weight compound A has a block structure, a graft structure, a branch structure, and/or a star structure.

Various monomers that constitute the high-molecular-weight compound A and the high-molecular-weight compound A can be produced according to known methods.

<Low-Molecular-Weight Compound A>

As described above, the low-molecular-weight compound A is an aspect of the compound A in a case where it is a low-molecular-weight compound. The suitable aspect of the molecular weight of the low-molecular-weight compound A is as described above.

The low-molecular-weight compound A is preferably a compound having a group represented by any one of General Formulae (1) to (3) described above, more preferably a compound represented by General Formula (6) described later, still more preferably a compound represented by General Formula (6A) described later, and particularly preferably a compound represented by General Formula (6B) described later. It is noted that a compound represented by General Formula (6) described later corresponds to a compound having the group represented by General Formula (1) or (2) described above, and a compound represented by General Formula (6A) or (6B) described later corresponds to a compound having the group represented by General Formula (3) described above.

(6)

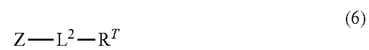

In General Formula (6), $Z^1$ represents a monovalent organic group. $L^2$ represents a single bond or a divalent linking group, and $R^T$ represents the group represented by General Formula (1) or (2) described above.

The monovalent organic group represented by Z is not particularly limited; however, examples thereof include an alkyl group, an alkenyl group, and an alkynyl group, which may have a heteroatom (it is noted that the heteroatom may be contained as —O—, —CO—, —S—, —$SO_2$, or —$NR^X$— ($R^X$ is a hydrogen atom or a substituent)). The substituent represented by $R^X$ is not particularly limited, and examples thereof include the substituents exemplified in the substituent group T.

The alkyl group, the alkenyl group, and the alkynyl group may further have a substituent. The substituent is not particularly limited, and examples thereof include the substituents exemplified in the substituent group T.

The alkyl group, the alkenyl group, and the alkynyl group may be linear, branched, or cyclic.

In addition, the number of carbon atoms of the alkyl group is not particularly limited. However, it is, for example, 1 to 40, and it is preferably 1 to 30 and more preferably 1 to 20.

In addition, the numbers of carbon atoms of the alkenyl group and the alkynyl group are not particularly limited. However, they are, for example, 2 to 40, and they are preferably 2 to 30 and more preferably 2 to 20.

Among the above, Z is preferably a monovalent organic group having a poly(oxyalkylene) structure. The poly(oxyalkylene) structure is preferably a structure represented by Formula (PAL).

It is noted that the atom of Z at the linking position to $L^2$ in Formula (6) is preferably a carbon atom.

Examples of the divalent linking group represented by $L^2$ include the same one as the divalent linking group represented by $L^1$ in General Formula (4) described above. Among them, the divalent linking group represented by $L^2$ is preferably an alkylene group-$*^B$ which may be substituted with an $*^A$-$L^2$-fluorine atom, an alkenylene group-$*^B$ which may be substituted with an $*^A$-$L^2$-fluorine atom, or an alkynylene group-$*^B$ which may be substituted with an $*^A$-$L^2$-fluorine atom, and it is more preferably an alkylene group-$*^B$ which may be substituted with an $*^A$-$L^2$-fluorine atom.

$L^{21}$ represents —O—, —CO—, —S—, —$SO_2$—, —$NR^X$— ($R^X$ is a hydrogen atom or a substituent), or a group obtained by combining these. The substituent represented by $R^X$ is not particularly limited, and examples thereof include the substituents exemplified in the substituent group T, where an alkyl group having 1 or 2 carbon atoms is preferable. Among the above, $L^{21}$ is preferably —O—, —S—, or —$NR^X$—, and it is more preferably —O—.

$*^A$ represents a linking position to Z in Formula (6), and $*^B$ represents a linking position to $R^T$ in Formula (6).

(6A)

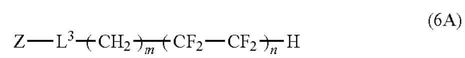

$$Z-L^3\left(CH_2\right)_m\left(CF_2-CF_2\right)_n H$$

In the formula, Z represents a monovalent organic group. $L^3$ represents an oxygen atom, a sulfur atom, or —$N(R^6)$—. m and n each independently represent an integer of 1 to 6. $R^6$ represents a hydrogen atom or an alkyl group having 1 to 4 carbon atoms.

Examples of the monovalent organic group represented by Z in Formula (6A) include the same one as the monovalent organic group represented by Z in Formula (6), and the same applies to the preferred aspects thereof.

The alkyl group having 1 to 4 carbon atoms, which is represented by $R^6$, may be either linear, branched, or cyclic.

$L^3$ is preferably an oxygen atom.

m is preferably 1 to 4 and more preferably 1 or 2.

n is preferably 1 to 4 and more preferably 2 or 3.

(6B)

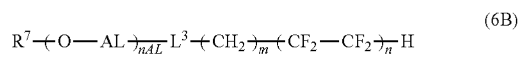

$$R^7\left(O-AL\right)_{nAL}L^3\left(CH_2\right)_m\left(CF_2-CF_2\right)_n H$$

AL and nAL in Formula (6B) have the same meanings as AL and nAL in Formula (PAL), respectively, and the same applies to the preferred aspects thereof.

$L^3$, m, and n in Formula (6B) have the same meanings as $L^3$, m, and n in Formula (6A), respectively, and the same applies to the preferred aspects thereof.

In Formula (6B), $R^7$ represents a hydrogen atom or a substituent.

The substituent represented by $R^7$ is not particularly limited, and examples thereof include the substituents exemplified in the substituent group T, where an alkyl group having 1 to 6 carbon atoms is preferable.

$R^7$ is preferably a hydrogen atom.

The low-molecular-weight compound A can be produced according to a known method.

Hereinafter, specific examples of the compound A will be shown; however, the compound A in the present invention is not limited thereto.

(A-1) (A-2) (A-3) (A-4) (A-5)

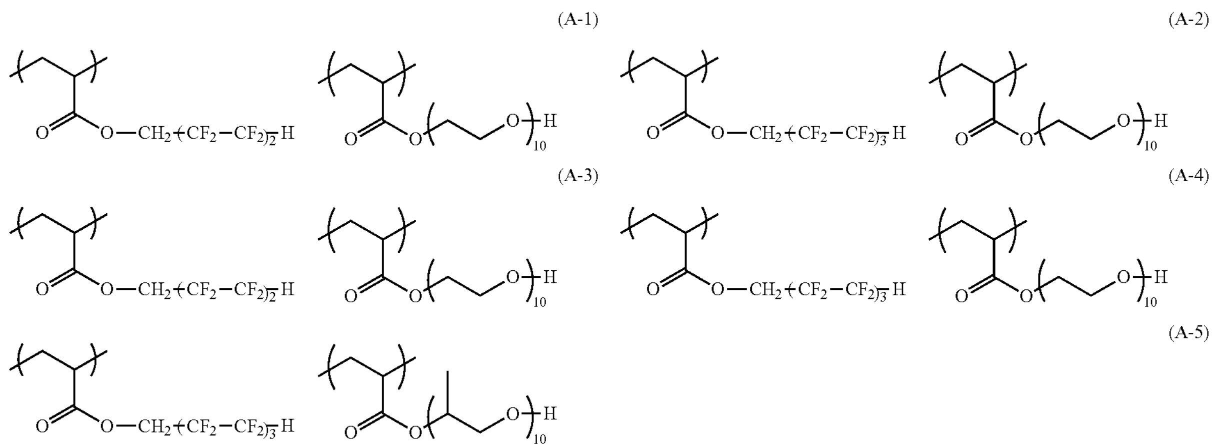

-continued (A-6)

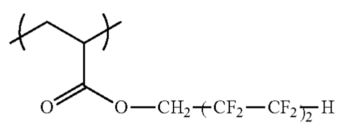 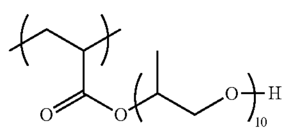 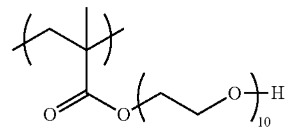

(A-7)

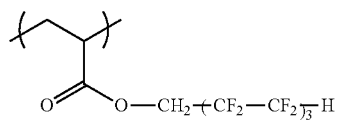 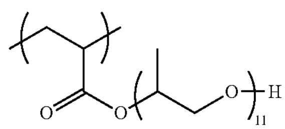 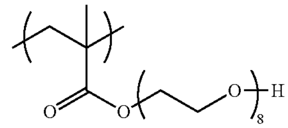

(A-8)

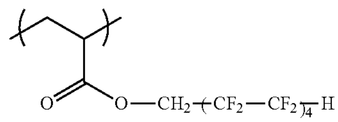 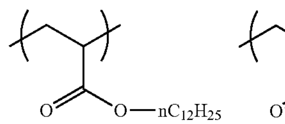 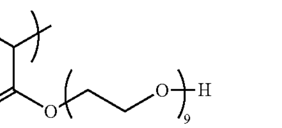

(A-9)

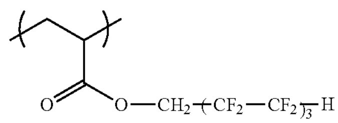 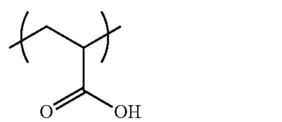 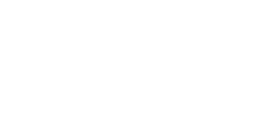

(A-10)

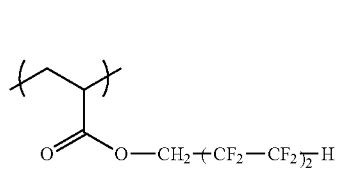 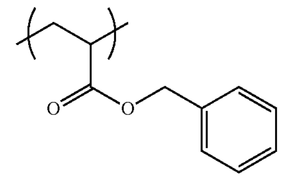 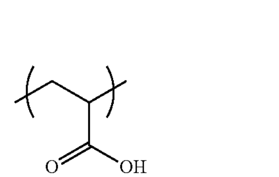

(A-11)

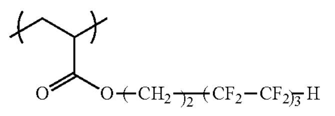 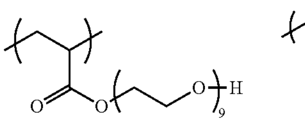

(A-12)

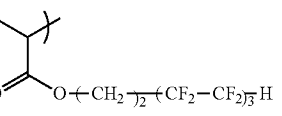 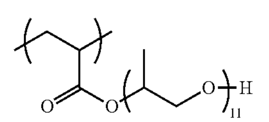

(B-1)

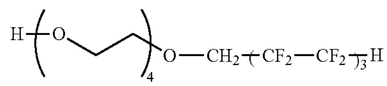

(B-2)

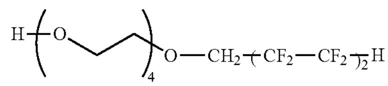

(B-3)

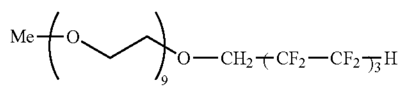

(B-4)

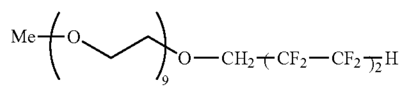

With respect to the total solid content of the composition (a negative tone photosensitive resin composition, a thermoplastic resin composition, a coloration resin composition, and/or the like, which is described later), the content of the compound A is preferably 0.001% to 10% by mass, more preferably 0.01% to 3% by mass, and still more preferably 0.02% to 1% by mass.

In the present specification, the "solid content" of the composition means a component that forms a composition layer (for example, a negative tone photosensitive resin layer) formed of the composition, and in a case where the composition contains a solvent (an organic solvent, water, or the like), the solid content means all components excluding the solvent. In addition, in a case where the components are components that form a composition layer, the components are considered to be the solid content even in a case where they are liquid components.

[Alkali-Soluble Resin]

The composition according to the embodiment of the present invention contains an alkali-soluble resin.

The alkali-soluble resin is a component different from the high-molecular-weight compound A.

The properties and/or characteristics of the alkali-soluble resin are not limited, and the alkali-soluble resin can be appropriately selected depending on the use application of the composition.

Details of the alkali-soluble resin contained in the composition according to the embodiment of the present invention will be described later according to each form of the composition.

[Polymerizable Compound]

The composition according to the embodiment of the present invention contains a polymerizable compound.

The properties and/or characteristics of the polymerizable compound are not limited, and the polymerizable compound can be appropriately selected depending on the use application of the composition.

Details of the polymerizable compound contained in the composition according to the embodiment of the present invention will be described later according to each form of the composition.

[Other Components]

The composition according to the embodiment of the present invention may contain components other than the alkali-soluble resin, the polymerizable compound, and the compound A.

Examples of the other components include components such as a polymerization initiator, a coloring agent, a thermal crosslinking compound, a solvent, a plasticizer, a sensitizing agent, and a compound that generates an acid, a base, or a radical due to light.

Details of the other components contained in the composition according to the embodiment of the present invention will be described later according to each form of the composition.

[Aspect of Composition]

The aspect of the composition according to the embodiment of the present invention is not particularly limited.

For example, the composition according to the embodiment of the present invention may be a negative tone photosensitive resin composition that is used for forming a negative tone photosensitive resin layer, may be a thermoplastic resin composition that is used for forming a thermoplastic resin layer, and may be a coloration resin composition that is used for forming a coloration resin layer.

Hereinafter, a component that can be contained in each composition in each aspect will be described.

It is noted that a component described as a component of a composition of a certain aspect is not intended to be allowed to be contained only in a case where the composition is the aspect, and it can be used as a component of a composition of another aspect. For example, a component described below as a component of the negative tone photosensitive resin layer composition may be used as a component of a composition other than the negative tone photosensitive resin composition.

[Negative Tone Photosensitive Resin Composition]

In a display device (an organic electroluminescence (EL) display device, a liquid crystal display device, or the like) that includes a touch panel such as a capacitive input device, an electrode pattern corresponding to a sensor of a visual recognition part and a conductive layer pattern of a wire or the like of a peripheral wiring portion or a lead-out wiring portion are provided inside the touch panel.

Generally, a method of providing a layer (a photosensitive layer) of a negative tone photosensitive resin composition on a substrate using a transfer film or the like, subjecting the photosensitive layer to exposure through a mask having a desired pattern, and then carrying out development is widely employed for forming a patterned layer.

Here, first, in a case where the composition is a negative tone photosensitive resin composition, a component that can be contained as a component other than the compound A will be described.

In a case where the composition is a negative tone photosensitive resin composition, the negative tone photosensitive resin composition preferably contains the compound A, an alkali-soluble resin, a polymerizable compound, and a polymerization initiator.

Such a composition (a negative tone photosensitive resin composition or the like) preferably contains, in terms of the total solid content mass of the composition; an alkali-soluble resin of 10% to 90% by mass, a polymerizable compound of 5% to 70% by mass, and a polymerization initiator of 0.01% to 20% by mass. Hereinafter, each component will be described in order.

<Polymer P (Resin)>

In a case where the composition is a negative tone photosensitive resin composition, the alkali-soluble resin contained in the composition is particularly referred to as a polymer P.

The acid value of the polymer P is preferably 220 mgKOH/g or less, more preferably less than 200 mgKOH/g, and still more preferably less than 190 mgKOH/g, from the viewpoint of the more excellent resolution by suppressing the swelling of the negative tone photosensitive resin layer due to the developer.

The lower limit of the acid value of the polymer P is not particularly limited; however, it is preferably 60 mgKOH/g or more, more preferably 120 mgKOH/g or more, still more preferably 150 mgKOH/g or more, and particularly preferably 170 mgKOH/g or more, from the viewpoint of the more excellent developability.

It is noted that the acid value is the mass [mg] of potassium hydroxide required to neutralize 1 g of the sample, and the unit thereof is described as mgKOH/g in the present specification. The acid value can be calculated, for example, from the average content of acid groups in the compound.

The acid value of the polymer P may be adjusted according to the kind of the constitutional unit that constitutes the polymer P and the content of the constitutional unit including an acid group.

The weight-average molecular weight of the polymer P is preferably 5,000 to 500,000. A case where the weight-average molecular weight is 500,000 or less is preferable from the viewpoint of improving resolution and developability. The weight-average molecular weight is more preferably 100,000 or less and still more preferably 60,000 or less. On the other hand, a case where the weight-average molecular weight is 5,000 or more is preferable from the viewpoint of controlling property of the developed aggregate and the property of the unexposed film such as edge fuse property and cut chip property in a case of forming a negative tone photosensitive resin laminate. The lower limit of the weight-average molecular weight is more preferably 10,000 or more, still more preferably 20,000 or more, and particularly preferably 30,000 or more. The edge fuse property refers to a degree of ease with which the negative tone photosensitive resin layer (that is, a layer consisting of the negative tone photosensitive resin composition) protrudes from the edge surface of the roll in a case of being wound backward in a roll shape as a negative tone photosensitive resin laminate. The cut chip property refers to a degree of ease of chip flying in a case where the unexposed film is cut with a cutter. In a case where this chip adheres to the upper surface of the negative tone photosensitive resin laminate or the like, it is transferred to the mask in the later exposure step or the like, which causes a defective product. The dispersivity of the polymer P is preferably 1.0 to 6.0, more preferably 1.0 to 5.0, still more preferably 1.0 to 4.0, and particularly preferably 1.0 to 3.0.

In the negative tone photosensitive resin composition, the polymer P preferably contains a constitutional unit based on a monomer having an aromatic hydrocarbon group from the viewpoint of suppressing line width thickening and deterioration of resolution in a case where the focal position has deviated during exposure. Examples of such an aromatic hydrocarbon group include a substituted or unsubstituted phenyl group and a substituted or unsubstituted aralkyl group. The content of the constitutional unit based on a monomer having an aromatic hydrocarbon group in the polymer P is preferably 20% by mass or more and more preferably 30% by mass or more with respect to the total mass of the polymer P. The upper limit thereof is not particularly limited; however, it is preferably 95% by mass or less and more preferably 85% by mass or less. In a case where a plurality of kinds of the polymer P are contained, the average value of the contents of the constitutional units based on a monomer having an aromatic hydrocarbon group is preferably within the above range.

Examples of the monomer having an aromatic hydrocarbon group include a monomer having an aralkyl group, styrene, and a polymerizable styrene derivative (for example, methyl styrene, vinyl toluene, tert-butoxy styrene, acetoxy styrene, 4-vinylbenzoic acid, a styrene dimer, or a styrene trimer). Among them, a monomer having an aralkyl group or styrene is preferable. In one aspect, in a case where the monomer component having an aromatic hydrocarbon group in the polymer P is styrene, the content of the constitutional unit based on the styrene is preferably 20% to 70% by mass, more preferably 25% to 65% by mass, still more preferably 30% to 60% by mass, and particularly preferably 30% to 55% by mass, with respect to the total mass of the polymer P.

Examples of the aralkyl group include a substituted or unsubstituted phenylalkyl group (excluding a benzyl group) and a substituted or unsubstituted benzyl group, where a substituted or unsubstituted benzyl group is preferable.

Examples of the monomer having a phenylalkyl group include phenylethyl (meth)acrylate.

Examples of the monomer having a benzyl group include (meth)acrylate having a benzyl group, for example, benzyl (meth)acrylate or chlorobenzyl (meth)acrylate; and a vinyl monomer having a benzyl group, for example, vinylbenzyl chloride or vinylbenzyl alcohol. Among them, benzyl (meth) acrylate is preferable. In one aspect, in a case where the monomer component having an aromatic hydrocarbon group in the polymer P is benzyl (meth)acrylate, the content of the constitutional unit based on the benzyl (meth)acrylate is preferably 50% to 95% by mass, more preferably 60% to 90% by mass, still more preferably 70% to 90% by mass, and particularly preferably 75% to 90% by mass, with respect to the total mass of the polymer P.

The polymer P containing a constitutional unit based on a monomer having an aromatic hydrocarbon group is preferably obtained by polymerizing a monomer having an aromatic hydrocarbon group with at least one kind of the first monomer described later and/or at least one kind of the second monomer described later.

The polymer P containing no constitutional unit based on a monomer having an aromatic hydrocarbon group is preferably obtained by polymerizing at least one kind of the first monomers described later, and more preferably obtained by copolymerizing at least one kind of the first monomer and at least one kind of the second monomer described later.

The first monomer is a monomer having a carboxy group in the molecule. Examples of the first monomer include (meth)acrylic acid, fumaric acid, cinnamic acid, crotonic acid, itaconic acid, 4-vinylbenzoic acid, a maleic acid anhydride, and a maleic acid semi-ester. Among these, (meth) acrylic acid is preferable.

The content of the constitutional unit based on the first monomer in the polymer P is preferably 5% to 50% by mass, more preferably 10% to 40% by mass, and still more preferably 15% to 30% by mass, with respect to the total mass of the polymer P.

It is preferable that the content is 5% by mass or more from the viewpoint of exhibiting good developability and the viewpoint of controlling the edge fuse property. It is preferable that the content is 50% by mass or less from the viewpoints of the high resolution of the resist pattern and the viewpoint of the skirt shape, as well as the viewpoint of the chemical resistance of the resist pattern.

The second monomer is a monomer that is non-acidic and has at least one polymerizable unsaturated group in the molecule. Examples of the second monomer include (meth) acrylate such as methyl (meth)acrylate, ethyl (meth)acrylate, n-propyl (meth)acrylate, isopropyl (meth)acrylate, n-butyl (meth)acrylate, isobutyl (meth)acrylate, tert-butyl (meth) acrylate, 2-hydroxyethyl (meth)acrylate, 2-hydroxypropyl (meth)acrylate, cyclohexyl (meth)acrylate, 2-ethylhexyl (meth)acrylate; esters of vinyl alcohols such as vinyl acetate; and (meth)acrylonitriles. Among them, methyl (meth)acrylate, 2-ethylhexyl (meth)acrylate, or n-butyl (meth)acrylate is preferable, and methyl (meth)acrylate is more preferable.

The content of the constitutional unit based on the second monomer in the polymer P is preferably 5% to 60% by mass, more preferably 15% to 50% by mass, and still more preferably 17% to 45% by mass, with respect to the total mass of the polymer P.

A case where the polymer P contains a constitutional unit based on a monomer having an aralkyl group and/or a constitutional unit based on a monomer having styrene is preferable from the viewpoint of suppressing line width thickening and deterioration of resolution in a case where the focal position has deviated during exposure. For example, a copolymer containing a constitutional unit based on methacrylic acid, a constitutional unit based on benzyl methacrylate, and a constitutional unit based on styrene, a copolymer containing a constitutional unit based on methacrylic acid, a constitutional unit based on methyl methacrylate, a constitutional unit based on benzyl methacrylate, and a constitutional unit based on styrene, or the like is preferable.

In one aspect, the polymer P is preferably a polymer which contains 25% to 55% by mass of a constitutional unit based on a monomer having an aromatic hydrocarbon group, 20% to 35% by mass of a constitutional unit based on the first monomer, and 15% to 45% by mass of a constitutional unit based on the second monomer. In addition, in another aspect, it is preferably a polymer which contains 70% to 90% by mass of a constitutional unit based on a monomer having an aromatic hydrocarbon group and 10% to 25% by mass of a constitutional unit based on the first monomer.

The polymer P may have a branched structure and/or an alicyclic structure in the side chain. In addition, a linear structure may be included in the side chain. In a case where a monomer containing a group having a branched structure in the side chain or a monomer containing a group having an alicyclic structure in the side chain is used, it is possible to introduce a branched structure or an alicyclic structure into the side chain of polymer P. The group having an alicyclic structure may be a monocyclic ring or a polycyclic ring.

Specific examples of the monomer containing a group having a branched structure in the side chain include i-propyl (meth)acrylate, i-butyl (meth)acrylate, s-butyl (meth) acrylate, t-butyl (meth)acrylate, i-amyl (meth)acrylate, t-amyl (meth)acrylate, sec-iso-amyl (meth)acrylate, 2-octyl (meth)acrylate, 3-octyl (meth)acrylate, and t-octyl (meth) acrylate. Among these, i-propyl (meth)acrylate, i-butyl (meth)acrylate, or t-butyl methacrylate is preferable, and i-propyl methacrylate or t-butyl methacrylate is more preferable.

Specific examples of the monomer having an alicyclic structure in the side chain include an (meth)acrylate having an alicyclic hydrocarbon group having 5 to 20 carbon atoms. More specific examples thereof include (bicyclo[2.2.1]heptyl-2) (meth)acrylate, 1-adamantyl (meth)acrylate, 2-adamantyl (meth)acrylate, 3-methyl-1-adamantyl (meth)acrylate, 3,5-dimethyl-1-adamantyl (meth)acrylate, 3-ethyladamantyl (meth)acrylate, 3-methyl-5-ethyl-1-adamantyl (meth)acrylate, 3,5,8-triethyl-1-adamantyl (meth) acrylate, 3,5-dimethyl-8-ethyl-1-adamantyl (meth)acrylate, 2-methyl-2-adamantyl (meth)acrylate, 2-ethyl-2-adamantyl (meth)acrylate, 3-hydroxy-1-adamantyl (meth)acrylate, octahydro-4,7-menthanoinden-5-yl (meth)acrylate, octahydro-4,7-menthanoinden-1-ylmethyl (meth)acrylate, 1-menthyl (meth)acrylate, tricyclodecane (meth)acrylate, 3-hydroxy-2,6,6-trimethyl-bicyclo[3.1.1]heptyl (meth)acrylate, 3,7,7-trimethyl-4-hydroxy-bicyclo[4.1.0]heptyl (meth) acrylate, (nor)bornyl (meth)acrylate, isobornyl (meth)acrylate, fenchyl (meth)acrylate, 2,2,5-trimethylcyclohexyl (meth)acrylate, and cyclohexyl (meth)acrylate. Among these (meth)acrylate esters, cyclohexyl (meth)acrylate (nor)bornyl (meth)acrylate, isobornyl (meth)acrylate, 1-adamantyl (meth)acrylate, 2-adamantyl (meth)acrylate, fenchyl (meth) acrylate, 1-menthyl (meth)acrylate, or tricyclodecane (meth) acrylate is preferable, and cyclohexyl (meth)acrylate, (nor) bornyl (meth)acrylate, isobornyl (meth)acrylate, 2-adamantyl (meth)acrylate, or tricyclodecane (meth)acrylate is more preferable.

One kind of the polymer P may be used alone, or two or more kinds thereof may be used.

In a case where two or more kinds are used, it is preferable that two kinds of the polymer P containing a constitutional unit based on a monomer having an aromatic hydrocarbon group are mixed and used, or it is preferable that the polymer P containing a constitutional unit based on a monomer having an aromatic hydrocarbon group and the polymer P containing no constitutional unit based on a monomer having an aromatic hydrocarbon group are mixed and used. In the latter case, the using proportion of the polymer P containing a constitutional unit based on a monomer having an aromatic hydrocarbon group is preferably 50% by mass or more, more preferably 70% by mass or more, still more preferably 80% by mass or more, and particularly preferably 90% by mass or more, with respect to the total amount of the polymer P.

The synthesis of the polymer P is preferably carried out by adding an appropriate amount of a radical polymerization initiator such as benzoyl peroxide or azoisobutyronitrile to a solution obtained by diluting the one or more monomers described above with a solvent such as acetone, methyl ethyl ketone, or isopropanol, and then stirring and heating the resultant mixture. In some cases, the synthesis is carried out while a part of the mixture is added dropwise to the reaction solution. After completion of the reaction, a solvent may be further added to adjust the concentration to a desired level. As the synthesis means, bulk polymerization, suspension polymerization, or emulsion polymerization may be used in addition to the solution polymerization.

The glass transition temperature Tg of the polymer P is preferably 30° C. to 135° C. In a case where the polymer P having a Tg of 135° C. or lower is used, it is possible to suppress line width thickening and deterioration of resolution in a case where the focal position has deviated during exposure. From this viewpoint, the Tg of the polymer P is more preferably 130° C. or lower, still more preferably 120° C. or lower, and particularly preferably 110° C. or lower. Further, it is preferable to use the polymer P having a Tg of 30° C. or higher from the viewpoint of improving the edge fuse resistance. From this viewpoint, the Tg of the polymer P is more preferably 40° C. or higher, still more preferably 50° C. or higher, particularly preferably 60° C. or higher, and most preferably 70° C. or higher.

The negative tone photosensitive resin composition may contain a resin other than those described above.

Examples of the other resin include an acrylic resin, a styrene-acrylic copolymer, a polyurethane resin, polyvinyl alcohol, polyvinyl formal, a polyamide resin, a polyester resin, an epoxy resin, a polyacetal resin, a polyhydroxystyrene resin, a polyimide resin, a polybenzoxazole resin, a polysiloxane resin, polyethyleneimine, polyallylamine, and polyalkylene glycol.

As the polymer P, an alkali-soluble resin described in the description of the thermoplastic resin composition described later may be used.

The content of the polymer P is preferably 10% to 90% by mass, more preferably 20% to 80% by mass, still more preferably 20% to 70% by mass, particularly preferably 20% to 60% by mass, particularly still more preferably 30% to 60% by mass, and most preferably 40% to 60% by mass, with respect to the total solid content of the composition. It is preferable that the content of the polymer P is 90% by mass or less from the viewpoint of controlling the development time. On the other hand, it is preferable that the content of the polymer P is 10% by mass or more from the viewpoint of improving the edge fuse resistance.

<Polymerizable Compound>

The negative tone photosensitive resin composition contains a polymerizable compound having a polymerizable group.

In the present specification, the "polymerizable compound" means a compound different from the compound A and Polymer P described above.

The polymerizable group contained in the polymerizable compound is not particularly limited as long as it is a group involved in the polymerization reaction, and examples thereof include groups having an ethylenically unsaturated group, such as a vinyl group, an acryloyl group, a methacryloyl group, a styryl group, and a maleimide group; and groups having a cationically polymerizable group, such as an epoxy group and an oxetane group.

The polymerizable group is preferably a group having an ethylenically unsaturated group, and more preferably an acryloyl group or a methacryloyl group.

From the viewpoint that the negative tone photosensitive resin layer is more excellent in photosensitivity, the polymerizable compound is preferably a compound having one or more ethylenically unsaturated groups (an ethylenically unsaturated compound) and more preferably a compound having two or more ethylenically unsaturated groups in one molecule (a polyfunctional ethylenically unsaturated compound).

In addition, from the viewpoint of being excellent in resolution and peelability, the number of ethylenically unsaturated groups contained in one molecule of the ethylenically unsaturated compound is preferably 6 or less, more preferably 3 or less, and still more preferably 2 or less.

From the viewpoint that the balance of the photosensitivity, the resolution, and the peelability of the negative tone photosensitive resin layer is more excellent a bifunctional or trifunctional ethylenically unsaturated compound having two or three ethylenically unsaturated groups in one molecule is preferably contained, and a bifunctional ethylenically unsaturated compound having two ethylenically unsaturated groups in one molecule is more preferably contained.

From the viewpoint of excellent peelability, the content of the bifunctional ethylenically unsaturated compound with respect to the total mass of the polymerizable compound is preferably 20% by mass or more, more preferably more than 40% by mass, and still more preferably 55% by mass or more, with respect to the total solid content of the composition. The upper limit thereof is not particularly limited and may be 100% by mass. That is, all the polymerizable compounds may be bifunctional ethylenically unsaturated compounds.

In addition, the ethylenically unsaturated compound is preferably an (meth)acrylate compound having an (meth) acryloyl group as the polymerizable group.

(Polymerizable Compound B1)

It is also preferable that the negative tone photosensitive resin composition contains a polymerizable compound B1 having an aromatic ring and two ethylenically unsaturated groups. The polymerizable compound B1 is a bifunctional ethylenically unsaturated compound having one or more aromatic rings in one molecule among the above-described polymerizable compounds B.

From the viewpoint of the more excellent resolution, the mass ratio of the content of the polymerizable compound B1 to the total mass of the polymerizable compound in the negative tone photosensitive resin composition is preferably 40% by mass or more, more preferably 50% by mass or more, still more preferably 55% by mass or more, and particularly preferably 60% by mass or more. The upper limit thereof is not particularly limited. However, from the viewpoint of peelability, it is, for example, 100% by mass or less, and it is preferably 99% by mass or less, more preferably 95% by mass or less, still more preferably 90% by mass or less, and particularly preferably 85% by mass or less.

Examples of the aromatic ring contained in the polymerizable compound B1 include aromatic hydrocarbon rings such as a benzene ring, a naphthalene ring, and an anthracene ring, aromatic heterocyclic rings such as a thiophene ring, a furan ring, a pyrrole ring, an imidazole ring, a triazole ring, and a pyridine ring, and fused rings thereof, where an aromatic hydrocarbon ring is preferable, and a benzene ring is more preferable. It is noted that the aromatic ring may have a substituent.

The polymerizable compound B1 may have only one aromatic ring or may have two or more aromatic rings.

The polymerizable compound B1 preferably has a bisphenol structure from the viewpoint of improving the resolution by suppressing the swelling of the photosensitive resin layer due to the developer.

Examples of the bisphenol structure include a bisphenol A structure derived from bisphenol A (2,2-bis(4-hydroxyphenyl)propane) a bisphenol F structure derived from bisphenol F (2,2-bis(4-hydroxyphenyl)methane), and a bisphenol B structure derived from bisphenol B (2,2-bis(4-hydroxyphenyl)butane), where a bisphenol A structure is preferable.

Examples of the polymerizable compound B1 having a bisphenol structure include a compound having a bisphenol structure and two polymerizable groups (preferably (meth) acryloyl groups) bonded to both ends of the bisphenol structure.

Both ends of the bisphenol structure and the two polymerizable groups may be directly bonded or may be bonded through one or more alkyleneoxy groups. The alkyleneoxy group to be added to both ends of the bisphenol structure is preferably an ethyleneoxy group or a propyleneoxy group and more preferably an ethyleneoxy group. The number of alkyleneoxy groups to be added to the bisphenol structure is not particularly limited; however, it is preferably 4 to 16 and more preferably 6 to 14 per molecule.

The polymerizable compound B1 having a bisphenol structure is described in paragraphs 0072 to 0080 of JP2016-224162A, and the content described in this publication is incorporated in the present specification.

The polymerizable compound B1 is preferably a bifunctional ethylenically unsaturated compound having a bisphenol A structure, and it is more preferably 2,2-bis(4-((meth) acryloxypolyalkoxy)phenyl)propane.

Examples of the 2,2-bis(4-((meth)acryloxypolyalkoxy) phenyl)propane include 2,2-bis(4-(methacryloxydiethoxy) phenyl)propane (FA-324M, manufactured by Showa Denko Materials Co., Ltd.), 2,2-bis(4-(methacryloxyethoxypropoxy)phenyl)propane, 2,2-bis(4-(methacryloxypentaethoxy)phenyl)propane (BPE-500, manufactured by SHIN-NAKAMURA CHEMICAL Co., Ltd.), 2,2-bis(4-(methacryloxydodecaethoxytetrapropoxy)phenyl)propane (FA-3200MY, manufactured by Showa Denko Materials Co., Ltd.), 2,2-bis(4-(methacryloxypentadecaethoxy)phenyl)propane (BPE-1300, manufactured by SHIN-NAKAMURA CHEMICAL Co., Ltd.), 2,2-bis(4-(methacryloxydiethoxy)phenyl)propane (BPE-200, manufactured by SHIN-NAKAMURA CHEMICAL Co., Ltd.), and ethoxylated (10) bisphenol A diacrylate (NK Ester A-BPE-10, manufactured by SHIN-NAKAMURA CHEMICAL Co., Ltd.).

The polymerizable compound B1 is preferably a compound represented by General Formula (B1).

(B1)

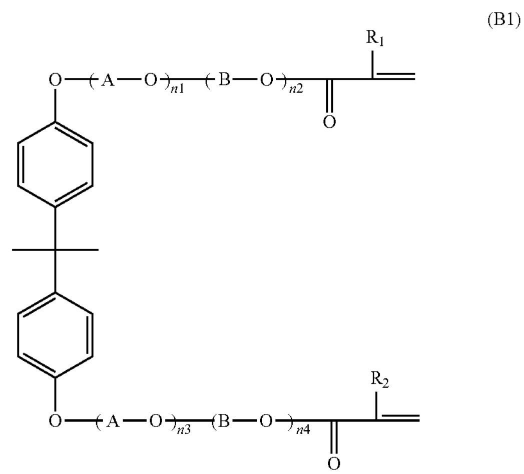

In General Formula B1, $R_1$, and $R_2$ each independently represent a hydrogen atom or a methyl group. A represents $C_2H_4$. B represents $C_3H_6$. n1 and n3 are each independently an integer of 1 to 39, and n1+n3 is an integer of 2 to 40. n2 and n4 are each independently an integer of 0 to 29, and n2+n4 is an integer of 0 to 30. The sequences of constitutional units of -(A-O)— and —(B—O)— may be a random type or a block type. Here, in a case of a block type, any one of -(A-O)— or —(B—O)— may be on the bisphenyl group side.

In one aspect, n1+n2+n3+n4 is preferably 2 to 20, more preferably 2 to 16, and still more preferably 4 to 12. In addition, n2+n4 is preferably 0 to 10, more preferably 0 to 4, still more preferably 0 to 2, and particularly preferably 0.

One kind of the polymerizable compound B1 may be used alone, or two or more kinds thereof may be used.

From the viewpoint of the more excellent resolution, the content of the polymerizable compound B1 is preferably 10% by mass or more and more preferably 20% by mass or more with respect to the total solid content of the composition. The upper limit is not particularly limited; however, it is preferably 70% by mass or less and more preferably 60% by mass or less from the viewpoint of transferability and edge fusion (a phenomenon in which a photosensitive resin exudes from an end portion of a transfer film).

The negative tone photosensitive resin composition may contain a polymerizable compound other than the above-described polymerizable compound B1.

The polymerizable compound other than the polymerizable compound B1 is not particularly limited and can be appropriately selected from known compounds. Examples thereof include a compound having one ethylenically unsaturated group in one molecule (a monofunctional ethylenically unsaturated compound), a bifunctional ethylenically unsaturated compound having no aromatic ring, and a trifunctional or higher functional ethylenically unsaturated compound.

Examples of the monofunctional ethylenically unsaturated compound include ethyl (meth)acrylate, ethylhexyl (meth)acrylate, 2-(meth)acryloyloxyethyl succinate, polyethylene glycol mono(meth)acrylate, polypropylene glycol mono(meth)acrylate, and phenoxyethyl (meth)acrylate.

Examples of the bifunctional ethylenically unsaturated compound having no aromatic ring include alkylene glycol di(meth)acrylate, polyalkylene glycol di(meth)acrylate, urethane di(meth)acrylate, and trimethylolpropane diacrylate.

Examples of the alkylene glycol di(meth)acrylate include tricyclodecanedimethanol diacrylate (A-DCP, manufactured by SHIN-NAKAMURA CHEMICAL Co., Ltd.), tricyclodecanedimethanol dimethacrylate (DCP, manufactured by SHIN-NAKAMURA CHEMICAL Co., Ltd.), 1,9-nonandiol diacrylate (A-NOD-N, manufactured by SHIN-NAKAMURA CHEMICAL Co., Ltd.), 1,6-hexanediol diacrylate (A-HD-N, manufactured by SHIN-NAKAMURA CHEMICAL Co., Ltd.), ethylene glycol dimethacrylate, 1,10-decanediol diacrylate, and neopentyl glycol di(meth)acrylate.

Examples of the polyalkylene glycol di(meth)acrylate include polyethylene glycol di(meth)acrylate, dipropylene glycol diacrylate, tripropylene glycol diacrylate, and polypropylene glycol di(meth)acrylate.

Examples of the urethane di(meth)acrylate include propylene oxide-modified urethane di(meth)acrylate, as well as ethylene oxide- and propylene oxide-modified urethane di(meth)acrylates. Examples of the commercially available product include 8UX-015A (manufactured by Taisei Fine Chemical Co., Ltd.), UA-32P (manufactured by SHIN-NAKAMURA CHEMICAL Co., Ltd.), and UA-1100H (manufactured by SHIN-NAKAMURA CHEMICAL Co., Ltd.).

Examples of the trifunctional or higher functional ethylenically unsaturated compound include dipentaerythritol (tri/tetra/penta/hexa)(meth)acrylate, pentaerythritol (tri/tetra)(meth)acrylate, trimethylolpropane tri(meth)acrylate, ditrimethylolpropane tetra(meth)acrylate, trimethylolethane tri(meth)acrylate, isocyanuric acid tri(meth)acrylate, glycerin tri(meth)acrylate, and an alkylene oxide-modified product thereof.

Here, "(tri/tetra/penta/hexa)(meth)acrylate" has a concept including tri(meth)acrylate, tetra(meth)acrylate, penta(meth)acrylate, and hexa(meth)acrylate, and "(tri/tetra)(meth)acrylate" has a concept that includes tri(meth)acrylate and tetra(meth)acrylate.

In one aspect, the negative tone photosensitive resin composition also preferably contains the above-described polymerizable compound B1 and the above-described trifunctional or higher functional ethylenically unsaturated compound, and it more preferably contains the above-described polymerizable compound B1 and two or more kinds of trifunctional or higher functional ethylenically unsaturated compounds. In this case, the mass ratio of the polymerizable compound B1 to the trifunctional or higher functional ethylenically unsaturated compound ((the total mass of the polymerizable compound B1):(the total mass of the trifunctional or higher functional ethylenically unsaturated compound)) is preferably 1:1 to 5:1, more preferably 1.2:1 to 4:1, and still more preferably 1.5:1 to 3:1.

Further, in one aspect, the negative tone photosensitive resin composition preferably contains the above-described polymerizable compound B1 and two or more kinds of trifunctional ethylenically unsaturated compounds.

Examples of the alkylene oxide-modified product of the trifunctional or higher functional ethylenically unsaturated compound include a caprolactone-modified (meth)acrylate compound (KAYARAD (registered trade name) DPCA-20 manufactured by Nippon Kayaku Co., Ltd., A-9300-1CL manufactured by SHIN-NAKAMURA CHEMICAL Co., Ltd., or the like), an alkylene oxide-modified (meth)acrylate compound (KAYARAD RP-1040 manufactured by Nippon Kayaku Co., Ltd., ATM-35E or A-9300 manufactured by SHIN-NAKAMURA CHEMICAL Co., Ltd., EBECRYL (registered trade name) 135 manufactured by DAICEL-ALLNEX Ltd., or the like), ethoxylated glycerin triacrylate (A-GLY-9E manufactured by SHIN-NAKAMURA CHEMICAL Co., Ltd. or the like), ARONIX (registered trade name) TO-2349 (manufactured by Toagosei Co., Ltd.), ARONIX M-520 (manufactured by Toagosei Co., Ltd.), and ARONIX M-510 (manufactured by Toagosei Co., Ltd.).

Further, as the polymerizable compound, a polymerizable compound having an acid group (a carboxy group or the like) may be used. The acid group may form an acid anhydride group. Examples of the polymerizable compound having an acid group include ARONIX (registered trade name) TO-2349 (manufactured by Toagosei Co., Ltd.), ARONIX (registered trade name) M-520 (manufactured by Toagosei Co., Ltd.), and ARONIX (registered trade name) M-510 (manufactured by Toagosei Co., Ltd.).

As the polymerizable compound having an acid group, for example, the polymerizable compound having an acid group described in paragraphs 0025 to 0030 of JP2004-239942A may be used.

One kind of polymerizable compound may be used alone, or two or more kinds thereof may be used.

The content of the polymerizable compound is preferably 10% to 70% by mass, more preferably 15% to 70% by mass, still more preferably 20% to 70% by mass, particularly preferably 20% to 60% by mass, and most preferably 20% to 50% by mass, with respect to the total solid content of the composition.

The molecular weight (the weight-average molecular weight in a case of having a molecular weight distribution) of the polymerizable compound (including the polymerizable compound B1) is preferably 200 to 3,000, more preferably 280 to 2,200, and still more preferably 300 to 2,200.

<Polymerization Initiator>

It is also preferable that the negative tone photosensitive resin composition contains a polymerization initiator.

The polymerization initiator is selected according to the type of the polymerization reaction, and examples thereof include a thermal polymerization initiator and a photopolymerization initiator.

The polymerization initiator may be a radical polymerization initiator or a cationic polymerization initiator.

The negative tone photosensitive resin composition preferably contains a photopolymerization initiator.

The photopolymerization initiator is a compound that initiates the polymerization of a polymerizable compound by receiving an actinic ray such as an ultraviolet ray, visible light, or an X-ray. The photopolymerization initiator is not particularly limited, and a known photopolymerization initiator can be used.

Examples of the photopolymerization initiator include a photoradical polymerization initiator and a photocationic polymerization initiator, where a photoradical polymerization initiator is preferable.

Examples of the photoradical polymerization initiator include a photopolymerization initiator having an oxime ester structure, a photopolymerization initiator having an α-aminoalkyl phenone structure, a photopolymerization initiator having an α-hydroxyalkyl phenone structure, a photopolymerization initiator having an acylphosphine oxide structure, and a photopolymerization initiator having an N-phenyl glycine structure.

Further, from the viewpoints of the photosensitivity, the visibility of the exposed portion and the non-exposed portion, and the resolution, the photosensitive resin layer preferably contains at least one selected from the group consisting of 2,4,5-triarylimidazole dimer and a derivative thereof, as a photoradical polymerization initiator. The two 2,4,5-triarylimidazole structures in the 2,4,5-triarylimidazole dimer and the derivative thereof may be the same or different from each other.

Examples of the derivative of the 2,4,5-triarylimidazole dimer include a 2-(o-chlorophenyl)-4,5-diphenylimidazole dimer, a 2-(o-chlorophenyl)-4,5-di(methoxyphenyl)imidazole dimer, a 2-(o-fluorophenyl)-4,5-diphenylimidazole dimer, a 2-(o-methoxyphenyl)-4,5-diphenylimidazole dimer, and a 2-(p-methoxyphenyl)-4,5-diphenylimidazole dimer.

Examples of the photoradical polymerization initiator which may be used include polymerization initiators described in paragraphs 0031 to 0042 of JP2011-095716A and paragraphs 0064 to 0081 of JP2015-014783A.

Examples of the photoradical polymerization initiator include ethyl dimethylaminobenzoate (DBE, CAS No. 10287-53-3), benzoin methyl ether, anisyl (p,p'-dimethoxybenzyl), TAZ-110 (product name: Midori Kagaku Co., Ltd.), benzophenone, 4,4'-bis(diethylamino)benzophenone, TAZ-111 (product name: Midori Kagaku Co., Ltd.), Irgacure OXE01, OXE02, OXE03, OXE04 (BASF SE), Omnirad 651 and 369 (product name: IGM Resins B.V.), and 2,2'-bis(2-chlorophenyl)-4,4',5,5'-tetraphenyl-1,2'-biimidazole (manufactured by Tokyo Chemical Industry Co., Ltd.).

Examples of the commercially available product of the photoradical polymerization initiator include 1-[4-(phenylthio)]-1,2-octanedione-2-(O-benzoyloxime) (product name: IRGACURE (registered trade name)), OXE-01 (manufactured by BASF SE), 1-[9-ethyl-6-(2-methylbenzoyl)-9H-carbazole-3-yl]ethanone-1-(0-acetyloxime) (product name: IRGACURE OXE-02, manufactured by BASF SE), IRGACURE OXE-03 (manufactured by BASF SE), IRGACURE OXE-04 (manufactured by BASF SE), 2-(dimethylamino)-2-[(4-methylphenyl)methyl]-1-[4-(4-morpholinyl)phenyl]-1-butanone (product name: Omnirad 379EG, IGM Resins B.V), 2-methyl-1-(4-methylthiophenyl)-2-morpholinopropane-1-one (product name: Omnirad 907, IGM Resins B.V.), 2-hydroxy-1-{4-[4-(2-hydroxy-2-methylpropionyl)benzyl]phenyl}-2-methylpropane-1-one (product name: Omnirad 127, IGM Resins B.V), 2-benzyl-2-dimethylamino-1-(4-morpholinophenyl)butanone-1 (product name: Omnirad 369, manufactured by IGM Resins B.V.), 2-hydroxy-2-methyl-1-phenylpropane-1-one (product name: Omnirad 1173, manufactured by IGM Resins B.V.), 1-hydroxycyclohexylphenylketone (product name: Omnirad 184, manufactured by IGM Resins B.V), 2,2-dimethoxy-1,2-diphenylethane-1-one (product name: Omnirad 651, manufactured by IGM Resins B.V.), 2,4,6-trimethylbenzoyl-diphenylphosphinoxide (product name: Omnirad TPO H, IGM Resins B.V), bis(2,4,6-trimethylbenzoyl)phenylphosphine oxide (product name: Omnirad 819, IGM Resins B.V), an oxime ester-based photopolymerization initiator (product name: Lunar 6, DKSH Management Ltd.), 2,2'-bis(2-chlorophenyl)-4,4',5,5'-tetraphenylbisimidazole (a 2-(2-chlorophenyl)-4,5-diphenylimidazole dimer (product name: B-CIM, manufactured by Hampford Research Inc.), a 2-(o-chlorophenyl)-4,5-diphenylimidazole dimer (product name: BCTB, manufactured by Tokyo Chemical Industry Co., Ltd.), 1-[4-(phenylthio)phenyl]-3-cyclopentylpropane-1,2-dione-2-(O-benzoyloxime) (product name: TR-PBG-305, manufactured by Changzhou Tronly New Electronic Materials Co., Ltd.), 1,2-propanedione, 3-cyclohexyl-1-[9-ethyl-6-(2-furanylcarbonyl)-9H-carbazole-3-yl]-, 2-(0-acetyloxime) (product name: TR-PBG-326, manufactured by Changzhou Tronly New Electronic Materials Co., Ltd.), and 3-cyclohexyl-1-(6-(2-(benzoyloxyimino)hexanoyl)-9-ethyl-9H-carbazole-3-yl)-propane-1,2-dione-2-(O-benzoyloxime) (product name: TR-PBG-391, manufactured by Changzhou Tronly New Electronic Materials Co., Ltd.).

The photocationic polymerization initiator (a photoacid generator) is a compound that generates an acid by receiving an actinic ray. The photocationic polymerization initiator is preferably a compound which becomes sensitive to an actinic ray having a wavelength of 300 nm or more, preferably 300 to 450 nm, and generates an acid; however, the chemical structure thereof is not limited. A photocationic polymerization initiator which does not directly become sensitive to an actinic ray having a wavelength of 300 nm or more can also be preferably used in combination with a sensitizing agent as long as it is a compound which becomes sensitive to an actinic ray having a wavelength of 300 nm or more and then generates an acid by being used in combination with the sensitizing agent.

The photocationic polymerization initiator is preferably a photocationic polymerization initiator that generates an acid having a pKa of 4 or less, more preferably a photocationic polymerization initiator that generates an acid having a pKa of 3 or less, and particularly preferably a photocationic polymerization initiator that generates an acid having a pKa of 2 or less. The lower limit value of pKa is not particularly defined; however, it is, for example, preferably −10.0 or more.

Examples of the photocationic polymerization initiator include an ionic photocationic polymerization initiator and a nonionic photocationic polymerization initiator.

Examples of the ionic photocationic polymerization initiator include onium salt compounds such as diaryliodonium salts and triarylsulfonium salts, and quaternary ammonium salts.

As the ionic photocationic polymerization initiator, the ionic photocationic polymerization initiators described in paragraphs 0114 to 0133 of JP2014-085643A may be used.

Examples of the nonionic photocationic polymerization initiator include trichloromethyl-s-triazines, diazomethane compounds, imide sulfonate compounds, and oxime sulfonate compounds. As the trichloromethyl-s-triazines, the diazomethane compounds, and the imide sulfonate compounds, the compounds described in paragraphs 0083 to 0088 of JP2011-221494A may be used. Further, as the oxime sulfonate compound, the compounds described in paragraphs 0084 to 0088 of WO2018/179640A may be used.

Examples of the photocationic polymerization initiator (the photoacid generator) include a photoacid generator described in the description of the photosensitive resin composition described later and a photoacid generator described in the description of the thermoplastic resin composition described later.

The negative tone photosensitive resin composition preferably contains a photoradical polymerization initiator, and it more preferably contains at least one selected from the group consisting of a 2,4,5-triarylimidazole dimer and a derivative thereof.

One kind of polymerization initiator may be used alone, or two or more kinds thereof may be used.

The content of the polymerization initiator (preferably, the photopolymerization initiator) is not particularly limited. However, it is preferably 0.1% by mass or more, more preferably 0.5% by mass or more, and still more preferably 1.0% by mass or more, with respect to the total solid content of the composition. The upper limit thereof is not particularly limited; however, it is preferably 20% by mass or less, more preferably 15% by mass or less, and still more preferably 10% by mass or less, with respect to the total solid content of the composition.

<Coloring Agent>

From the viewpoints of visibility of the exposed portion and the non-exposed portion, the pattern visibility after development, and the resolution, it is also preferable that the negative tone photosensitive resin composition contains a coloring agent (also referred to as a "coloring agent N") that has a maximum absorption wavelength of 450 nm or more in a wavelength range of 400 to 780 nm at the time of color development, where the maximum absorption wavelength is changed by an acid, a base, or a radical. In a case where the coloring agent N is contained, the adhesiveness to an adjacent layer (for example, the temporary support and the interlayer) is improved, and thus the resolution is more excellent although the detailed mechanism is unknown.

In the present specification, the description that "the maximal absorption wavelength of the coloring agent is changed by an acid, a base, or a radical" may mean any one of an aspect in which a coloring agent in a colored state is decolorized by an acid, a base, or a radical, an aspect in which a coloring agent in a decolorized state develops a color by an acid, a base, or a radical, or an aspect in which a colored state of a coloring agent changes to a colored state of another color tone.

Specifically, the coloring agent N may be a compound that changes from the decolorized state to develop a color upon exposure or may be a compound that changes from the colored state to be decolorized upon exposure. In this case, it may be a coloring agent of which the color developing state or decolorized state changes by an action of an acid, a base, or a radical, which is generated upon exposure in the photosensitive resin layer, or it may be a coloring agent of which the color developing state or decolorized state changes due to a change in the state (for example, pH) of the inside of the photosensitive resin layer, the change being caused by an acid, a base, or a radical. Further, it may be a coloring agent of which the color developing state or decolorized state changes by directly receiving an acid, a base, or a radical as a stimulus without undergoing exposure.

Among the above, the coloring agent N is preferably a coloring agent of which the maximum absorption wavelength is changed by an acid or a radical, and more preferably a coloring agent of which the maximum absorption wavelength is changed by a radical, from the viewpoints of the visibility of the exposed portion and the non-exposed portion and the resolution.

From the viewpoints of the visibility of the exposed portion and the non-exposed portion and the resolution, the negative tone photosensitive resin composition preferably contains both a coloring agent of which the maximum absorption wavelength is changed by a radical as the coloring agent N and a photoradical polymerization initiator.

Further, from the viewpoint of the visibility of the exposed portion and the non-exposed portion, the coloring agent N is preferably a coloring agent that develops color by an acid, a base, or a radical.

Examples of the color development mechanism of the coloring agent N include an aspect in which a photoradical polymerization initiator, a photocationic polymerization initiator (a photoacid generator), or a photobase generator is added to the photosensitive resin layer so that a radical-reactive coloring agent, an acid-reactive coloring agent, or a base-reactive coloring agent (for example, a leuco coloring agent) develops a color by a radical, an acid, or a base, which is generated after exposure from the photoradical polymerization initiator, the photocationic polymerization initiator, or the photobase generator.

From the viewpoint of the visibility of the exposed portion and the non-exposed portion, the coloring agent N preferably has a maximal absorption wavelength of 550 nm or more, more preferably 550 to 700 nm, and still more preferably 550 to 650 nm, in a wavelength range of 400 to 780 nm at the time of color development.

In addition, the coloring agent N may have only one maximal absorption wavelength in a wavelength range of 400 to 780 nm at the time of color development or may have two or more coloring agents N. In a case where the coloring agent N has two or more maximal absorption wavelengths in a wavelength range of 400 to 780 nm at the time of color development, it suffices that the maximal absorption wavelength having the highest absorbance among the two or more maximal absorption wavelengths may be 450 nm or more.

The maximal absorption wavelength of the coloring agent N is obtained by measuring a transmission spectrum of a solution (solution temperature: 25° C.) containing the coloring agent N in a range of 400 to 780 nm using a spectrophotometer: UV3100 (manufactured by Shimadzu Corporation) in atmospheric air and detecting a wavelength (a maximal absorption wavelength) at which the intensity of light is minimal.

Examples of the coloring agent that develops a color or is decolorized under exposure include a leuco compound.

Examples of the coloring agent that is decolorized under exposure include a leuco compound, a diarylmethane-based coloring agent, an oxazine-based coloring agent, a xanthene-based coloring agent, an iminonaphthoquinone-based coloring agent, an azomethine-based coloring agent, and an anthraquinone-based coloring agent.

From the viewpoint of the visibility of the exposed portion and the non-exposed portion, the coloring agent N is preferably a leuco compound.

Examples of the leuco compound include a leuco compound having a triarylmethane skeleton (a triarylmethane-based coloring agent), a leuco compound having a spiropyran skeleton (a spiropyran-based coloring agent), a leuco compound having a fluoran skeleton (a fluoran-based coloring agent), a leuco compound having a diarylmethane skeleton (a diarylmethane-based coloring agent), a leuco compound having a rhodamine lactam skeleton (a rhodamine lactam-based coloring agent), a leuco compound having an indolyl phthalide skeleton (an indolyl phthalide-based coloring agent), and a leuco compound having a leuco auramine skeleton (a leuco auramine-based coloring agent).

Among them, a triarylmethane-based coloring agent or a fluoran-based coloring agent is preferable, and a leuco compound having a triphenylmethane skeleton (a triphenylmethane-based coloring agent) or a fluoran-based coloring agent is more preferable.

From the viewpoint of the visibility of the exposed portion and the non-exposed portion, the leuco compound preferably has a lactone ring, a sultine ring, or a sultone ring. As a result, the lactone ring, the sultine ring, or the sultone ring contained in the leuco compound is reacted with a radical generated from the photoradical polymerization initiator or an acid generated from the photocationic polymerization initiator to change the leuco compound into a closed ring state, thereby being decolorized, or change the leuco compound to an open ring state, whereby a color is developed. It is preferable that the leuco compound is a compound having a lactone ring, a sultine ring, or a sultone ring, where the lactone ring, the sultine ring, or the sultone ring is opened by a radical or an acid to develop a color, and it is more preferable that it is a compound having a lactone ring, where the lactone ring is opened by a radical or an acid to develop a color.

Examples of the coloring agent N include the following dyes and leuco compounds.

Among the coloring agents N, specific examples of the dye include Brilliant green, Ethyl violet, Methyl green, Crystal violet, Basic fuchsine, Methyl violet 2B, Quinaldine red, Rose bengal, Metanil yellow, thymol sulfonphthalein, Xylenol blue, Methyl orange, Paramethyl red, Congo red, Benzopurpurine 4B, a-Naphthyl red, Nile blue 2B, Nile blue A, Methyl violet, Malachite green, Parafuchsine, Victoria pure blue-naphthalene sulfonate, Victoria pure blue BOH (manufactured by HODOGAYA CHEMICAL CO., LTD.), Oil blue #603 (manufactured by ORIENT CHEMICAL INDUSTRIES CO., LTD.), Oil pink #312 (manufactured by ORIENT CHEMICAL INDUSTRIES CO., LTD.), Oil red 5B (manufactured by ORIENT CHEMICAL INDUSTRIES CO., LTD.), Oil scarlet #308 (manufactured by ORIENT CHEMICAL INDUSTRIES CO., LTD.), Oil red OG (manufactured by ORIENT CHEMICAL INDUSTRIES CO., LTD.), Oil red RR (manufactured by ORIENT CHEMICAL INDUSTRIES CO., LTD.), Oil green #502 (manufactured by ORIENT CHEMICAL INDUSTRIES CO., LTD.), Spiron red BEH special (manufactured by HODOGAYA CHEMICAL CO., LTD.), m-Cresol purple, Cresol red, rhodamine B, rhodamine 6G, sulforhodamine B, auramine, 4-p-diethylaminophenyliminonaphthoquinone, 2-carboxyanilino-4-p-diethylaminophenyliminonaphthoquinone, 2-carboxystearylamino-4-p-N,N-bis(hydroxyethyl) amino-phenyliminonaphthoquinone, 1-phenyl-3-methyl-4-p-diethylaminophenylimino-5-pyrazolone, and 1-β-naphthyl-4-p-diethylaminophenylimino-5-pyrazolone.

Among the coloring agents N, specific examples of the leuco compound include p,p',p"-hexamethyltriaminotriphenylmethane (Leucocrystal violet), Pergascript blue SRB (manufactured by Ciba-Geigy AG), Crystal violet lactone, Malachite green lactone, benzoyl leucomethylene blue, 2-(N-phenyl-N-methylamino)-6-(N-p-tolyl-N-ethyl) aminofluoran, 2-anilino-3-methyl-6-(N-ethyl-p)-toluidino) fluoran, 3,6-dimethoxyfluoran, 3-(N,N-diethylamino)-5-methyl-7-(N,N-dibenzylamino) fluoran, 3-(N-cyclohexyl-N-methyl)amino)-6-methyl-7-anilinofluoran, 3-(N,N-diethylamino)-6-methyl-7-anilinofluoran, 3-(N,N-diethylamino)-6-methyl-7-xylidinofluoran, 3-(N,N-diethylamino)-6-methyl-7-chlorofluoran, 3-(N,N-diethylamino)-6-methoxy-7-aminofluoran, 3-(N,N-diethylamino)-7-(4-chloroanilino) fluoran, 3-(N,N-diethylamino)-7-chlorofluoran, 3-(N,N-diethylamino)-7-benzylaminofluoran, 3-(N,N-diethylamino)-7,8-benzofluoran, 3-(N,N-dibutylamino)-6-methyl-7-anilinofluoran, 3-(N,N-dibutylamino)-6-methyl-7-xylidinofluoran, 3-piperidino-6-methyl-7-anilinofluoran, 3-pyrrolidino-6-methyl-7-anilinofluoran, 3,3-bis(1-ethyl-2-methylindole-3-yl)phthalide, 3,3-bis(1-n-butyl-2-methylindole-3-yl)phthalide, 3,3-bis(p-dimethylaminophenyl)-6-dimethylaminophthalide, 3-(4-diethylamino-2-ethoxyphenyl)-3-(1-ethyl-2-methylindole-3-yl)-4-azaphthalide, 3-(4-diethylaminophenyl)-3-(1-ethyl-2-methylindole-3-yl) phthalide, and 3',6'-bis(diphenylamino) spiroisobenzofuran-1 (3H),9'-[9H]xanthene-3-one.

From the viewpoints of visibility of the exposed portion and the non-exposed portion, the pattern visibility after development, and the resolution, the coloring agent N is preferably a coloring agent of which the maximum absorption wavelength is changed by a radical, and more preferably a coloring agent that develops a color by a radical.

The coloring agent N is preferably Leucocrystal violet, Crystal violet lactone, Brilliant green, or Victoria pure blue-naphthalene sulfonate.

One kind of the coloring agent N may be used alone, or two or more kinds thereof may be used.

From the viewpoints of visibility of the exposed portion and the non-exposed portion, the pattern visibility after development, and the resolution, the content of the coloring agent N is preferably 0.1% by mass or more, more preferably 0.1% to 10% by mass, still more preferably 0.1% to 5% by mass, and particularly preferably 0.1% to 1% by mass, with respect to the total solid content of the composition.

The content of the coloring agent N means the content of the coloring agent in a case where the whole coloring agent N contained in the total solid content of the composition is in a colored state. Hereinafter, a method of quantifying the content of the coloring agent N will be described by taking a coloring agent that develops color by a radical as an example. 0.001 g and 0.01 g of a coloring agent are each dissolved in 100 mL of methyl ethyl ketone to prepare a solution. A photoradical polymerization initiator Irgacure OXE01 (product name, BASF Japan Ltd.) is added to each of the obtained solutions, and radicals are generated by the irradiation with light of 365 nm to bring the whole coloring agent into a colored state. Then, in the atmospheric air, the absorbance of each solution having a liquid temperature of 25° C. is measured using a spectrophotometer (UV3100, manufactured by Shimadzu Corporation), and a calibration curve is created.

Next, the absorbance of the solution in which the whole coloring agent has been caused to develop a color is measured by the same method as the above except that 3 g of the solid content of the composition is dissolved in methyl ethyl ketone instead of the coloring agent. From the obtained absorbance of the solution containing the solid content of the composition, the content of the coloring agent contained in the solid content of the composition is calculated based on the calibration curve.

It is noted that 3 g of the solid content of the composition is the same as 3 g of a layer (a negative tone photosensitive resin layer or the like) formed of the composition.

<Thermal crosslinking Compound>

From the viewpoint of the hardness of the cured film to be obtained and the pressure-sensitive adhesiveness of the uncured film to be obtained, the negative tone photosensitive resin composition preferably contains a thermal crosslinking compound. In this specification, the thermal crosslinking compound having an ethylenically unsaturated group described later shall be not treated as a polymerizable compound but be treated as a thermal crosslinking compound. Examples of the thermal crosslinking compound include a methylol compound and a blocked isocyanate compound. Among these, from the viewpoint of the hardness of the cured film to be obtained and the pressure-sensitive adhesiveness of the uncured film to be obtained, a blocked isocyanate compound is preferable.

By the way, the blocked isocyanate compound reacts with a hydroxy group and a carboxy group. As a result, for example, in a case where the resin and/or the polymerizable compound has at least one of a hydroxy group or a carboxy group, a film to be formed has a low hydrophilicity, and thus in a case where a film obtained by curing the negative tone photosensitive resin layer is used as a protective film, the function thereof tends to be enhanced. The blocked isocyanate compound refers to a "compound having a structure in which the isocyanate group of isocyanate is protected (so-called masked) by a blocking agent".

The dissociation temperature of the blocked isocyanate compound is not particularly limited; however, it is preferably 100° C. to 160° C. and more preferably 130° C. to 150° C. The dissociation temperature of blocked isocyanate means "temperature at an endothermic peak accompanied with a deprotection reaction of blocked isocyanate, in a case where the measurement is carried out by differential scanning calorimetry (DSC) analysis using a differential scanning calorimeter".

As the differential scanning calorimeter, for example, a differential scanning calorimeter (model: DSC6200) manufactured by Seiko Instruments Inc. can be suitably used. However, the differential scanning calorimeter is not limited thereto.

Examples of the blocking agent having a dissociation temperature of 100° C. to 160° C. include an active methylene compound [diester malonate (such as dimethyl malonate, diethyl malonate, di-n-butyl malonate, or di-2-ethylhexyl malonate)] and an oxime compound (a compound having a structure represented by —C(═N—OH)— in the molecule, such as formaldoxime, acetoaldoxime, acetoxime, methyl ethyl ketoxime, or cyclohexanoneoxime). Among these, the blocking agent having a dissociation temperature of 100° C. to 160° C. is preferably, for example, at least one selected from oxime compounds from the viewpoint of storage stability.

The blocked isocyanate compound preferably has an isocyanurate structure, for example, from the viewpoint of improving the brittleness of the film and improving the adhesion force to a transferred material.

The blocked isocyanate compound having an isocyanurate structure can be obtained, for example, by isocyanurate-forming and protecting hexamethylene diisocyanate. Among the blocked isocyanate compounds having an isocyanurate structure, a compound having an oxime structure using an oxime compound as a blocking agent is preferable from the viewpoint that the dissociation temperature can be easily set in a preferred range and the development residue can be easily reduced, as compared with a compound having no oxime structure.

The blocked isocyanate compound may have a polymerizable group.

The polymerizable group is not particularly limited, and a known polymerizable group can be used, where a radically polymerizable group is preferable.

Examples of the polymerizable group include an (meth)acryloxy group, an (meth)acrylamide group, an ethylenically unsaturated group such as styryl group, and an epoxy group such as a glycidyl group.

Among them, the polymerizable group is preferably an ethylenically unsaturated group, more preferably an (meth)acryloxy group, and still more preferably an acryloxy group.

A commercially available product can be used as the blocked isocyanate compound.

Examples of the commercially available blocked isocyanate compound include compounds such as Karenz (registered trade name), AOI-BM, Karenz (registered trade name), MOI-BM, Karenz (registered trade name), and MOI-BP (all manufactured by Showa Denko K.K.); and block type DURANATE series (for example, DURANATE (registered trade name)), TPA-B80E, DURANATE (registered trade name), and WT32-B75P, manufactured by Asahi Kasei Chemicals Co., Ltd.).

Further, as the blocked isocyanate compound, a compound having the following structure can also be used.

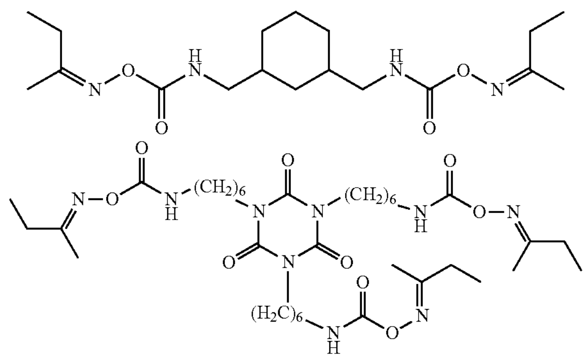

One kind of thermal crosslinking compound may be used alone, or two or more kinds thereof may be used.

In a case where the negative tone photosensitive resin composition contains a thermal crosslinking compound, the content of the thermal crosslinking compound is preferably 1% by mass to 50% by mass and more preferably 5% by mass to 30% by mass with respect to the total solid content of the composition.

<Solvent>

It is also preferable that the negative tone photosensitive resin composition contains a solvent.

The solvent contained in the negative tone photosensitive resin composition is not particularly limited as long as each component (the compound A, the polymer P, and/or the like) other than the solvent can be dissolved or dispersed, and a known solvent can be used. Examples of the solvent include an alkylene glycol ether solvent, an alkylene glycol ether acetate solvent, an alcohol solvent (methanol, ethanol, or the like), a ketone solvent (acetone, methyl ethyl ketone, or the like), an aromatic hydrocarbon solvent (toluene or the like), an aprotonic polar solvent (N,N-dimethylformamide or the like), a cyclic ether solvent (tetrahydrofuran or the like), an ester solvent (n-propyl acetate or the like), an amide solvent, a lactone solvent, and a mixed solvent containing two or more of these.

In a case of producing a transfer film including a temporary support, a thermoplastic resin layer, an interlayer (a water-soluble resin layer), and a negative tone photosensitive resin layer, the negative tone photosensitive resin composition preferably contains at least one selected from the group consisting of an alkylene glycol ether solvent and an alkylene glycol ether acetate solvent. Among the above, the solvent is more preferably a mixed solvent containing at least one solvent selected from the group consisting of an alkylene glycol ether solvent and an alkylene glycol ether acetate solvent and at least one solvent selected from the group consisting of a ketone solvent and a cyclic ether solvent, and still more preferably a mixed solvent containing at least three solvents of at least one solvent selected from the group consisting of an alkylene glycol ether solvent and an alkylene glycol ether acetate solvent, a ketone solvent, and a cyclic ether solvent.

Examples of the alkylene glycol ether solvent include ethylene glycol monoalkyl ether, ethylene glycol dialkyl ether, propylene glycol monoalkyl ether (propylene glycol monomethyl ether acetate or the like), propylene glycol dialkyl ether, diethylene glycol dialkyl ether, dipropylene glycol monoalkyl ether, and dipropylene glycol dialkyl ether.

Examples of the alkylene glycol ether acetate solvent include ethylene glycol monoalkyl ether acetate, propylene glycol monoalkyl ether acetate, diethylene glycol monoalkyl ether acetate, and dipropylene glycol monoalkyl ether acetate.

As the solvent, the solvents described in paragraphs 0092 to 0094 of WO2018/179640A and the solvents described in paragraph 0014 of JP2018-177889A may be used, the contents of which are incorporated in the present specification.

One kind of solvent may be used alone, or two or more kinds thereof may be used. The content of the solvent is preferably 50 to 1,900 parts by mass, more preferably 100 to 1,200 parts by mass, and still more preferably 100 to 900 parts by mass, with respect to 100 parts by mass of the total solid content of the composition.

<Additive>

The negative tone photosensitive resin composition may contain a known additive in addition to the above-described components, as necessary.

Examples of the additive include a radical polymerization inhibitor, a sensitizing agent, a plasticizer, a heterocyclic compound (triazole or the like), benzotriazoles, carboxybenzotriazoles, pyridines (isonicotinamide and the like), a purine base (adenine or the like), and a surfactant.

One kind of each additive may be used alone, or two or more kinds thereof may be used.

The negative tone photosensitive resin composition may contain a radical polymerization inhibitor.

Examples of the radical polymerization inhibitor include the thermal polymerization inhibitors described in paragraph 0018 of JP4502784B. Among them, phenothiazine, phenoxazine, or 4-methoxyphenol is preferable. Examples of other radical polymerization inhibitors include naphthylamine, cuprous chloride, a nitrosophenylhydroxyamine aluminum salt, and diphenylnitrosamine. It is preferable to use a nitrosophenylhydroxyamine aluminum salt as a radical polymerization inhibitor so that the sensitivity of the negative tone photosensitive resin layer is not impaired.

Examples of the benzotriazoles include 1,2,3-benzotriazole, 1-chloro-1,2,3-benzotriazole, bis(N-2-ethylhexyl)aminomethylene-1,2,3-benzotriazole, bis(N-2-ethylhexyl)aminomethylene-1,2,3-tolyltriazole, and bis(N-2-hydroxyethyl)aminomethylene-1,2,3-benzotriazole.

Examples of the carboxybenzotriazoles include 4-carboxy-1,2,3-benzotriazole, 5-carboxy-1,2,3-benzotriazole, N—(N,N-di-2-ethylhexyl)aminomethylenecarboxybenzotriazole, N—(N,N-di-2-hydroxyethyl)aminomethylenecarboxybenzotriazole, and N—(N,N-di-2-ethylhexyl)aminoethylenecarboxybenzotriazole. As the carboxybenzotriazoles, it is possible to use, for example, a commercially available product such as CBT-1 (product name, JOHOKU CHEMICAL Co., Ltd.).

The total content of the radical polymerization inhibitor, the benzotriazols, and the carboxybenzotriazols is preferably 0.01% to 3% by mass and more preferably 0.05% to 1% by mass in a case where the total solid content mass of the composition is set to 100% by mass. It is preferable to set the above content to 0.01% by mass or more from the viewpoint of imparting storage stability to the composition. On the other hand, it is preferable that the content is 3% by mass or less from the viewpoint of the maintenance of the sensitivity and the suppression of decolorization of the dye.

The negative tone photosensitive resin composition may contain a sensitizing agent.

The sensitizing agent is not particularly limited, and a known sensitizing agent, a dye, or a pigment can be used. Examples of the sensitizing agent include a dialkylaminobenzophenone compound, a pyrazoline compound, an anthracene compound, a coumarin compound, a xanthone compound, a thioxanthone compound, an acridone compound, an oxazole compound, a benzoxazole compound, a thiazole compound, a benzothiazole compound, a triazole compound (for example, 1,2,4-triazole), a stilbene compound, a triazine compound, a thiophene compound, a naphthalimide compound, a triarylamine compound, and an aminoacridine compound.

One kind of sensitizing agent may be used alone, or two or more kinds thereof may be used.

In a case where the negative tone photosensitive resin composition contains a sensitizing agent, the content of the sensitizing agent can be appropriately selected depending on the intended purpose; however, from the viewpoints of improving the sensitivity to the light source and improving the curing rate by balancing the polymerization rate and the chain transfer, it is preferably 0.01% to 5% by mass and more preferably 0.05% to 1% by mass with respect to the total mass of the photosensitive resin layer.

The negative tone photosensitive resin composition may contain at least one selected from the group consisting of a plasticizer and a heterocyclic compound.

Examples of the plasticizer and the heterocyclic compound include the compounds described in paragraphs 0097 to 0103 and 0111 to 0118 of WO2018/179640A.

In addition, the negative tone photosensitive resin composition may further contain known additives such as metal oxide particles, an antioxidant, a dispersing agent, an acid proliferation agent, a development accelerator, a conductive fiber, an ultraviolet absorbing agent, a thickener, a crosslinking agent, and an organic or inorganic precipitation inhibitor. The additives contained in the negative tone photosensitive resin composition are described in paragraphs 0165 to 0184 of JP2014-085643A, and the content of this publication is incorporated in the present specification.

From the viewpoint of improving reliability and laminating property, the content of water in the negative tone photosensitive resin composition is preferably 0.01% to 1.0% by mass and more preferably 0.05% to 0.5% by mass.

<Physical Properties of the Formed Layer and the Like>

The method of applying the negative tone photosensitive resin composition is not particularly limited, and the negative tone photosensitive resin composition may be applied by a known method. Examples of the coating method include slit coating, spin coating, curtain coating, and inkjet coating.

In addition, the composition layer (the negative tone photosensitive resin layer) formed of the negative tone photosensitive resin composition may be formed by applying the negative tone photosensitive resin composition onto an object to be coated such as a cover film, which will be described later, and carrying out drying.

The layer thickness (the film thickness) of the negative tone photosensitive resin layer is generally 0.1 to 300 μm, preferably 0.2 to 100 μm, more preferably 0.5 to 50 μm, still more preferably 0.5 to 15 μm, particularly preferably 0.5 to 10 μm, and most preferably 0.5 to 8 μm. This makes it possible for the developability of the negative tone photosensitive resin layer to be improved and makes it possible for the resolution to be improved.

In addition, in one aspect, it is preferably 0.5 to 5 μm, more preferably 0.5 to 4 μm, and still more preferably 0.5 to 3 μm.

In addition, from the viewpoint of excellent adhesiveness, the light transmittance of light having a wavelength of 365 nm in the negative tone photosensitive resin layer is preferably 10% or more, more preferably 30% or more, and still more preferably 50% or more. The upper limit thereof is not particularly limited; however, it is preferably 99.9% or less.

(Impurity and the Like)

The negative tone photosensitive resin layer formed of the negative tone photosensitive resin composition may contain a predetermined amount of impurities.

Specific examples of the impurities include sodium, potassium, magnesium, calcium, iron, manganese, copper, aluminum, titanium, chromium, cobalt, nickel, zinc, tin, halogen, and ions thereof. Among these, a halide ion, a sodium ion, and a potassium ion are easily mixed as impurities, and thus it is preferable to set the content of the impurities to the following content.

The content of impurities in the negative tone photosensitive resin layer is preferably 80 ppm or less, more preferably 10 ppm or less, and still more preferably 2 ppm or less in terms of mass. The content of the impurities can be 1 ppb or more or may be 0.1 ppm or more in terms of mass.

Examples of the method of keeping the impurities in the above range include selecting a raw material having a low content of impurities as a raw material for the composition, preventing the impurities from being mixed during the production of the negative tone photosensitive resin layer, and washing and removing the impurities. Such a method makes it possible for the amount of impurities to be kept within the above range.

The impurities can be quantified by a known method such as inductively coupled plasma (ICP) emission spectroscopy, atomic absorption spectroscopy, and ion chromatography.

In the negative tone photosensitive resin layer, it is preferable that the content of the compound such as benzene, formaldehyde, trichloroethylene, 1,3-butadiene, carbon tetrachloride, chloroform, N,N-dimethylformamide, N,N-dimethylacetamide, or hexane is low. The content of this compound with respect to the total mass of the composition layer is preferably 100 ppm or less, more preferably 20 ppm or less, and still more preferably 4 ppm or less in terms of mass.

The lower limit thereof can be 10 ppb or more or can be 100 ppb or more in terms of mass with respect to the total mass of the negative tone photosensitive resin layer. The content of these compounds can be suppressed in the same manner as in the above-described metal as impurities. Further, it can be quantified by a known measuring method.

From the viewpoint of improving reliability and laminating property, the content of water in the negative tone photosensitive resin layer is preferably 0.01% to 1.0% by mass and more preferably 0.05% to 0.5% by mass.

[Thermoplastic Resin Composition]

The composition according to the embodiment of the present invention may be a thermoplastic resin composition that is capable of forming a thermoplastic resin layer. For example, in a transfer film having a temporary support and a photosensitive resin layer (a layer consisting of the negative tone photosensitive resin composition described above or the like), it is preferable that the thermoplastic resin layer is formed between the temporary support and the photosensitive resin layer.

In a case where the transfer film includes a thermoplastic resin layer between the temporary support and the photosensitive resin layer, the followability to the substrate in the affixing step of the transfer film and the substrate is improved, and the mixing of air bubbles between the substrate and the transfer film is suppressed, whereby the adhesiveness to an adjacent layer (for example, the temporary support) can be improved.

The thermoplastic resin composition as the composition according to the embodiment of the present invention is intended to have an aspect in which the alkali-soluble resin in the composition is a thermoplastic resin. It is noted that the thermoplastic resin composition as the composition according to the embodiment of the present invention may contain another thermoplastic resin other than the alkali-soluble resin which is a thermoplastic resin.

It is noted that hereinafter, the alkali-soluble resin which is a thermoplastic resin may be referred to as an "alkali-soluble thermoplastic resin".

That is, the composition according to the embodiment of the present invention may be a thermoplastic resin composition containing the compound A, an alkali-soluble thermoplastic resin, and a polymerizable compound.

<Alkali-Soluble Thermoplastic Resin>

Examples of the alkali-soluble resin (the alkali-soluble thermoplastic resin) which is a thermoplastic resin include an acrylic resin, a polystyrene resin, a styrene-acrylic copolymer, a polyurethane resin, polyvinyl alcohol, polyvinyl formal, a polyamide resin, a polyester resin, an epoxy resin, a polyacetal resin, a polyhydroxystyrene resin, a polyimide resin, a polybenzoxazole resin, a polysiloxane resin, polyethyleneimine, polyallylamine, and polyalkylene glycol.

The alkali-soluble thermoplastic resin is preferably an acrylic resin from the viewpoint of developability and adhesiveness to an adjacent layer.

Here, the acrylic resin means a resin having at least one constitutional unit selected from the group consisting of a constitutional unit derived from (meth)acrylic acid, a constitutional unit derived from a (meth)acrylic acid ester, and a constitutional unit derived from a (meth)acrylic acid amide.

In the acrylic resin, the total content of the constitutional unit derived from (meth)acrylic acid, the constitutional unit derived from a (meth)acrylic acid ester, and the constitutional unit derived from a (meth)acrylic acid amide is preferably 50% by mass or more with respect to the total mass the acrylic resin.

Among the above, the total content of the constitutional unit derived from (meth)acrylic acid and the constitutional unit derived from a (meth)acrylic acid ester is preferably 30% to 100% by mass and more preferably 50% to 100% by mass with respect to the total mass of the acrylic resin.

Further, the alkali-soluble thermoplastic resin is preferably a polymer having an acid group.

Examples of the acid group include a carboxy group, a sulfo group, a phosphoric acid group, and a phosphonic acid group, where a carboxy group is preferable.

From the viewpoint of developability, the alkali-soluble thermoplastic resin is more preferably an alkali-soluble resin having an acid value of 60 mgKOH/g or more and still more preferably a carboxy group-containing acrylic resin having an acid value of 60 mgKOH/g or more.

The upper limit of the acid value of the alkali-soluble resin is not particularly limited; however, it is preferably 300 mgKOH/g or less, more preferably 250 mgKOH/g or less, still more preferably 200 mgKOH/g or less, and particularly preferably 150 mgKOH/g or less.

The carboxy group-containing acrylic resin having an acid value of 60 mgKOH/g or more is not particularly limited and can be appropriately selected from known resins and used. Examples thereof include an alkali-soluble resin which is the carboxy group-containing acrylic resin having an acid value of 60 mgKOH/g or more among the polymers described in paragraph 0025 of JP2011-095716A, the carboxy group-containing acrylic resin having an acid value of 60 mgKOH/g or more among the polymers described in paragraphs 0033 to 0052 of JP2010-237589A, and the carboxy group-containing acrylic resin having an acid value of 60 mgKOH/g or more among the binder polymers described in paragraphs 0053 to 0068 of JP2016-224162A.

The copolymerization ratio of the constitutional unit having a carboxy group in the above-described carboxy group-containing acrylic resin is preferably 5% to 50% by mass, more preferably 10% to 40% by mass, and still more preferably 12% to 30% by mass, with respect to the total mass of the acrylic resin.

The alkali-soluble thermoplastic resin is particularly preferably an acrylic resin having a constitutional unit derived from (meth)acrylic acid from the viewpoints of developability and adhesiveness to an adjacent layer.

The alkali-soluble thermoplastic resin may have a reactive group. It suffices that the reactive group is any addition-polymerizable group. Examples of the reactive group include an ethylenically unsaturated group; a polycondensable group such as a hydroxy group or a carboxy group; and a polyaddition reactive group such as an epoxy group or a (blocked) isocyanate group.

The weight-average molecular weight (Mw) of the alkali-soluble thermoplastic resin is preferably 1,000 or more, more preferably 10,000 to 100,000, and still more preferably 20,000 to 50,000.

One kind of alkali-soluble thermoplastic resin may be used alone, or two or more kinds thereof may be used.

From the viewpoint of developability and adhesiveness to an adjacent layer, the content of the alkali-soluble thermoplastic resin is preferably 10% to 99% by mass, more preferably 20% to 90% by mass, still more preferably 40% to 80% by mass, and particularly preferably 50% to 75% by mass, with respect to the total solid content of the composition.

<Coloring Agent>

The thermoplastic resin layer preferably contains a coloring agent (hereinafter, simply also referred to as a "coloring agent B") that has a maximum absorption wavelength of 450 nm or more in a wavelength range of 400 to 780 nm at the time of color development, where the maximum absorption wavelength is changed by an acid, a base, or a radical.

The preferred aspect of the coloring agent B is the same as the preferred aspect of the coloring agent N described above, except for the points described later.

From the viewpoints of the visibility of the exposed portion and the non-exposed portion and the resolution, the coloring agent B is preferably a coloring agent of which the maximum absorption wavelength is changed by an acid or a radical, and more preferably a coloring agent of which the maximum absorption wavelength is changed by an acid.

From the viewpoints of the visibility of the exposed portion and the non-exposed portion and the resolution, the thermoplastic layer preferably contains both a coloring agent of which the maximum absorption wavelength is changed by an acid as the coloring agent B and a compound that generates an acid due to light described later.

One kind of the coloring agent B may be used alone, or two or more kinds thereof may be used.

From the viewpoint of visibility of the exposed portion and the non-exposed portion, the content of the coloring agent B is preferably 0.2% by mass or more, more preferably 0.2% to 6% by mass, still more preferably 0.2% to 5% by mass, and particularly preferably 0.25% to 3.0% by mass, with respect to the total solid content of the composition.

Here, the content of the coloring agent B means the content of the coloring agent in a case where the whole coloring agent B contained in the thermoplastic resin layer is in a colored state. Hereinafter, a method of quantifying the content of the coloring agent B will be described by taking a coloring agent that develops color by a radical as an example.

0.001 g and 0.01 g of a coloring agent are each dissolved in 100 mL of methyl ethyl ketone to prepare a solution. A photoradical polymerization initiator Irgacure OXE01 (product name, BASF Japan Ltd.) is added to each of the obtained solutions, and radicals are generated by the irradiation with light of 365 nm to bring the whole coloring agent into a colored state. Then, in the atmospheric air, the absorbance of each solution having a liquid temperature of 25° C. is measured using a spectrophotometer (UV3100, manufactured by Shimadzu Corporation), and a calibration curve is created.

Next, the absorbance of the solution in which the whole coloring agent has been caused to develop a color is measured by the same method as the above except that 0.1 g of the solid content of the composition is dissolved in methyl ethyl ketone instead of the coloring agent. From the obtained absorbance of the solution containing the solid content of the composition, the amount of the coloring agent contained in the solid content of the composition is calculated based on the calibration curve.

It is noted that 3 g of the solid content of the composition is the same as 3 g of a layer (a thermoplastic resin layer or the like) formed of the composition.

<Compound that Generates Acid, Base, or Radical Due to Light>

The thermoplastic resin composition may contain a compound that generates an acid, a base, or a radical due to light (hereinafter, also simply referred to as a "compound C").

The compound C is preferably a compound that generates an acid, a base, or a radical by receiving an actinic ray such as an ultraviolet ray or visible light.

As the compound C, a known photoacid generator, a known photobase generator, and a known photoradical polymerization initiator (photoradical generator) can be used. Among the above, a photoacid generator is preferable.

(Photoacid Generator)

From the viewpoint of resolution, the thermoplastic resin composition preferably contains a photoacid generator.

Examples of the photoacid generator include a photocationic polymerization initiator which may be contained in the above-described negative tone photosensitive resin composition, and the same applies to the preferred aspect thereof except for the points described later.

From the viewpoints of sensitivity and resolution, the photoacid generator preferably contains at least one compound selected from the group consisting of an onium salt compound and an oxime sulfonate compound, and from the viewpoints of sensitivity, resolution, and adhesiveness, it more preferably contains an oxime sulfonate compound.

Further, the photoacid generator is preferably a photoacid generator having the following structure.

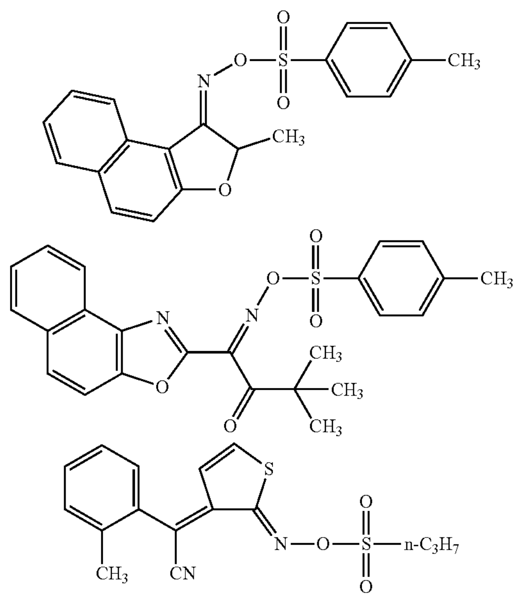

(Photoradical Polymerization Initiator)

The thermoplastic resin composition may contain a photoradical polymerization initiator.

Examples of the photoradical polymerization initiator include a photoradical polymerization initiator which may be contained in the above-described negative tone photosensitive resin composition, and the same applies to the preferred aspect thereof.

(Photobase Generator)

The thermoplastic resin composition may contain a photobase generator.

The photobase generator is not particularly limited as long as it is a known photobase generator, and examples thereof include 2-nitrobenzylcyclohexylcarbamate, triphenyl methanol, O-carbamoylhydroxylamide, O-carbamoyloxime, [[(2,6-dinitrobenzyl)oxy]carbonyl]cyclohexylamine, bis[[(2-nitrobenzyl)oxy]carbonyl]hexane-1,6-diamine, 4-(methylthiobenzoyl)-1-methyl-1-morpholinoethane, (4-morpholinobenzoyl)-1-benzyl-1-dimethylaminopropane, N-(2-nitrobenzyloxycarbonyl)pyrrolidine, hexaammine cobalt (III) tris(triphenylmethylborate), 2-benzyl-2-dimethylamino-1-(4-morpholinophenyl)-butanone, 2,6-dimethyl-3,5-diacetyl-4-(2-nitrophenyl)-1,4-dihydropyridine, and 2,6-dimethyl-3,5-diacetyl-4-(2,4-dinitrophenyl)-1,4-dihydropyridine.

One kind of the compound C may be used alone, or two or more kinds thereof may be used.

From the viewpoints of the visibility of the exposed portion and the non-exposed portion and the resolution, the content of the compound C is preferably 0.1% to 10% by mass and more preferably 0.5% to 5% by mass with respect to the total solid content of the composition.

<Plasticizer>

The thermoplastic resin composition preferably contains a plasticizer from the viewpoints of the resolution of the formed composition layer (the thermoplastic resin layer), the adhesiveness to an adjacent layer, and the developability.

The plasticizer preferably has a molecular weight (a weight-average molecular weight in a case where the plasticizer is an oligomer or a polymer and has a molecular weight distribution) smaller than that of the alkali-soluble resin. The molecular weight (the weight-average molecular weight) of the plasticizer is preferably 200 to 2,000.

The plasticizer is not particularly limited as long as it is a compound that is compatible with an alkali-soluble thermoplastic resin and exhibits plasticity. However, from the viewpoint of imparting plasticity, the plasticizer preferably has an alkyleneoxy group in the molecule, and it is more preferably a polyalkylene glycol compound. The alkyleneoxy group contained in the plasticizer more preferably has a polyethyleneoxy structure or a polypropyleneoxy structure.

In addition, the plasticizer preferably contains an (meth)acrylate compound from the viewpoints of resolution and storage stability. From the viewpoint of compatibility, resolution, and adhesiveness to an adjacent layer, it is more preferable that the alkali-soluble resin is an acrylic resin and the plasticizer contains an (meth)acrylate compound.

Examples of the (meth)acrylate compound that is used as the plasticizer include the (meth)acrylate compound described as the polymerizable compound contained in the negative tone photosensitive resin composition described above.

In a transfer film, in a case where the thermoplastic resin layer and the negative tone photosensitive resin layer are laminated in direct contact with each other, it is preferable that both the thermoplastic resin layer and the photosensitive resin layer contain the same (meth)acrylate compound. This is due to the reason that in a case where the thermoplastic resin layer and the negative tone photosensitive resin layer each contain the same (meth)acrylate compound, the diffusion of components between the layers is suppressed and the storage stability is improved.

In a case where the thermoplastic resin composition contains an (meth)acrylate compound as a plasticizer, it is preferable that the (meth)acrylate compound does not polymerize even in the exposed portion after exposure from the viewpoint of adhesiveness to a layer adjacent to the thermoplastic resin layer.

In addition, the (meth)acrylate compound that is used as a plasticizer is preferably an (meth)acrylate compound having two or more an (meth)acryloyl groups in one molecule from the viewpoints of the resolution of the thermoplastic resin layer, the adhesiveness to an adjacent layer, and the developability.

Further, the (meth)acrylate compound that is used as a plasticizer is also preferably an (meth)acrylate compound having an acid group or a urethane (meth)acrylate compound.

One kind of plasticizer may be used alone, or two or more kinds thereof may be used. From the viewpoints of the resolution of the thermoplastic resin layer, the adhesiveness to an adjacent layer, and the developability, the content of the plasticizer is preferably 1% to 70% by mass, more preferably 10% to 60% by mass, and still more preferably 20% to 50% by mass, with respect to the total solid content of the composition.

<Sensitizing Agent>

The thermoplastic resin composition may contain a sensitizing agent.

The sensitizing agent is not particularly limited, and examples thereof include a sensitizing agent which may be contained in the negative tone photosensitive resin layer described above.

One kind of sensitizing agent may be used alone, or two or more kinds thereof may be used.

The content of the sensitizing agent can be appropriately selected depending on the intended purpose. However, it is preferably 0.01% to 5% by mass and more preferably 0.05% to 1% by mass with respect to the total solid content of the composition from the viewpoints of the improvement of the sensitivity to the light source and the visibility of the exposed portion and the non-exposed portion.

<Solvent>

The thermoplastic resin composition may contain a solvent.

The solvent is not particularly limited, and examples thereof include a solvent which may be contained in the negative tone photosensitive resin layer described above. It is also preferable that the thermoplastic resin composition contains at least one solvent selected from the group consisting of an alkylene glycol ether and an alkylene glycol ether acetate.

The content of the solvent is preferably 50 to 1,900 parts by mass and more preferably 100 to 900 parts by mass with respect to 100 parts by mass of the total solid content of the composition.

<Additive and the Like>

The thermoplastic resin composition may contain a known additive in addition to the above-described components, as necessary.

In addition, the thermoplastic resin layer is described in paragraphs 0189 to 0193 of JP2014-085643A, and the content described in this publication is incorporated in the present specification.

<Physical Properties of the Formed Layer and the Like>

The layer thickness of the layer (the thermoplastic resin layer) formed of the thermoplastic resin composition is not particularly limited; however, it is preferably 1 μm or more and more preferably 2 μm or more from the viewpoint of adhesiveness to an adjacent layer. The upper limit is not particularly limited. However, it is preferably 20 μm or less, more preferably 10 μm or less, and still more preferably 8 μm or less from the viewpoints of developability and resolution.

The method of forming the thermoplastic resin layer is not particularly limited as long as it is a method capable of forming a layer containing the above components.

Examples thereof include a method of applying the thermoplastic resin composition onto the surface of the temporary support or the like, and drying the coating film of the thermoplastic resin composition to form the thermoplastic resin layer.

In addition, the thermoplastic resin layer may be formed on the surface of an interlayer after forming the photosensitive resin layer and the interlayer on the cover film described later.

[Coloration Resin Composition]

The composition according to the embodiment of the present invention may be used as a coloration resin composition.

In recent years, a liquid crystal display window included in an electronic device may be attached with a cover glass having a black frame-shaped light shielding layer formed on the peripheral portion of the back surface of a transparent glass substrate or the like in order to protect the liquid crystal display window. A coloring composition can be used for forming such a light shielding layer.

The coloration resin composition is a composition containing a pigment.

That is, the composition according to the embodiment of the present invention may be a coloration resin composition that further contains a pigment in addition to the compound A, the alkali-soluble resin, and the polymerizable compound. It is also preferable that the composition according to the embodiment of the present invention, which is a coloration resin composition, further contains a polymerization initiator in addition to the compound A, the alkali-soluble resin, the polymerizable compound, and the pigment.

<Pigment>

The pigment contained in the coloration resin composition may be appropriately selected depending on the desired color tone, and it can be selected from a black pigment, a white pigment, and chromatic pigments other than black and white. Among them, in a case of forming a black pattern, a black pigment is suitably selected as the pigment.

As the black pigment, a known black pigment (an organic pigment, an inorganic pigment, or the like) can be appropriately selected as long as the effect of the present disclosure is not impaired. Among them, from the viewpoint of optical density, suitable examples of the black pigment include carbon black, titanium oxide, titanium carbide, iron oxide, and graphite, where carbon black is particularly preferable. From the viewpoint of surface resistance, the carbon black is preferably a carbon black in which at least a part of the surface is coated with a resin.

The black pigment (preferably carbon black) is preferably used in a form of a pigment dispersion liquid.

The dispersion liquid may be a dispersion liquid prepared by adding a mixture obtained by mixing in advance a black pigment and a pigment dispersing agent to an organic solvent (or a vehicle) and dispersing it with a disperser. The pigment dispersing agent may be selected depending on the pigment and the solvent, and for example, a commercially available dispersing agent can be used. It is noted that the vehicle refers to a medium portion which disperses a pigment in a case where the pigment is made to be a pigment dispersion liquid, where the vehicle is liquid and contains a binder component that holds the black pigment in a dispersed state and a solvent component (an organic solvent) that dissolves and dilutes the binder component.

The disperser is not particularly limited, and examples thereof include known dispersers such as a kneader, a roll mill, an attritor, a super mill, a dissolver, a homogenization mixer, and a sand mill. Further, fine pulverization may be carried out by mechanical grinding using frictional force. Regarding the disperser and fine pulverization, the description in "Encyclopedia of Pigments" (Kunizo Asakura, First Edition, Asakura Publishing Co., Ltd., 2000, 438, 310) can be referred to.

From the viewpoint of dispersion stability, the particle diameter of the black pigment is preferably 0.001 to 0.1 μm and more preferably 0.01 to 0.08 μm in terms of number average particle diameter.

Here, the particle diameter refers to a diameter of a circle in a case where the area of the pigment particles is determined from the photographic image of the pigment particles captured with an electronic microscope and a circle having the same area as the area of the pigment particles is assumed, and the number average particle diameter is an average value obtained by determining the above particle diameter for any 100 particles and averaging the determined diameters of the 100 particles.

As the pigment other than the black pigment, the white pigments described in paragraphs 0015 and 0114 of JP2005-007765A can be used as the white pigment. Specifically, among the white pigments, the inorganic pigment is preferably titanium oxide, zinc oxide, lithopone, light calcium carbonate, white carbon, aluminum oxide, aluminum hydroxide, or barium sulfate, more preferably titanium oxide or zinc oxide, and still more preferably titanium oxide. The inorganic pigment is preferably a rutile-type or anatase-type titanium oxide, and particularly preferably a rutile-type titanium oxide.

Further, the surface of titanium oxide may be subjected to a silica treatment, an alumina treatment, a titania treatment, a zirconia treatment, or an organic substance treatment, or may be subjected to two or more treatments. As a result, the catalytic activity of titanium oxide is suppressed, and thus heat resistance, light resistance, and the like are improved.

From the viewpoint of reducing the thickness of the photosensitive resin layer after heating, the surface treatment of the surface of titanium oxide is preferably at least one of an alumina treatment or a zirconia treatment, and particularly preferably both alumina treatment and zirconia treatment.

In addition, from the viewpoint of transferability, it is also preferable that the coloration resin composition further contains a chromatic pigment other than the black pigment and the white pigment. In a case where a chromatic pigment is contained, it is desirable that the chromatic pigment is well dispersed in the coloration resin layer, and from such a viewpoint, the particle diameter is preferably 0.1 μm or less and more preferably 0.08 μm or less. Examples of the chromatic pigment include Victoria pure blue BO (Color Index (hereinafter C.I.) 42595), Auramine (C.I. 41000), Fat black HB (C.I. 26150), Monolite yellow GT (C.I. Pigment yellow 12), Permanent yellow GR (C.I. Pigment yellow 17), Permanent yellow HR (C.I. Pigment yellow 83), Permanent carmine FBB (C.I. Pigment red 146), Hoster balm red ESB (C.I. Pigment violet 19), Permanent ruby FBH (C.I. Pigment red 11), Pastel pink B supra (C.I. Pigment red 81), Monastral first blue (C.I. Pigment blue 15), Monolite first black B (C.I. Pigment black 1), and Carbon, as well as C.I. Pigment red 97, C.I. Pigment red 122, C.I. Pigment red 149, C.I. Pigment red 168, C.I. Pigment red 177, C.I. Pigment red 180, C.I. Pigment red 192, C.I. Pigment red 215, C.I. Pigment Green 7, C.I. Pigment blue 15.1, C.I. Pigment blue 15:4, C.I. Pigment blue 22, C.I. Pigment blue 60, C.I. Pigment blue 64, and C.I. Pigment violet 23. Among them, C.I. Pigment red 177 is preferable.

The content of the pigment is preferably more than 3% by mass and 40% by mass or less, more preferably more than 3% by mass and 35% by mass or less, still more preferably more than 5% by mass and 35% by mass or less, and particularly preferably 10% by mass or more and 35% by mass or less, with respect to the total solid content of the composition.

In a case where pigments (a white pigment and a chromatic pigment) other than the black pigment are contained, the content thereof is preferably 30% by mass or less, preferably 1% by mass to 20% by mass, and still more preferably 3% by mass to 15% by mass, with respect to the black pigment.

A pigment may be added to each of the above-described compositions to obtain a coloration resin composition.

For example, as described above, a composition obtained by adding a pigment (or a pigment dispersion liquid) to the above-described negative tone photosensitive resin composition can be used as the coloration resin composition. That is, the negative tone photosensitive resin composition described above may be used as a negative tone photosensitive resin composition which is a coloration resin composition.

Similarly, each of the above-described composition layers may be used as a coloration resin layer to which a pigment has been added.

For example, the negative tone photosensitive resin layer described above may be a coloration resin layer containing a pigment, as described above. That is, the negative tone photosensitive resin layer described above may be a negative tone photosensitive resin layer that is a coloration resin layer.

<Physical Properties of the Formed Layer and the Like>

The method of applying the composition using the coloration resin composition and/or the method of forming the composition layer is not particularly limited and can be carried out, for example, in the same manner as in the method using the negative tone photosensitive resin composition.

The layer thickness (the film thickness) of the composition layer (the coloration resin layer) formed of the coloration resin composition is generally 0.1 to 300 μm, preferably 0.2 to 100 μm, more preferably 0.5 to 50 μm, still more preferably 0.5 to 15 μm, particularly preferably 0.5 to 10 μm, and most preferably 0.5 to 8 μm.

[Transfer Film]

The present invention also relates to a transfer film.

The transfer film according to the embodiment of the present invention is a transfer film having a temporary support and one or more composition layers (for example, 1 to 5 layers), where at least one layer of the composition layers is a layer formed of the composition according to the embodiment of the present invention (the composition layer).

In the transfer film, the temporary support and the one or more composition layers may be directly laminated without another layer being interposed therebetween or may be laminated with another layer being interposed therebetween. In addition, another layer may be laminated on a surface of the one or more composition layers on a side opposite to the surface facing the temporary support. Another layer may be present between the one or more composition layers.

The composition layer is a layer containing a resin, and it may be a layer (a composition layer) formed of the composition according to the embodiment of the present invention or may be a layer (a composition layer) formed of a composition ("a composition which is not allowed to contain the alkali-soluble resin, the polymerizable compound, and the compound A" which will be described later) other than the present invention which does not correspond to the composition according to the embodiment of the present invention.

Hereinafter, the layer (the composition layer) formed of the composition according to the embodiment of the present invention is also referred to as "the composition layer according to the embodiment of the present invention".

In addition, the layer (the composition layer) formed of a composition ("a composition which is not allowed to contain the alkali-soluble resin, the polymerizable compound, and the compound A" which will be described later) other than the present invention which does not correspond to the composition according to the embodiment of the present invention is also referred to as "the composition layer other than the present invention".

In the transfer film, it suffices that at least one layer of the one or more composition layers (for example, 1 to 5 layers) is the composition according to the embodiment of the present invention, half or more of the layers may be the composition layer according to the embodiment of the present invention, and all the layers may be the composition layer according to the embodiment of the present invention.

The composition layer according to the embodiment of the present invention is, for example, a layer consisting of only the solid content in the above-described composition according to the embodiment of the present invention. More specifically, the composition layer according to the embodiment of the present invention is the layer consisting of only the solid content, for example, in the negative tone photosensitive resin composition, the thermoplastic resin composition, and/or the coloration resin composition described above (the negative tone photosensitive resin layer, the thermoplastic resin layer, and/or the coloration resin layer).

It is noted that "consisting of only the solid content" referred to herein means that substantially, only the solid content is contained, and the solid content is preferably 95% to 100% by mass, more preferably, 99% to 100% by mass, and still more preferably 99.5% to 100% by mass, with respect to the total mass of the composition layer.

For example, in the negative tone photosensitive resin composition, the thermoplastic resin composition, and/or the coloration resin composition described above, the composition layer other than the present invention is a composition layer formed of "the composition which is not allowed to contain the alkali-soluble resin, the polymerizable compound, and the compound A." Such a composition layer is preferably a layer consisting of only the solid content in "the composition which is not allowed to contain the alkali-soluble resin, the polymerizable compound, and the compound A" described above. In addition, examples of "the composition which is not allowed to contain the alkali-soluble resin, the polymerizable compound, and the compound A" described above include a composition obtained by simply removing the compound A from the composition according to the embodiment of the present invention and a composition obtained by replacing the compound A in the composition according to the embodiment of the present invention with a surfactant which does not correspond to the compound A.

Hereinafter, the negative tone photosensitive resin composition which is the composition according to the embodiment of the present invention and the composition which is not allowed to contain the alkali-soluble resin, the polymerizable compound, and the compound A are distinguished from each other, and they are also referred to separately as the negative tone photosensitive resin composition according to the embodiment of the present invention and the negative tone photosensitive resin composition other than the present invention, respectively. The same applies to the compositions of other types.

In addition, the layer formed of the negative tone photosensitive resin composition according to the embodiment of the present invention and the layer formed of the negative tone photosensitive resin composition other than the present invention are distinguished from each other, and they are also referred to separately as the negative type photosensitive resin layer according to the embodiment of the present invention and the negative tone photosensitive resin composition other than the present invention, respectively. The same applies to the composition layers of other types.

It is also preferable that the transfer film according to the embodiment of the present invention includes at least one negative tone photosensitive resin layer (the negative tone photosensitive resin layer according to the embodiment of the present invention or a negative tone photosensitive resin layer other than the present invention). The negative tone photosensitive resin layer may be a coloration resin layer containing a pigment.

That is, at least one of the composition layers (one or more composition layers) included in the transfer film according to the embodiment of the present invention is preferably a negative tone photosensitive resin layer (the negative tone photosensitive resin layer according to the embodiment of the present invention or a negative tone photosensitive resin layer other than the present invention).

[Temporary Support]

The transfer film according to the embodiment of the present invention has a temporary support.

The temporary support is a support that supports the composition layer or the laminate including the composition layer, and it is a peelable support.

The temporary support preferably has light transmittance from the viewpoint that exposure through a temporary support is possible in a case where the composition layer is subjected to pattern exposure. In addition, in this specification, "having light transmittance" means that the light transmittance at the wavelength used for pattern exposure is 50% or more. From the viewpoint of improving exposure sensitivity, the temporary support preferably has a light transmittance of 60% or more and more preferably 70% or more at the wavelength (more preferably 365 nm) used for pattern exposure.

The light transmittance of the layer included in the transfer film is a rate of the intensity of the emitted light that has emitted and passed through a layer with respect to the intensity of the incident light in a case where the light is incident in a direction perpendicular to the main surface of the layer (the thickness direction), and it is measured by using MCPD Series manufactured by Otsuka Electronics Co., Ltd.

Examples of the material that constitutes the temporary support include a glass substrate, a resin film, and paper, and a resin film is preferable from the viewpoints of hardness, flexibility, and light transmittance.

Examples of the resin film include a polyethylene terephthalate (PET) film, a cellulose triacetate film, a polystyrene film, and a polycarbonate film. Among them, a PET film is preferable, and a biaxially stretched PET film is more preferable.

The thickness (the layer thickness) of the temporary support is not particularly limited, and it may be selected depending on the material from the viewpoints of the hardness as a support, the flexibility required for affixing to a substrate for forming a circuit wire, and the light transmittance required in the first exposure step.

The thickness of the temporary support is preferably 5 to 100 μm, more preferably 10 to 50 μm, still more preferably 10 to 20 μm, and particularly preferably 10 to 16 μm, from the viewpoints of ease of handling and general-purpose property.

In addition, it is preferable that the film to be used as the temporary support does not have deformation such as wrinkles, scratches, and defects.

From the viewpoint of pattern forming properties during pattern exposure through the temporary support and transparency of the temporary support, it is preferable that the number of fine particles, foreign substances, defects, and precipitates included in the temporary support is small. The number of fine particles having a diameter of 1 μm or more, foreign substances, and defects is preferably 50 pieces/10 $mm^2$ or less, more preferably 10 pieces/10 $mm^2$ or less, still more preferably 3 pieces/10 $mm^2$ or less, and particularly preferably 0 pieces/10 $mm^2$.

Preferred aspects of the temporary support are described in, for example, paragraph 0017 and paragraph 0018 of JP2014-085643A, paragraphs 0019 to 0026 of JP2016-027363A, paragraphs 0041 to 0057 of WO2012/081680A1, paragraphs 0029 to 0040 of WO2018/179370A1, and paragraph 0012 to paragraph 0032 of JP2019-101405A, the contents of these publications are incorporated in the present specification.

[Cover Film]

The transfer film preferably has a cover film that is in contact with a surface of the composition layer (the above-described one or more composition layers) that does not face the temporary support.

Hereinafter, in the present specification, a surface of the composition layer facing the temporary support is also referred to as a "first surface", and a surface on a side opposite to the first surface is also referred to as a "second surface".

Examples of the material that constitutes the cover film include a resin film and paper, where a resin film is preferable from the viewpoints of hardness and flexibility. Examples of the resin film include a polyethylene film, a polypropylene film, a polyethylene terephthalate film, a cellulose triacetate film, a polystyrene film, and a polycarbonate film. Among them, a polyethylene film, a polypropylene film, or a polyethylene terephthalate film is preferable.

The thickness (the layer thickness) of the cover film is not particularly limited; however, it is preferably 5 to 100 μm and more preferably 10 to 50 μm.

In addition, the arithmetic average roughness Ra value of the surface of the cover film in contact with the composition layer (hereinafter, also simply referred to as "the surface of the cover film") is preferably 0.3 μm or less, more preferably 0.1 μm or less, and still more preferably 0.05 μm or less since the resolution is more excellent. This is conceived to be because in a case where the Ra value on the surface of the cover film is in the above range, the uniformity of the layer thickness of the resin pattern to be formed is improved.

The lower limit of the Ra value of the surface of the cover film is not particularly limited; however, it is preferably 0.001 μm or more.

The Ra value of the surface of the cover film is measured by the following method.

Using a three-dimensional optical profiler (New View7300, manufactured by Zygo Corporation), the surface of the cover film is measured under the following conditions to obtain a surface profile of the optical film.

As the measurement and analysis software, Microscope Application of MetroPro ver. 8.3.2 is used. Next, the Surface Map screen is displayed with the above analysis software, and the histogram data is obtained in the Surface Map screen. From the obtained histogram data, the arithmetic average roughness is calculated, and the Ra value of the surface of the cover film is obtained.

In a case where the cover film is affixed to the transfer film, the cover film may be peeled from the transfer film to measure the Ra value of the surface on which the peeling has been carried out.

[Manufacturing Method for Transfer Film]

The manufacturing method for the transfer film according to the embodiment of the present invention is not particularly limited, and a known manufacturing method, for example, a known method of forming each layer can be used.

Hereinafter, a manufacturing method for a transfer film according to the embodiment of the present invention will be described with reference to the FIGURE. However, the transfer film according to the embodiment of the present invention is not limited to that having the configuration illustrated in the FIGURE.

The FIGURE is a schematic view illustrating an example of a configuration of the transfer film according to the embodiment of the present invention. A transfer film 100 illustrated in the FIGURE has a configuration in which a temporary support 10, a thermoplastic resin layer 12, an interlayer 14, a negative tone photosensitive resin layer 16, and a cover film 18 are laminated in this order.

It is noted that the transfer film includes the interlayer 14, it is possible to suppress the mixing of components in a case where a plurality of layers are coated and in a case of storage after the coating.

Examples of the interlayer include the oxygen blocking layer having an oxygen blocking function, which is described as a "separation layer" in JP1993-072724A (JP-H5-072724A). It is preferable that the interlayer is an oxygen blocking layer since the sensitivity at the time of exposure is improved, the time load of the exposure machine is reduced, and the productivity is improved.

The oxygen blocking layer that is used as the interlayer may be appropriately selected from known layers described in the above-described publications. Among them, it is preferably an oxygen blocking layer that exhibits low oxygen permeability and is dispersed or dissolved in water or an alkaline aqueous solution (an aqueous solution of 1% by mass sodium carbonate at 22° C.).

The interlayer and the resin composition capable of forming the interlayer will be described in detail later.

Examples of the manufacturing method for the transfer film 100 include a method including a step of applying the thermoplastic resin composition according to the embodiment of the present invention onto the surface of the temporary support 10 and then drying the coating film of the thermoplastic resin composition according to the embodiment of the present invention to form the thermoplastic resin layer 12, a step of applying an interlayer forming resin composition onto the surface of the thermoplastic resin layer 12 and then drying the coating film of the interlayer forming resin composition to form the interlayer 14, and a step of applying the negative tone photosensitive resin composition according to the embodiment of the present invention onto the surface of the interlayer 14 and then drying the coating film of the negative tone photosensitive resin composition according to the embodiment of the present invention to form the negative tone photosensitive resin layer 16.

The cover film 18 is subjected to pressure bonding to the negative tone photosensitive resin layer 16 of the laminate manufactured according to the manufacturing method described above, whereby the transfer film 100 is manufactured.

It is preferable that the manufacturing method for a transfer film according to the embodiment of the present invention includes a step of providing a cover film 18 to be in contact with a second surface of the photosensitive resin layer 16, whereby the transfer film 100 including the temporary support 10, the thermoplastic resin layer 12, the interlayer 14, the photosensitive resin layer 16, and the cover film 18 is manufactured.

After manufacturing the transfer film 100 according to the above-described manufacturing method, the transfer film 100 may be wound backward to produce and store the transfer film having a form of a roll. The transfer film having a roll form can be provided as it is in the affixing step to a substrate by the roll-to-roll method described later.

In the above-described manufacturing method, although the composition according to the embodiment of the present invention was used as the thermoplastic resin composition and the negative tone photosensitive resin composition, it suffices that at least one of these is the composition according to the embodiment of the present invention, where one thereof may be compositions other than the present invention (a thermoplastic resin composition other than the present invention and/or a negative tone photosensitive resin composition other than the present invention).

Similarly, in the transfer film 100, it suffices that at least one of the thermoplastic resin layer 12 and the negative tone photosensitive resin layer 16 is the composition layer according to the embodiment of the present invention, where the other thereof may be the composition layers other than the present invention.

<Interlayer>

The interlayer contains a resin. The resin is preferably a water-soluble resin.

Examples of the resin capable of being used as the water-soluble resin include resins such as a polyvinyl alcohol-based resin, a polyvinyl pyrrolidone-based resin, a cellulose-based resin, an acrylamide-based resin, a polyethylene oxide-based resin, gelatin, a vinyl ether-based resin, a polyamide resin, and a copolymer thereof.

In a case where the water-soluble resin layer containing a water-soluble resin is used as the interlayer, this water-soluble resin is preferably a resin different from the resin contained in the adjacent layer (for example, the polymer P contained in the negative tone photosensitive resin layer and/or the thermoplastic resin (the alkali-soluble resin) contained in the thermoplastic resin layer from the viewpoint of suppressing the mixing of components between a plurality of layers.

From the viewpoints of oxygen blocking properties and suppressing mixing of components in a case of coating a plurality of layers and in a case of storing after coating, the water-soluble resin preferably contains polyvinyl alcohol and more preferably contains both polyvinyl alcohol and polyvinyl pyrrolidone.

The interlayer can be formed of a water-soluble resin composition including a water-soluble resin.

One kind of water-soluble resin may be used alone, or two or more kinds thereof may be used.

The content of the water-soluble resin is not particularly limited. However, from the viewpoints of oxygen blocking properties and suppressing mixing of components in a case of coating a plurality of layers and in a case of storing after coating, it is preferably 50% by mass or more and less than 100% by mass, more preferably 70% by mass or more and less than 100% by mass, still more preferably 80% by mass or more and less than 100% by mass, and particularly preferably 90% by mass or more and less than 100% by mass, with respect to the total solid content of the water-soluble resin composition.

Further, it is also preferable that the water-soluble resin composition further contains a solvent in addition to the water-soluble resin for the intended purpose of improving the coatability. The solvent contained in the water-soluble resin composition is not particularly limited as long as the water-soluble resin is capable of being dissolved or dispersed, and the solvent is preferably at least one selected from the group consisting of water and a water-miscible organic solvent, and it is more preferably water or a mixed solvent of water and a water-miscible organic solvent.

Examples of the water-miscible organic solvent include alcohol having 1 to 3 carbon atoms, acetone, ethylene glycol, and glycerin, where alcohol having 1 to 3 carbon atoms is preferable, and methanol or ethanol is more preferable.

The content of the solvent is preferably 50 to 2,500 parts by mass, more preferably 50 to 1,900 parts by mass, still more preferably 100 to 900 parts by mass, with respect to 100 parts by mass of the total solid content of the composition.

The method of applying the composition using the water-soluble resin composition and/or the method of forming the composition layer is not particularly limited and can be carried out, for example, in the same manner as in the method using the negative tone photosensitive resin composition.

A method of forming the interlayer (the water-soluble resin layer containing a water-soluble resin) is not particularly limited. Examples thereof include a method of forming a water-soluble resin layer by applying the water-soluble resin composition onto the surface of the thermoplastic resin layer or the photosensitive resin layer and drying the coating film of the water-soluble resin composition.

The layer thickness of the water-soluble resin layer is not particularly limited; however, it is preferably 0.1 to 5 μm and more preferably 0.5 to 3 μm. This is due to the reason that in a case where the thickness of the water-soluble resin layer is within the above range, it is possible to suppress the mixing of components in a case of coating a plurality of layers and in a case of storing after the coating, without reducing the oxygen blocking properties, and it is possible to suppress an increase in the removal time of the water-soluble resin layer in a case of development.

An example of the aspect of the transfer film is shown below.

In each of the following configurations, one or more layers (the cover film and the like) may be removed or a layer may be further added between any layers, as desired.

(1) "Temporary support/thermoplastic resin layer/interlayer (water-soluble resin layer)/negative tone photosensitive resin layer/cover film"

(2) "Temporary support/negative tone photosensitive resin layer/refractive index adjusting layer/cover film"

(3) "Temporary support/negative tone photosensitive resin layer/cover film"

In the composition layers (layers other than the temporary support and the cover film) that constitute the transfer film having each of the above-described configurations, at least one layer of the thermoplastic resin layer or the negative tone photosensitive resin layer is the composition layer according to the embodiment of the present invention.

In each of the above configurations, it is also preferable that the negative tone photosensitive resin layer is a coloration resin layer.

In the above configuration, the refractive index adjusting layer may be a known refractive index adjusting layer, and examples thereof include the second resin layer disclosed in paragraphs [0200] to [0214] of JP2020-091322A.

[Manufacturing Method for Laminate and Manufacturing Method for Circuit Wire]

The present invention also relates to a manufacturing method for a laminate.

The manufacturing method for a laminate is not particularly limited as long as it is a manufacturing method for a laminate using the transfer film described above.

The manufacturing method for a laminate preferably includes an affixing step of bringing a substrate (preferably a substrate having conductivity) into contact with a surface (a surface of a composition layer) on a side opposite to a temporary support included in a transfer film and affixing the transfer film to the substrate (preferably the substrate having conductivity) to obtain a transfer film-attached substrate (hereinafter, also referred to as the "affixing step"), an exposure step of subjecting the composition layer to pattern exposure (hereinafter, also referred to as the "exposure step"), a development step of developing the exposed composition layer to form a resin pattern (hereinafter, also referred to the "development step"), and a peeling step of peeling the temporary support from the transfer film-attached substrate, between the affixing step and the exposure step or between the exposure step and the development step (hereinafter, also referred to as the "peeling step").

It is noted that the composition layer that is subjected to pattern exposure may consist of one layer alone or may consist of two or more layers, where at least one layer constituting the composition layer is the composition layer according to the embodiment of the present invention.

In addition, the composition layer that is subjected to pattern exposure preferably includes at least one negative tone photosensitive resin layer (the negative tone photosensitive resin layer according to the embodiment of the present invention or a negative tone photosensitive resin layer other than the present invention). The negative tone photosensitive resin layer may be a coloration resin layer containing a pigment.

The manufacturing method for a circuit wire is not particularly limited as long as it is a manufacturing method for a circuit wire using the transfer film described above.

In a laminate in which a substrate, a conductive layer (a conductive layer included in the substrate), and a resin pattern manufactured by using the above-described transfer film are laminated in this order, the manufacturing method for a circuit wire is preferably a method including a step (hereinafter, also referred to as an "etching step") of subjecting the conductive layer present in a region where the resin pattern is not disposed to an etching treatment.

That is, the manufacturing method for a circuit wire is preferably a method including an affixing step of bringing a substrate having a conductive layer into contact with a surface (a composition layer) on a side opposite to a temporary support included in a transfer film and affixing the transfer film to the substrate having the conductive layer to obtain a transfer film-attached substrate (hereinafter, also referred to as the "affixing step"), an exposure step of subjecting the composition layer to pattern exposure (hereinafter, also referred to as the "exposure step"), a development step of developing the exposed composition layer to form a resin pattern (hereinafter, also referred to the "development step"), a step of subjecting the conductive layer present in a region where the resin pattern is not disposed to an etching treatment (hereinafter, also referred to as the "etching step"), and a peeling step of peeling the temporary support from the transfer film-attached substrate, between the affixing step and the exposure step or between the exposure step and the development step (hereinafter, also referred to as the "peeling step").

The same as described above applies to the preferred form of the composition layer that is subjected to pattern exposure.

Hereinafter, each step included in the manufacturing method for a laminate and the manufacturing method for a circuit wire will be described. However, unless otherwise specified, the content of the description for each step included in the manufacturing method for a laminate shall also apply to the manufacturing method for a circuit wire.

[Affixing Step]

The manufacturing method for a laminate preferably includes an affixing step.

In the affixing step, it is preferable that a substrate (a conductive layer in a case where a conductive layer is provided on the surface of the substrate) is brought into contact with the surface of the transfer film on a side opposite to the temporary support, and the transfer film is subjected to pressure bonding to the substrate. Since the above aspect improves the adhesiveness between the composition layer and the substrate, it can be suitably used as an etching resist in a case where a conductive layer is etched by using a resin pattern on which a pattern is formed after the exposure and the development.

In a case where the transfer film includes a cover film, the cover film may be removed from the surface of the transfer film and then affixed.

The method of subjecting the substrate to pressure bonding to the transfer film is not particularly limited, and a known transfer method or a laminating method can be used.

The affixing of the transfer film to the substrate is preferably carried out by superposing the substrate on a surface of the transfer film on a side opposite to the temporary support and then applying pressure using a means such as a roll and carrying out heating. For affixing, it is possible to use a known laminator such as a laminator, a vacuum laminator, or an auto-cut laminator capable of further improving productivity.

The manufacturing method for a laminate including the affixing step and the manufacturing method for a circuit wire are preferably carried out according to a roll-to-roll method.

The roll-to-roll method refers to a method that includes, in a case of using a substrate capable of being wound backward and wound forward as the substrate, a step (also referred to as a "forward winding step") of winding forward the substrate or a structure body including the substrate before any one of the steps included in the manufacturing method for a laminate or the manufacturing method for a circuit wire and a step (also referred to as a "backward winding step") of winding backward the substrate or the structure body including the substrate after any one of the above steps, and at least any one of the steps (preferably all steps or all steps other than the heating step) is carried out while transporting the substrate or the structure body including the substrate.

The forward winding method in the forward winding step and the backward winding method in the backward winding step are not particularly limited, and known methods may be used in the manufacturing method to which the roll-to-roll method is applied.

<Substrate>

As the substrate used for forming the resin pattern using the transfer film according to the embodiment of the present invention, a known substrate may be used; however, a substrate having a conductive layer is preferable, and it is more preferable to have a conductive layer on the surface of the substrate.

The substrate may have any layer other than the conductive layer, as necessary.

Examples of the base material that constitutes the substrate include glass, silicon, and a film.

The base material that constitutes the substrate is preferably transparent. In the present specification, "transparent" means that the transmittance of light having a wavelength of 400 to 700 nm is 80% or more.

In addition, the refractive index of the base material that constitutes the substrate is preferably 1.50 to 1.52.

Examples of the transparent glass base material include reinforced glass represented by Gorilla Glass manufactured by Corning Incorporated. Further, as the transparent glass base material, the materials used in JP2010-086684A, JP2010-152809A, and JP2010-257492A can be used.

In a case where a film base material is used as the base material, it is preferable to use a film base material having low optical distortion and/or high transparency. Examples of such a film base material include polyethylene terephthalate (PET), polyethylene naphthalate, polycarbonate, triacetyl cellulose, and a cycloolefin polymer.

The base material of the substrate is preferably a film base material in a case of being manufactured by a roll-to-roll method. Further, in a case where a circuit wire for a touch panel is manufactured by a roll-to-roll method, it is preferable that the base material is a sheet-shaped resin composition.

Examples of the conductive layer included in the substrate include a conductive layer that is used for a general circuit wire and a touch panel wire.

From the viewpoint of conductivity and thin wire forming properties, the conductive layer is preferably at least one layer selected from the group consisting of a metal layer, a conductive metal oxide layer, a graphene layer, a carbon nanotube layer, and a conductive polymer layer, more preferably a metal layer, and still more preferably a copper layer or a silver layer.

The substrate may have one conductive layer alone or may have two or more conductive layers. In a case of having two or more conductive layers, it is preferable to have conductive layers made of different materials.

Examples of the material of the conductive layer include a metal and a conductive metal oxide.

Examples of the metal include Al, Zn, Cu, Fe, Ni, Cr, Mo, Ag, and Au.

Examples of the conductive metal oxide include indium tin oxide (ITO), indium zinc oxide (IZO), and $SiO_2$.

In the present specification, "conductivity" means that the volume resistivity is less than $1\times10^6$ Ωcm. The volume resistivity of the conductive metal oxide is preferably less than $1\times10^4$ Ωcm.

In a case where a resin pattern is manufactured using a substrate having a plurality of conductive layers, it is preferable that at least one conductive layer among the plurality of conductive layers contains a conductive metal oxide.

The conductive layer is preferably an electrode pattern corresponding to a sensor of a visible part that is used in a capacitance type touch panel or a wire of a peripheral lead-out part.

[Exposure Step]

The manufacturing method for a laminate preferably includes, after the affixing step, a step (an exposure step) of subjecting the composition layer to pattern exposure.

The detailed arrangement and the specific size of the pattern in the pattern exposure are not particularly limited. At least a part of the pattern (preferably, a portion of the electrode pattern and/or lead-out wire of the touch panel) preferably contains a thin wire having a width of m or less and more preferably contains a thin wire having a width of 10 μm or less so that the display quality of the display device (for example, a touch panel) including an input device having a circuit wire manufactured according to the manufacturing method for a circuit wire improved and the area occupied by the lead-out wire is reduced.

The light source that is used for exposure can be appropriately selected and used as long as it is a light source that emits light having a wavelength (for example, 365 nm or 405 nm) with which the photosensitive resin layer can be exposed. Specific examples thereof include an ultra-high pressure mercury lamp, a high pressure mercury lamp, a metal halide lamp, and a light emitting diode (LED).

The exposure amount is preferably 5 to 200 $mJ/cm^2$ and more preferably 10 to 100 $mJ/cm^2$.

[Peeling Step]

The peeling step is a step of peeling the temporary support from the photosensitive composition layer-attached substrate between the affixing step and the exposure step, or between the exposure step and the development step development step described later.

The peeling method is not particularly limited, and a mechanism similar to the cover film peeling mechanism described in paragraphs [0161] and [0162] of JP2010-072589A can be used.

As a result, in the exposure step, the pattern exposure may be carried out after the temporary support is peeled off from the composition layer, or the pattern exposure may be carried out through the temporary support before the temporary support is peeled off, and then the temporary support may be peeled off. In a case where the temporary support is peeled off before exposure, the mask may be exposed in a state of being brought into contact with the composition layer or may be exposed in a state of being in close proximity without being brought into contact with the composition layer. In a case where the temporary support is exposed without peeling, the mask may be exposed in a state of being brought into contact with the temporary support or may be exposed in a state of being in close proximity without being brought into contact with the temporary support. In order to prevent mask contamination due to contact between the composition layer and the mask and to avoid the influence of foreign substances adhered to the mask on the exposure, it is preferable to carry out pattern exposure without peeling off the temporary support. The exposure method can be carried out by appropriately selecting and using a contact exposure method in a case of contact exposure, and in a case of a non-contact exposure method, a proximity exposure method, a lens-based and mirror-based projection exposure method, and a direct exposure method using an exposure laser or the like. In a case of the lens-based or mirror-based projection exposure, an exposure machine having a proper numerical aperture (NA) of a lens in response to the required resolving power and the focal depth can be used. In a case of the direct exposure method, drawing may be carried out directly on the photosensitive layer, or reduced projection exposure may be carried out on the photosensitive layer through a lens. Further, the exposure may be carried out not only in the atmospheric air but also under reduced pressure or vacuum, or the exposure may be carried out by interposing a liquid such as water between the light source and the photosensitive layer.

[Development Step]

The manufacturing method for a laminate preferably includes, after the exposure step, a step (a development step) of developing the exposed composition layer to form a resin pattern.

In a case where the composition layer includes a negative tone photosensitive resin layer (the negative tone photosensitive resin layer according to the embodiment of the present invention or a negative tone photosensitive resin layer other than the present invention), the composition layer undergoes a curing reaction according to the exposed pattern to form a cured film (a patterned cured film), and only the non-exposed portion of the composition layer can be removed with a developer (an alkali developer or the like).

In a case where the transfer film has, together with the negative tone photosensitive resin layer, a composition layer different from this, only a portion similar to the portion of the different composition layer, which is removed in the negative tone photosensitive resin layer, may be removed, or an entire portion thereof including a portion other than the portion removed in the negative tone photosensitive resin layer may be removed.

For example, in a case where the transfer film has the thermoplastic resin layer and/or the water-soluble resin layer together with the negative tone photosensitive resin layer, only the thermoplastic resin layer and/or the water-soluble resin layer of the non-exposed portion may be removed in the development step together with the negative tone photosensitive resin layer of the non-exposed portion. In addition, in the development step, the thermoplastic resin layer and/or the water-soluble resin layer in both regions of the exposed portion and the non-exposed portion may be removed in a form of being dissolved or dispersed in the developer.

In the resin pattern obtained after the development, a part or the whole thereof may be the composition layer according to the embodiment of the present invention or a layer that is obtained by subjecting the composition according to the embodiment of the present invention to a change such as a curing reaction. For example, in a case where the composition layer of the transfer film includes the negative tone photosensitive resin layer according to the embodiment of the present invention, a part or the whole of the resin pattern is a material obtained by subjecting the negative tone photosensitive resin layer according to the embodiment of the present invention to a curing reaction.

In addition, in the resin pattern obtained after the development, the composition layer according to the embodiment of the present invention or a layer that is obtained by subjecting the composition according to the embodiment of the present invention to a change such as a curing reaction may not be included. That is, the resin pattern obtained after the development may consist of only a composition layer other than the present invention and/or a layer that is obtained by subjecting the composition other than the present invention to a change such as a curing reaction.

Development of the exposed composition layer in the development step can be carried out using an alkali developer.

As the alkali developer, it is possible to use, for example, a known developer such as the developer described in JP1993-072724A (JP-H5-072724A).

The alkali developer is preferably an alkaline aqueous solution-based developer containing a compound having pKa=7 to 13 at a concentration of 0.05 to 5 mol/L (liter). The alkali developer may contain a water-soluble organic solvent and/or a surfactant. The alkali developer is also preferably the developer described in paragraph 0194 of WO2015/093271A. The content of the organic solvent in the alkali developer is preferably 0% by mass or more and less than 90% by mass with respect to the total mass of the developer.

The development method is not particularly limited, and it may be any of puddle development, shower development, shower, and spin development, and dip development. The shower development is a development treatment of removing the non-exposed portion by spraying a developer onto the photosensitive resin layer after exposure with a shower. After the development step, it is preferable to spray a cleaning agent with a shower to remove the development residue while rubbing it with a brush.

The liquid temperature of the developer is not particularly limited; however, it is preferably 20° C. to 40° C.

[Etching Step]

In a laminate in which a substrate, a conductive layer (a conductive layer included in the substrate), and a resin pattern (more preferably, a resin pattern manufactured according to the manufacturing method including the affixing step, the exposure step, and the development step) are laminated in this order, the manufacturing method for a circuit wire preferably contains a step (an "etching step") of subjecting the conductive layer present in a region where the resin pattern is not disposed to an etching treatment.

In the etching step, the resin pattern formed from the photosensitive resin layer is used as an etching resist to carry out an etching treatment of the conductive layer. As the method of etching treatment, a known method can be applied, and examples thereof include the methods described in paragraphs 0209 to 0210 of JP2017-120435A and paragraphs 0048 to 0054 of JP2010-152155A, a wet etching method in which immersion in an etchant is carried out, and a dry etching method such as plasma etching.

As the etchant that is used for wet etching, an acidic or alkaline etchant may be appropriately selected according to the etching target.

Examples of the acidic etchant include an aqueous solution of an acidic component alone selected from hydrochloric acid, sulfuric acid, nitric acid, acetic acid, hydrofluoric acid, oxalic acid, and phosphoric acid, and a mixed aqueous solution of an acidic component with a salt selected from iron (III) chloride, ammonium fluoride, or potassium permanganate. The acidic component may be a component in which a plurality of acidic components are combined.

Examples of the alkaline etchant include an aqueous solution of an alkaline component alone selected from sodium hydroxide, potassium hydroxide, ammonia, an organic amine, and a salt of an organic amine (tetramethylammonium hydroxide or the like), and a mixed aqueous solution of an alkaline component with a salt (potassium permanganate or the like). The alkaline component may be a component in which a plurality of alkaline components are combined.

[Removal Step]

In the manufacturing method for a circuit wire, it is preferable to carry out a step (a removal step) of removing the remaining resin pattern.

The removal step is not particularly limited and can be carried out as necessary; however, it is preferably carried out after the etching step.

The method of removing the remaining resin pattern is not particularly limited; however, examples thereof include a method of carrying out removal by a chemical treatment, and a method of carrying out removal with a removing liquid is preferable.

Examples of the method of removing the photosensitive resin layer include a method in which a substrate having the remaining resin pattern is immersed in a removing liquid under stirring, having a liquid temperature of preferably 30° C. to 80° C. and more preferably 50° C. to 80° C. for 1 to 30 minutes.

Examples of the removing liquid include a removing liquid in which an inorganic alkaline component or an organic alkaline component is dissolved in water, dimethyl sulfoxide, N-methylpyrrolidone, or a mixed solution thereof. Examples of the inorganic alkaline component include sodium hydroxide and potassium hydroxide. Examples of the organic alkaline component include a primary amine compound, a secondary amine compound, a tertiary amine compound, and a quaternary ammonium salt compound.

Further, a removing liquid may be used and then removed by a known method such as a spray method, a shower method, or a puddle method.

[Other Steps]

The manufacturing method for a circuit wire may include any steps (other steps) other than the above-described steps. Examples thereof include the following steps, which are not limited to these steps.

Further, examples of the exposure step, the development step, and the other steps, which are applicable to the manufacturing method for a circuit wire, include the steps described in paragraphs 0035 to 0051 of JP2006-023696A.

<Cover Film Peeling Step>

In a case where the transfer film includes a cover film, the manufacturing method for a laminate preferably includes a step of peeling the cover film from the transfer film. The method of peeling the cover film is not limited, and a known method can be applied.

<Step of Reducing Visible Light Reflectivity>

The manufacturing method for a circuit wire may include a step of carrying out a treatment of reducing the visible light reflectivity of a part or all of a plurality of conductive layers included in the base material.

Examples of the treatment of reducing the visible light reflectivity include an oxidation treatment. In a case where the base material has a conductive layer containing copper, the visible light reflectivity of the conductive layer can be reduced by subjecting copper to the oxidation treatment to obtain copper oxide and then blackening the conductive layer.

The treatment of reducing the visible light reflectivity is described in paragraphs 0017 to 0025 of JP2014-150118A and paragraph 0041, paragraph 0042, paragraph 0048, and paragraph 0058 of JP2013-206315A, and the contents described in these publications are incorporated in the present specification.

<Step of Forming Insulating Film and Step of Forming New Conductive Layer on Surface of Insulating Film>

The manufacturing method for a circuit wire preferably includes a step of forming an insulating film on the surface of the circuit wire and a step of forming a new conductive layer on the surface of the insulating film.

These steps make it possible to form a second electrode pattern insulated from the first electrode pattern.

The step of forming an insulating film is not particularly limited, and examples thereof include a known method of forming a permanent film. Further, an insulating film having a desired pattern may be formed by photolithography using a photosensitive material having an insulating property.

The step of forming a new conductive layer on the insulating film is not particularly limited, and a new conductive layer having a desired pattern may be formed by, for example, photolithography using a photosensitive material having conductivity.

In the manufacturing method for a circuit wire, it is also preferable that a substrate having a plurality of conductive layers on both surfaces of the base material is used, and a conductive pattern is formed sequentially or simultaneously on the conductive layers formed on both surfaces of the base material. With such a configuration, it is possible to form a circuit wire for a touch panel in which the first conductive pattern is formed on one surface of the base material and the second conductive pattern is formed on the other surface thereof. It is also preferable to form a circuit wire for a touch panel, having such a configuration, from both surfaces of the base material in a roll-to-roll manner.

[Use Application of Circuit Wire]

The circuit wire manufactured according to the manufacturing method for a circuit wire can be applied to various devices. Examples of the device including the circuit wire manufactured according to the above-described manufacturing method include an input device, where a touch panel is preferable, and a capacitance type touch panel is more preferable. In addition, the input device can be applied to display devices such as an organic EL display device and a liquid crystal display device.

[Manufacturing Method for Electronic Device]

The present invention also relates to a manufacturing method for an electronic device.

The manufacturing method for an electronic device is preferably a manufacturing method for an electronic device using the transfer film described above.

Among the above, the manufacturing method for an electronic device preferably includes the above-described manufacturing method for a laminate.

Examples of the electronic device include an input device, where a touch panel is preferable. Further, the input device can be applied to display devices such as an organic electroluminescence display device and a liquid crystal display device.

In a laminate in which a substrate, a conductive layer (a conductive layer included in the substrate), and a resin pattern manufactured according to using the above-described transfer film are laminated in this order, the manufacturing method for a touch panel is also preferably a method including a step of subjecting the conductive layer present in a region where the resin pattern is not disposed to an etching treatment to form a wire for a touch panel, and it is more preferably a method using a resin pattern that is manufactured according to a manufacturing method including the affixing step, the exposure step, and the development step.

The specific aspect of each step in the manufacturing method for a touch panel including a step of forming a wire for a touch panel and the embodiment associated with the order for carrying out respective steps are as described in the above-described "manufacturing method for a circuit wire", and the same applies to the preferred aspect thereof.

In addition, the manufacturing method for a touch panel including a step of forming a wire for a touch panel may include any steps (other steps) other than those described above.

As the method for forming a wire for a touch panel, the method described in FIG. 1 of WO2016/190405A can also be referred to.

A touch panel having at least a wire for a touch panel is manufactured by the above-described manufacturing method for a touch panel. The touch panel preferably has a transparent substrate, electrodes, and an insulating layer or protective layer.

Examples of the detection method for the touch panel include known methods such as a resistive membrane method, a capacitance method, an ultrasonic method, an electromagnetic induction method, and an optical method. Among the above, a capacitance method is preferable.

Examples of the touch panel include a so-called in-cell type (for example, those shown in FIG. 5, FIG. 6, FIG. 7, and FIG. 8 of JP2012-517051A), a so-called on-cell type (for example, one described in FIG. 19 of JP2013-168125A and those described in FIG. 1 and FIG. 5 of JP2012-89102A), an one glass solution (OGS) type, a touch-on-lens (TOL) type (for example, one described in FIG. 2 of JP2013-54727A), various out-cell types (so-called GG, G1·G2, GFF, GF2, GF1, G1F, and the like), and other configurations (for example, those described in FIG. 6 of JP2013-164871A).

Examples of the touch panel include those described in paragraph 0229 of JP2017-120345A.

EXAMPLES

Hereinafter, the present invention will be described in more detail based on Examples below. The materials, amounts of use, proportions, treatments, procedures, and the like described in the following Examples can be modified as appropriate as long as the gist of the invention is maintained. Accordingly, the scope of the present invention shall not be restrictively interpreted by Examples shown below.

In the following Examples, unless otherwise specified, "parts" and "%" mean "parts by mass" and "% by mass", respectively.

Hereinafter, first, synthesis examples of the compound A and preparation of various compositions will be described, and then evaluation results of each composition will be shown.

[Synthesis of Compound A]

Synthesis Examples 1 to 4: Synthesis of High-Molecular-Weight Compound A

Synthesis Example 1

25.0 g of cyclohexanone (FUJIFILM Wako Pure Chemical Corporation) was charged into a three-neck flask of 300 ml and equipped with a stirrer, a thermometer, a reflux condenser, and a nitrogen gas introduction pipe, and the temperature was raised to 80° C. Next, a mixed solution consisting of 10.40 g (36.6 mmol) of 1H,1H,5H-octafluoropentyl acrylate (manufactured by Tokyo Chemical Industry Co., Ltd.), 60.5 g (111.8 mmol) of polyethylene glycol-monoacrylate (Blemmer AE-400, n≈10, manufactured by NOF CORPORATION), 25.0 g of cyclohexanone, and 0.342 g of an initiator "V-601" (manufactured by Fujifilm Wako Pure Chemical Corporation) was added dropwise thereto at a constant rate so that the dropwise addition was completed in 180 minutes. After completion of the dropwise addition, stirring was further continued for 1 hour, and then a solution consisting of 0.342 g of "V-601" and 1.00 g of cyclohexanone was further added thereto. Next, the temperature was raised to 93° C. immediately after the addition, and stirring was further continued for 2 hours to obtain 121.5 g of a cyclohexanone solution of a polymer A-1 shown in the latter part. The weight-average molecular weight (Mw) of this polymer was 11,000 (calculated in terms of polystyrene by gel permeation chromatography (EcoSEC HLC-8320GPC (manufactured by Tosoh Corporation)), measurement conditions of an eluent of THF, a flow rate of 0.35 ml/min, and a temperature of 40° C., used column: TSKgel SuperHZM-H, TSKgel SuperHZ4000, and TSKgel SuperHZ200 (manufactured by Tosoh Corporation).

Synthesis Examples 2 to 4

Polymers A-5, A-6, and A-9 were synthesized according to the same method except that the monomer and the compositional ratio used in Synthesis Example 1 were each changed.

The structures of the polymers A-1, A-5, A-6, and A-9 are shown below. It is noted that the numerical value attached to the constitutional unit in the polymer indicates a content (in terms of % by mass) with respect to the total mass of the polymer.

(A-1)

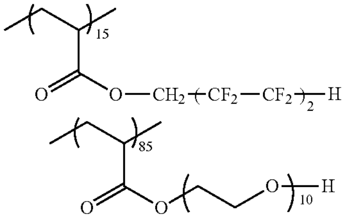

(A-5)

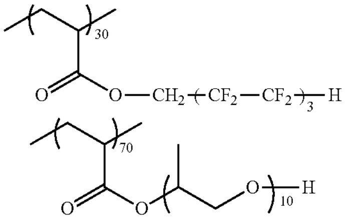

(A-6)

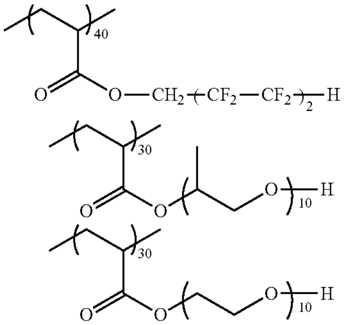

(A-9)

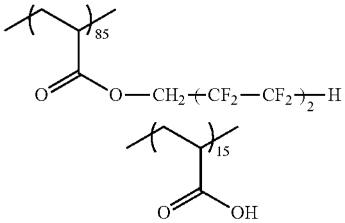

The weight-average molecular weight (Mw), the number-average molecular weight (Mn), and the dispersivity (Mw/Mn) of each polymer are as shown in Table 1.

TABLE 1

| Kind of polymer | Mw | Mn | Mw/Mn |
|---|---|---|---|
| A-1 | 11000 | 5000 | 2.2 |
| A-5 | 12000 | 6030 | 1.99 |
| A-6 | 18000 | 7400 | 2.43 |
| A-9 | 9000 | 3900 | 2.29 |

Synthesis Example 5: Synthesis of Low-Molecular-Weight Compound A

The following low-molecular-weight compound B-1 was synthesized with reference to the documents ("Tatematsu et al., Oil Chemistry, 1980, Vol. 29 (1), p23" and "Tatematsu et al., Pharmaceutical Sciences, 1976, Vol. 25 (5), p287").

(B-1)

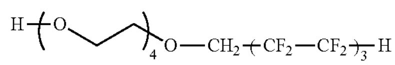

Examples 1 to 8 and Comparative Example 1 (Test in Aspect in which Composition is Negative Tone Photosensitive Resin Composition)

[Manufacture of Resin]

In the following synthesis examples, the following abbreviations respectively represent the following compounds.

St: Styrene (manufactured by FUJIFILM Wako Pure Chemical Corporation)

MAA: Methacrylic acid (manufactured by Fujifilm Wako Pure Chemical Corporation)

MMA: Methyl methacrylate (manufactured by FUJIFILM Wako Pure Chemical Corporation)

BzMA: Benzyl methacrylate (manufactured by Fujifilm Wako Pure Chemical Corporation)

AA: Acrylic acid (manufactured by Tokyo Chemical Industry Co., Ltd.)

PGMEA: Propylene glycol monomethyl ether acetate (manufactured by Showa Denko K.K.)

MEK: Methyl ethyl ketone (manufactured by SANKYO CHEMICAL Co., Ltd.)

V-601: Dimethyl-2,2'-azobis(2-methylpropionate) (manufactured by FUJIFILM Wako Pure Chemical Corporation)

<Synthesis of Resin P-1>

PGMEA (116.5 parts) was placed in a three-neck flask, and the temperature was raised to 90° C. in a nitrogen atmosphere. A solution obtained by adding St (52.0 parts), MMA (19.0 parts), MAA (29.0 parts), V-601 (4.0 parts), and PGMEA (116.5 parts) was added dropwise over 2 hours to the solution in the flask maintained at 90° C.±2° C. After completion of the dropwise addition, the solution in the flask was stirred at 90° C.±2° C. for 2 hours to obtain a resin P-1 (solid content concentration: 30.0% by mass).

<Synthesis of Resins P-2 and P-3>

The kind, composition, and the like of the monomer to be used were changed as shown in Table 2, and the other conditions were the same as those in the method for the resin P-1 to obtain a solution containing a resin P-2 and a solution containing a resin P-3. The solid content concentrations of the solution containing the resin P-2 and the solution containing the resin P-3 were each 30% by mass.

Table 2 below shows the composition (in terms of % by mass) and the weight-average molecular weight of each resin.

It is noted that all of the resins P-1 to P-3 correspond to the alkali-soluble resin.

In Table 2, "St" means a constitutional unit derived from styrene, "BzMA" means a constitutional unit derived from benzyl methacrylate, "MAA" means a constitutional unit derived from methacrylic acid, and "MMA" means a constitutional unit derived from methyl methacrylate.

TABLE 2

| | P-1 | P-2 | P-3 |
|---|---|---|---|
| St | 52 | | 32 |
| BzMA | | 81 | |
| MAA | 29 | 19 | 28 |
| MMA | 19 | | 40 |
| Weight-average molecular weight (Mw) | 60000 | 40000 | 40000 |

[Preparation of Photosensitive Resin Compositions 1 to 9]

According to the prescriptions shown in Table 3 shown in the latter part, components were mixed with stirring to prepare photosensitive resin compositions 1 to 9.

The formulation of each of the photosensitive resin compositions 1 to 9 is shown below.

In the table, the numerical value for each component in each photosensitive resin composition indicates the adding amount (in terms of part by mass) of each component.

It is noted that the resin was added to each photosensitive resin composition in a form of a solution containing the resin. In the table, the numerical value indicating the adding amount of the resin is the mass of the added "solution containing the resin".

Hereinafter, the same shall apply to components which are added to the composition in a form of being contained in the mixed solution, unless otherwise specified.

In the table, the column "Average film thickness of photosensitive resin layer (m)" indicates the average film thickness of the photosensitive resin layer formed in a case where a test has been carried out using each photosensitive resin composition. Details of the test will be described later.

| | | Example 1 Photosensitive resin composition 1 | Example 2 Photosensitive resin composition 2 | Example 3 Photosensitive resin composition 3 | Example 4 Photosensitive resin composition 4 | Example 5 Photosensitive resin composition 5 |
|---|---|---|---|---|---|---|
| Resin | P-1 | 50.00 | 50.00 | 50.00 | 50.00 | 50.00 |
| | P-2 | | | | | |
| | P-3 | | | | | |
| Polymerizable compound | BPE-500 | 36.20 | 36.20 | 36.20 | 36.20 | 36.20 |
| | BPE-200 | | | | | |
| | Dimethacrylate of polyethylene glycol | | | | | |

-continued

| | | | | | | |
|---|---|---|---|---|---|---|
| | which is obtained by adding 15 mol of ethylene oxides in average and 2 mol of propylene oxides in average to both ends of bisphenol A, respectively | | | | | |
| | M-270 | 5.00 | 5.00 | 5.00 | 5.00 | 5.00 |
| | A-TMPT | | | | | |
| | SR-454 | | | | | |
| | SR-502 | | | | | |
| | A-9300-CLI | | | | | |
| Photopolymerization initiator | B-CIM | 7.00 | 7.00 | 7.00 | 7.00 | 7.00 |
| | SB-PI 701 | 0.60 | 0.60 | 0.60 | 0.60 | 0.60 |
| Coloring agent | Leucocrystal violet | 0.40 | 0.40 | 0.40 | 0.40 | 0.40 |
| | Brilliant green | | | | | |
| Additive | N-phenylglycine | 0.20 | 0.20 | 0.20 | 0.20 | 0.20 |
| | CBT-1 | 0.10 | 0.10 | 0.10 | 0.10 | 0.10 |
| | 1:1 mixture (in terms of mass ratio) of 1-(2-di-n-butylaminomethyl)-5-carboxybenzo-triazole and 1-(2-di-n-butylamino-methyl)-6-carboxybenzo-triazole | | | | | |
| | TDP-G | 0.30 | 0.30 | 0.30 | 0.30 | 0.30 |
| | Irganox 245 | | | | | |
| | N-nitrosophenyl hydroxylamine aluminum salt | | | | | |
| | Phenidone | 0.01 | 0.01 | 0.01 | 0.01 | 0.01 |
| Compound A or comparative compound | A-1 | 0.29 | | | | |
| | A-5 | | 0.29 | | | |
| | A-6 | | | 0.29 | | |
| | A-9 | | | | 0.29 | |
| | B-1 | | | | | 0.29 |
| | MEGAFACE F552 | | | | | |
| Solvent | 1-methoxy-2-propylacetate | 227 | 227 | 227 | 227 | 227 |
| | Methyl ethyl ketone | 340 | 340 | 340 | 340 | 340 |
| Average film thickness of photosensitive resin layer (μm) | | 2.0 | 2.0 | 2.0 | 2.0 | 2.0 |

| | | Example 6 Photosensitive resin composition 6 | Example 7 Photosensitive resin composition 7 | Example 8 Photosensitive resin composition 8 | Comparative Example 1 Photosensitive resin composition 9 |
|---|---|---|---|---|---|
| Resin | P-1 | | | 51.00 | 50.00 |
| | P-2 | | 59.20 | | |
| | P-3 | 62.20 | | | |
| Polymerizable compound | BPE-500 | | 27.00 | 15.00 | 36.20 |
| | BPE-200 | 20.00 | | | |
| | Dimethacrylate of polyethylene glycol which is obtained by adding 15 mol of ethylene oxides in average and 2 mol of propylene oxides in average to both ends of bisphenol A, respectively | | | 10.00 | |
| | M-270 | | | | 5.00 |
| | A-TMPT | 6.00 | | 5.00 | |
| | SR-454 | 9.00 | | 5.00 | |
| | SR-502 | | 4.00 | | |
| | A-9300-CLI | | 7.80 | 9.77 | |

-continued

| | | | | | |
|---|---|---|---|---|---|
| Photopolymerization initiator | B-CIM | 1.90 | 1.10 | 3.00 | 7.00 |
| | SB-PI 701 | 0.30 | 0.10 | 0.30 | 0.50 |
| Coloring agent | Leucocrystal violet | 0.40 | 0.66 | 0.60 | 0.40 |
| | Brilliant green | 0.05 | | 0.02 | |
| Additive | N-phenylglycine | | | | 0.20 |
| | CBT-1 | 0.03 | 0.03 | | 0.10 |
| | 1:1 mixture (in terms of mass ratio) of 1-(2-di-n-butylaminomethyl)-5-carboxybenzotriazole and 1-(2-di-n-butylaminomethyl)-6-carboxybenzotriazole | | | 0.10 | |
| | TDP-G | | | | 0.30 |
| | Irganox245 | 0.10 | 0.10 | 0.20 | |
| | N-nitrosophenyl hydroxylamine aluminum salt | 0.02 | 0.01 | 0.01 | |
| | Phenidone | | | | 0.01 |
| Compound A or comparative compound | A-1 | 0.29 | 0.29 | | |
| | A-5 | | | | |
| | A-6 | | | | |
| | A-9 | | | 0.29 | |
| | B-1 | | | | |
| | MEGAFACE F552 | | | | 0.29 |
| Solvent | 1-methoxy-2-propylacetate | 227 | 227 | 227 | 227 |
| | Methyl ethyl ketone | 340 | 340 | 340 | 340 |
| Average film thickness of photosensitive resin layer (μm) | | 2.0 | 2.0 | 2.0 | 2.0 |

Details of each component in Table 3 are as follows.

BPE-500: 2,2-bis(4-((meth)acryloxypentaethoxy)phenyl) propane, manufactured by SHIN-NAKAMURA CHEMICAL Co., Ltd.

BPE-200: 2,2-bis(4-((meth)acryloxydiethoxy)phenyl) propane, manufactured by SHIN-NAKAMURA CHEMICAL Co., Ltd.

M-270: Polypropylene glycol diacrylate (n≈12), manufactured by Toagosei Co., Ltd.

A-TMPT: Trimethylolpropane triacrylate, manufactured by SHIN-NAKAMURA CHEMICAL Co., Ltd.

SR-454: Ethoxylated (3) trimethylolpropane triacrylate, manufactured by Arkema S.A.

SR-502: Ethoxylated (9) trimethylolpropane triacrylate, manufactured by Arkema S.A.

A-9300-CL1: A caprolactone-modified (meth)acrylate compound, manufactured by SHIN-NAKAMURA CHEMICAL Co., Ltd.

B-CIM: 2,2'-bis(2-chlorophenyl)-4,4',5,5'-tetraphenyl-biimidazole, manufactured by Hampford Research Inc.

SB-PI 701: 4,4'-bis(diethylamino)benzophenone, manufactured by Sanyo Trading Co., Ltd.

Leucocrystal violet: manufactured by Tokyo Chemical Industry Co., Ltd.

Brilliant green: manufactured by Tokyo Chemical Industry Co., Ltd.

N-phenylglycine: manufactured by Tokyo Chemical Industry Co., Ltd.

CBT-1: Carboxybenzotriazole, manufactured by JOHOKU CHEMICAL Co., Ltd.

TDP-G: Phenothiazine, manufactured by Kawaguchi Chemical Industry Company, Limited Irganox 245: A hindered phenol-based antioxidant, manufactured by BASF SE N-nitrosophenyl hydroxylamine aluminum salt: manufactured by Fujifilm Wako Pure Chemical Corporation Phenidone: manufactured by Tokyo Chemical Industry Co., Ltd.

F552: MEGAFACE F552, manufactured by DIC Corporation, a fluorine-based surfactant which does not correspond to the compound A A-1, A-5, A-6, A-9, and B-1: Respective polymers (A-1), (A-5), (A-6), (A-9), and (B-1) (all correspond to the compound A) which produced by the methods described above

[Test]

Example 1

Using a slit-shaped nozzle, the prepared photosensitive resin composition 1 was applied onto a polyethylene terephthalate film (Lumirror 16KS40 (manufactured by Toray Industries, Inc.)) having a thickness of 16 μm so that the width was 1.0 μm and the average film thickness of the photosensitive resin layer to be obtained was a specified film thickness.

Then, the polyethylene terephthalate film (the temporary support) was allowed to pass through, over 60 seconds, a drying zone of 3 m in which the temperature was set to 80° C. and the film surface wind speed was set to be 3 m/sec by adjusting the intake amount and the exhaust amount, thereby obtaining a photosensitive resin layer (a negative tone photosensitive resin layer) on the temporary support.

Examples 2 to 8 and Comparative Example 1

Each photosensitive resin layer was produced in the same manner as in the photosensitive resin composition 1 and evaluated, except that the used photosensitive resin composition was changed as described in Table 3.

Examples 9 and 10, and Comparative Example 2 (Tests in Aspect in which Composition is Thermoplastic Resin Composition)

[Synthesis of Resin P-4]

The kind and the composition of the monomer to be used were changed as shown in Table 4, and the other conditions were the same as those in the method for the resin P-1 to obtain a solution containing a resin P-4. The solid content concentration of the solution containing the resin P-4 was set to 30% by mass.

It is noted that the resin P-4 corresponds to the alkali-soluble resin.

Table 4 shows the composition (in terms of % by mass) of the resin P-4. In Table 4, "BzMA" means a constitutional unit derived from benzyl methacrylate, "MAA" means a constitutional unit derived from methacrylic acid, and "AA" means a constitutional unit derived from acrylic acid.

TABLE 4

| | P-4 |
|---|---|
| BzMA | 75 |
| MAA | 10 |
| AA | 15 |
| Weight-average molecular weight (Mw) | 30,000 |

[Preparation of Thermoplastic Resin Compositions 1 to 3]

Mixing was carried out according to the preparations and blending amounts (in terms of parts by mass) shown in Table 5 to prepare thermoplastic resin compositions 1 to 3 In the table, the column "Average film thickness of thermoplastic resin layer (in)" indicates the average film thickness of the thermoplastic resin layer formed in a case where a test has been carried out using each thermoplastic resin composition. Details of the test will be described later.

In Table 5, the abbreviations indicate the following compounds, respectively.

P-4: A resin that contains a constitutional unit based on benzyl methacrylate, a constitutional unit based on methyl methacrylate, and a constitutional unit based on acrylic acid by 75% by mass, 10% by mass, and 15% by mass, respectively, with respect to the total mass of the resin, and has a weight-average molecular weight of 30,000. It is noted that P-4 corresponds to a resin which is an alkali-soluble resin which is a thermoplastic resin. In addition, P-4 was added to the thermoplastic resin composition in a form of a solution containing P-4 (solid content concentration: 30.000 by mass, solvent: PGMEA).

ACRYBASE FF 187: A solution containing a resin which is an alkali-soluble thermoplastic resin (solid content concentration: 40% by mass, solvent: PGMEA, manufactured by Fujikura Kasei Co., Ltd.)

BB-1: A compound having the structure shown below (a coloring agent that develops color by an acid)

BB-1

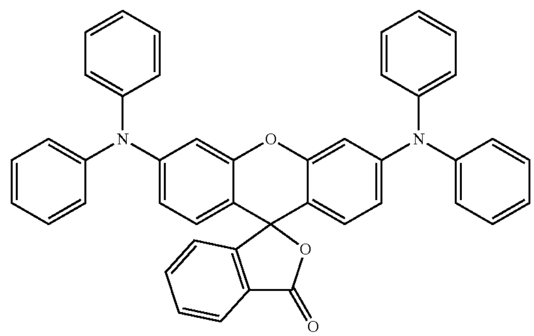

TABLE 5

| | | Example 9 Thermoplastic resin composition 1 | Example 10 Thermoplastic resin composition 2 | Comparative Example 2 Thermoplastic resin composition 3 |
|---|---|---|---|---|
| Resin | P-4 | 42.85 | 35.15 | 35.15 |
| | ACRYBASE FF187 (manufactured by Fujikura Kasei Co., Ltd.) | | 35.15 | 35.15 |
| Coloring agent | BB-1 | 0.08 | | |
| Photoacid generator | C-1 | 0.32 | | |
| Plasticizer (Polymerizable compound) | Tricyclodecanedimethanol diacrylate (A-DCP, manufactured by, Ltd.) SHIN-NAKAMURA CHEMICAL Co, Ltd.) | 4.63 | 6.01 | 6.01 |
| | Monomer having carboxy group, ARONIX TO-2349 (manufactured by Toagosei Co., Ltd.) | 2.31 | 3.00 | 3.00 |
| | Urethane acrylate 8UX-015A (manufactured by Taisei Fine Chemical Co., Ltd.) | 0.77 | 1.00 | 1.00 |
| Compound A or comparative compound | A-1 (polymer A-1 manufactured by method described above) | 0.03 | 0.03 | |
| | MEGAFACE F551A (manufactured by DIC Corporation, fluorine-based surfactant which does not correspond to compound A) | | | 0.03 |
| Solvent | MEK | 39.5 | 39.5 | 39.5 |
| | PGMEA | 9.51 | 9.51 | 9.51 |
| Average film thickness of thermoplastic resin layer (μm) | | 2.0 | 7.0 | 7.0 |

C-1: A compound having a structure shown below (a photoacid generator, the compound described in paragraph 0227, which is synthesized according to the method described in paragraph 0227 of JP2013-047765A)

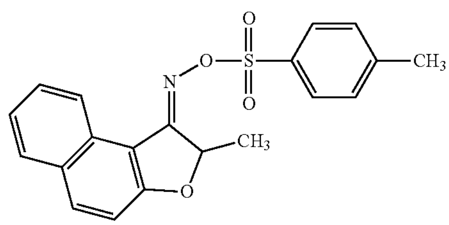 [SMILES: Cc1ccc(S(=O)(=O)O/N=C2/c3c(ccc4ccccc34)OC2C)cc1]

A-1: A polymer (A-1) manufactured by the method described above.

[Test]

Example 9

Using a slit-shaped nozzle, the prepared thermoplastic resin composition 1 was applied onto a polyethylene terephthalate film (Lumirror 16KS40 (manufactured by Toray Industries, Inc.)) having a thickness of 16 μm so that the width was 1.0 μm and the average film thickness of the thermoplastic resin layer to be obtained was a specified film thickness. Then, the polyethylene terephthalate film (the temporary support) was allowed to pass through, over 60 seconds, a drying zone of 3 m in which the temperature was set to 80° C. and the film surface wind speed was set to be 3 m/sec by adjusting the intake amount and the exhaust amount, thereby obtaining a thermoplastic resin layer 1 on the temporary support.

Example 10 and Comparative Example 2

Each thermoplastic resin layer was produced in the same manner as in the thermoplastic resin composition 1 and evaluated, except that the average film thicknesses of the used thermoplastic resin composition and the thermoplastic resin layer to be formed were changed as described in Table 5.

Examples 11 and Comparative Example 3 (Test in Aspect in which Composition is Coloration Resin Composition that is Also Negative Tone Photosensitive Resin Composition)

Preparation of Photosensitive Resin Compositions 10 and 11

According to the prescriptions described in Table 6 below, components were mixed with stirring to prepare photosensitive resin compositions 10 and 11. It is noted that the unit of the amount of each component is part by mass.

In the table, the column "Average film thickness of photosensitive resin layer (μm)" indicates the average film thickness of the photosensitive resin layer formed in a case where a test has been carried out using each photosensitive resin composition. Details of the test will be described later.

TABLE 6

| | | Example 11 Photosensitive resin composition 10 | Comparative Example 3 Photosensitive resin composition 11 |
|---|---|---|---|
| Pigment | Black pigment dispersion FDK-T-11 | 186.4 | 186.4 |
| Binder | ACRIT 8KB-001 | 182.6 | 182.6 |
| Polymerizable compound | A-NOD-N | 4.4 | 4.4 |
| | A-DCP | 13.3 | 13.3 |
| | 8UX-015A | 8.9 | 8.9 |
| | 75 wt % PGMEA solution of KAYARAD DPHA | 3.9 | 3.9 |
| Photopolymerization initiator | Irgacure OXE 02 | 7.7 | 7.7 |
| Solvent | 1-methoxy-2-propylacetate | 195.8 | 195.8 |
| | Methyl ethyl ketone | 392.5 | 392.5 |
| Additive | 1,2,4-triazole | 3.2 | 3.2 |
| Compound A or comparative compound | A-1 (polymer A-1 manufactured by method described above) | 0.4 | |
| | MEGAFACE F555A (manufactured by DIC Corporation, fluorine-based surfactant which does not correspond to compound A) | | 1.3 |
| Average film thickness of photosensitive resin layer (μm) | | 3.0 | 3.0 |

Details of the components described in Table 6 are as shown below.

—Pigment—

Black pigment dispersion FDK-T-11: An aqueous solution having a solid content concentration of 27% by mass, pigment: carbon black, manufactured by TOKYO PRINTING INK MFG. Co., Ltd.

—Polymerizable Compound—

A-NOD-N: 1,9-nonanediol diacrylate, manufactured by SHIN-NAKAMIURA CHEMICAL Co., Ltd.

A-DCP: Tricyclodecanedimethanol diacrylate (manufactured by SHIN-NAKAMURA CHEMICAL Co., Ltd.)

8UX-015A: Urethane acrylate, manufactured by Taisei Fine Chemical Co., Ltd.

75% by mass PGMEA solution of KAYARAD DPHA: A 75% by mass propylene glycol monomethyl ether acetate solution of KAYARAD DPHA (product name: manufactured by Nippon Kayaku Co., Ltd. The composition of KAYARAD DPHA is shown below.

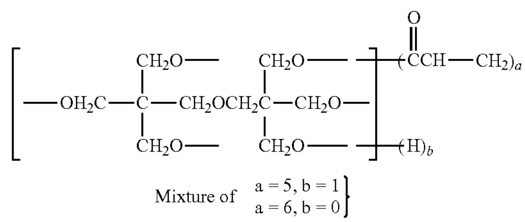

—Binder (Alkali-Soluble Resin)—

ACRIT 8 KB-001: A non-crosslinkable acrylic binder, solid content concentration: 38% by mass, solvent: PGMEA, manufactured by Taisei Fine Chemical Co., Ltd., ACRIT (registered trade name) 8 KB-001

—Photopolymerization Initiator—

Irgacure OXE-02: manufactured by BASF SE, ethanone, 1-[9-ethyl-6-(2-methylbenzoyl)-9H-carbazole-3-yl]-1-(0-acetyloxime)

—Solvent—

1-methoxy-2-propylacetate

Methyl ethyl ketone

—Additive—

1,2,4-triazole: manufactured by Tokyo Chemical Industry Co., Ltd.

—Compound a or Comparative Compound—

Aa-1: A polymer (A-1) manufactured by the method described above.

MEGAFACE F555A: manufactured by DIC Corporation, a fluorine-based surfactant which does not correspond to the compound A

[Test]

Example 11

Using a slit-shaped nozzle, the prepared photosensitive resin composition 10 was applied onto a polyethylene terephthalate film (Lumirror 16KS40 (manufactured by Toray Industries, Inc.)) having a thickness of 16 μm so that the width was 1.0 μm and the average film thickness of the photosensitive resin layer to be obtained was a specified film thickness.

Then, the polyethylene terephthalate film (the temporary support) was allowed to pass through, over 60 seconds, a drying zone of 3 m in which the temperature was set to 80° C. and the film surface wind speed was set to be 3 m/see by adjusting the intake amount and the exhaust amount, thereby obtaining a photosensitive resin layer (a coloration resin layer) on the temporary support.

Comparative Example 3

Each coating film was produced in the same manner as in the photosensitive resin composition 10 and evaluated, except that the average film thicknesses of the used photosensitive resin composition and the photosensitive resin composition to be formed were changed as described in Table 6.

Examples 12 and 13 and Comparative Example 4 (Test in Aspect in which Composition is Negative Tone Photosensitive Resin Composition)

[Manufacture of Resin]

<Synthesis of Resin P-5>

Propylene glycol monomethyl ether acetate (60 g, Fujifilm Wako Pure Chemical Corporation) and propylene glycol monomethyl ether (240 g, Fujifilm Wako Pure Chemical Corporation) were introduced into a flask having a capacity of 2,000 mL. The obtained liquid was heated to 90° C. while being stirred at a stirring speed of 250 rounds per minute (rpm; the same applies hereinafter).

For the preparation of a dropping liquid (1), methacrylic acid (107.1 g, manufactured by Mitsubishi Chemical Corporation, product name: Acryester M), methyl methacrylate (5.46 g, manufactured by Mitsubishi Gas Chemical Company, Inc., product name: MMA), and cyclohexyl methacrylate (231.42 g, manufactured by Mitsubishi Gas Chemical Company, Inc., product name: CHMA) were mixed and diluted with propylene glycol monomethyl ether acetate (60.0 g) to obtain the dropping liquid (1).

For the preparation of a dropping liquid (2), dimethyl 2,2'-azobis(2-methylpropionate) (9.637 g, FUJIFILM Wako Pure Chemical Corporation, product name: V-601) was dissolved in propylene glycol monomethyl ether acetate (136.56 g) to obtain a dropping liquid (2).

The dropping liquid (1) and the dropping liquid (2) were simultaneously added dropwise over 3 hours to the above-described flask (specifically, the 2,000 mL flask containing a liquid heated to 90° C.) having a capacity of 2,000 mL. After completion of the dropwise addition, V-601 (2.401 g) was added to the flask every hour three times. Then, stirring was further carried out at 90° C. for 3 hours.

Then, the solution (the reaction solution) obtained in the flask was diluted with propylene glycol monomethyl ether acetate (178.66 g). Next, tetraethylammonium bromide (1.8 g, Fujifilm Wako Pure Chemical Corporation) and hydroquinone monomethyl ether (0.8 g, Fujifilm Wako Pure Chemical Corporation) were added to the above reaction solution. Thereafter, the temperature of the reaction solution was raised to 100° C.

Next, 76.03 g of glycidyl methacrylate (manufactured by NOF Corporation, product name: Blemmer G) was dropwise added to the reaction solution over 1 hour. The above reaction solution was reacted at 100° C. for 6 hours to obtain 1,158 g of a solution of the resin P-5 (solid content concentration: 36.3% by mass). The obtained resin P-5 had a weight-average molecular weight of 27,000, a number-average molecular weight of 15,000, and an acid value of 95 mgKOH/g. The amount of the residual monomer measured by using gas chromatography was less than 0.1% by mass with respect to the polymer solid content.

<Synthesis of Resin P-6>

A resin P-6 was obtained with reference to the synthesis method for the resin P-5.

Specifically, in the dropping liquid (1) used in the synthesis of the resin P-5, the configuration in which methacrylic acid (107.1 g), methyl methacrylate (5.46 g), and cyclohexyl methacrylate (231.42 g) were used as monomers were changed a configuration in which the monomers shown in Table 7 below were used. In addition, the adding amount of glycidyl methacrylate (76.03 g) was also changed so that the composition of MAA-GMA in Table 7 below was obtained.

The solid content concentration of the obtained solution of the resin P-6 was 36.3% by mass, and the weight-average molecular weight of the obtained resin P-6 was 17,000.

Table 7 shows the composition (in terms of % by mass) of the resin P-6. In Table 7, "St" means a constitutional unit derived from styrene, "MAA" means a constitutional unit derived from methacrylic acid, and "MMA" means a constitutional unit derived from methyl methacrylate. In addition, "MAA-GMA" indicates a constitutional unit in which glycidyl methacrylate is added to a constitutional unit derived from methacrylic acid.

TABLE 7

| | P-6 |
|---|---|
| St | 47.7 |
| MAA-GMA | 32 |
| MAA | 19 |
| MMA | 1.3 |
| Weight-average molecular weight (Mw) | 17000 |

It is noted that all of the resins P-5 and P-6 correspond to the alkali-soluble resin. Each of the resins P-5 and P-6 was added to the photosensitive resin composition in a form of a solution containing each of the resins.

[Synthesis of Blocked Isocyanate Compound]

<Synthesis of Blocked Isocyanate Compound Q-1>

Butanone oxime (manufactured by Idemitsu Kosan Co., Ltd.) (453 g) was dissolved in methyl ethyl ketone (700 g) under a nitrogen stream. To the obtained solution, 1,3-bis (isocyanatomethyl)cyclohexane (a mixture of cis and trans isomers, manufactured by Mitsui Chemicals, Inc., TAKENATE 600) (500 g) was added dropwise over 1 hour under ice cooling, and after the dropwise addition, the reaction was further carried out for 1 hour. Then, the temperature of the solution was raised to 40° C., and the reaction was carried out for 1 hour. It was confirmed that the reaction was completed by $^{1}$H-nuclear magnetic resonance (NMR) and high performance liquid chromatography (HPLC), and a methyl ethyl ketone solution (solid content concentration: 57.7% by mass) of a blocked isocyanate compound Q-1 (see the following formula) was obtained.

It is noted that the blocked isocyanate compound Q-1 was added to the photosensitive resin composition in a form of a solution containing the blocked isocyanate compound Q-1.

| Blocked isocyanate compound | Structure | NCO value [mmol/g] |
|---|---|---|
| Q-1 | 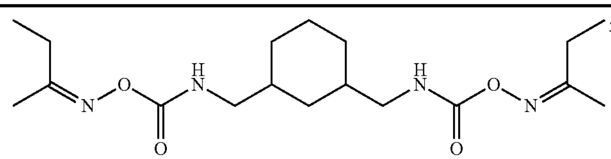 | 5.4 |

<Synthesis of Blocked Isocyanate Compound Q-8>

A methyl ethyl ketone solution (solid content concentration: 75.0% by mass) of a blocked isocyanate compound Q-8 (see the following formula) was obtained with reference to a synthesis method for the blocked isocyanate compound Q-1.

It is noted that the blocked isocyanate compound Q-8 was added to the photosensitive resin composition in a form of a solution containing the blocked isocyanate compound Q-8.

| | | |
|---|---|---|
| Q-8 | 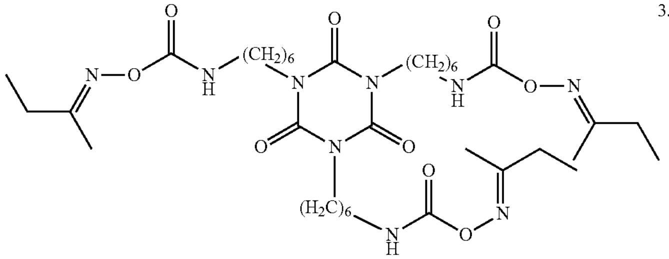 | 3.9 |

[Preparation of Photosensitive Resin Compositions 12 to 14]

According to the prescriptions described in Table 8 below, components were mixed with stirring to prepare photosensitive resin compositions 12 and 14. It is noted that the unit of the amount of each component is part by mass.

In the table, the column "Average film thickness of photosensitive resin layer (μm)" indicates the average film thickness of the photosensitive resin layer formed in a case where a test has been carried out using each photosensitive resin composition. Details of the test will be described late

TABLE 8

| | | Example 12 Photosensitive resin composition 12 | Example 13 Photosensitive resin composition 13 | Comarative Example 4 Photosensitive resin composition 14 |
|---|---|---|---|---|
| Polymerizable compound | Tricyclodecanedim ethanoldiacrylate (A-DCP, manufactured by SHIN-NAKAMURA CHEMICAL Co, Ltd.) | 5.60 | 18.26 | 5.60 |
| | 1, 9-nonanedo Idiacry late (A-NOD -N (manufactured by SHIN-NAKAMURA CHEMICAL Co., Ltd.)) | | 2.79 | |
| | Dipentaerythrito lhexaacry late (A-DPH (manufactured by SHIN-NAKAMURA CHEMICAL Co., Ltd.)) | | 8.15 | |
| | Monomer having carboxy group, ARONIX TO-2349 (manufactured by Toagosei Co., Ltd. ) | 0.93 | 3.04 | 0.93 |
| | Urethane acrylate 8UX-015A (manufactured by Taisei Fine Chemical Co., Ltd.) | 2.80 | | 2.80 |
| Alkali-soluble resin | P-5 | 42.85 | | 42.85 |
| | P-6 | | 49.03 | |
| Photopolymerization initiator | 1-[9-ethyl-6-(2-methybenzoyl)-9H-carbazole-3-yl]ethanone-1-(0-acetyloxime) (IRGACURE OXE-02, manufactured by BASF SE) | 0.11 | 0.37 | 0.11 |
| | 2-methyl (4-methylthiophenyl)-2-morpholinopropane-1-one (Irgacure 907, manufactured by BASF SE) | 0.21 | 0.74 | 0.21 |
| Additive | DURANATE TPA-B80E (blocked isocyanate compound, manufactured by AsahiKasei Chemicals Co., Ltd.) | 4.53 | | 4.53 |
| | Blocked isocyanate compound Q-1 | | 2.97 | |
| | Blocked isocyanate compound Q-8 | | 12.50 | |
| | N-phenylglycine (manufactured by Tokyo Chemical Industry Co., Ltd. ) | 0.03 | 0.10 | 0.03 |
| | Benzimidazole (manufactured by Tokyo Chemical Industry Co., Ltd.) | 0.09 | 0.13 | 0.09 |
| | Isonicotinamide (manufactured by Tokyo Chemical Industry Co., Ltd. ) | | 0.52 | |
| | SMAEF-40 (copolymer of styrene/maleic acid anhydride = 4:1 (molar ratio), acid anhydride value: 1.94 mmol/g, Mw:10,500, manufactured by Cray Valley) | | 1.20 | |
| | A-1 (polymer A-1 manufactured by method described above) | 0.16 | 0.16 | — |
| | MEGAFACE F551A (manufactured by DIC Corporation, fuorine-based surfactant which does not correspond to compound A) | — | — | 0.16 |
| Solvent | Methylethylketone | 42.69 | 42.69 | 42.69 |
| | Average fim thickness ofphotosensitive resin layer (μm) | 8.0 | 5.0 | 8.0 |

[Test]

Example 12

The coating amount of the photosensitive resin composition was adjusted so that the average film thickness of the photosensitive composition layer after drying was a specified film thickness, and using a slit-shaped nozzle, the photosensitive resin composition 12 was applied onto a temporary support of a polyethylene terephthalate film (Lumirror 16KS40 (manufactured by Toray Industries, Inc.)) having a thickness of 16 km.

Next, the temporary support was allowed to pass through, over 60 seconds, a drying zone of 3 m in which the temperature was set to 80° C. and the film surface wind speed was set to be 3 in/sec by adjusting the intake amount and the exhaust amount, thereby forming a photosensitive resin layer (a negative tone photosensitive resin layer) on the temporary support.

Example 13 and Comparative Example 4

Each coating film was produced in the same manner as in the photosensitive resin composition 12 and evaluated, except that the average film thicknesses of the photosensitive resin composition and the photosensitive resin layer to be formed were changed as described in Table 8.

[Evaluation of Coatability]

By observing a state from application to drying, the coatability of the composition in a case where the composition layer (the photosensitive resin layer or the like) was formed by using each composition (the photosensitive resin composition or the like) as described above was evaluated based on five stages of A to E. The meanings of A to E are as follows. It is noted that a level of C or higher is a practical level.

A: Immediately after coating, the coating is completely uniform over the entire surface, and the coatability is extremely good.

B: Immediately after coating, only a few millimeters of both end portions of the coating liquid film are coated slightly thickly; however, leveling is achieved by the time when dried, and the coatability is good.

C: Immediately after coating, slight unevenness is observed; however, leveling is achieved by the time when dried except for a few millimeters of both end portions of the coating liquid film, and the coatability is normal.

D: Immediately after coating, no cissing is observed; however, unevenness is observed, leveling is not achieved by the time when dried, and the coatability is poor.

E: Immediately after coating, cissing occurs on the entire surface or coating cannot be achieved, and the coatability is extremely poor.

Table 9 shows the evaluation results.

In the following, the "used compound" indicates the kind of the compound A or the comparative compound contained in the composition.

TABLE 9

| | Composition | Used compound | Coating surface shape |
|---|---|---|---|
| Example 1 | Photosensitive resin composition 1 | A-1 | A |
| Example 2 | Photosensitive resin composition 2 | A-5 | B |
| Example 3 | Photosensitive resin composition 3 | A-6 | B |
| Example 4 | Photosensitive resin composition 4 | A-9 | C |
| Example 5 | Photosensitive resin composition 5 | B-1 | C |
| Example 6 | Photosensitive resin composition 6 | A-1 | A |
| Example 7 | Photosensitive resin composition 7 | A-1 | A |
| Example 8 | Photosensitive resin composition 8 | A-9 | C |
| Comparative Example 1 | Photosensitive resin composition 9 | F552 | D |
| Example 9 | Thermoplastic resin composition 1 | A-1 | A |
| Example 10 | Thermoplastic resin composition 2 | A-1 | A |
| Comparative Example 2 | Thermoplastic resin composition 3 | F551A | D |
| Example 11 | Photosensitive resin composition 10 | A-1 | A |
| Comparative Example 3 | Photosensitive resin composition 11 | F555A | D |
| Example 12 | Photosensitive resin composition 12 | A-1 | A |
| Example 13 | Photosensitive resin composition 13 | A-1 | A |
| Comparative Example 4 | Photosensitive resin composition 14 | F551A | D |

From the results of Examples, it has been confirmed that the composition according to the embodiment of the present invention has excellent coatability and enables the production of a film having high homogeneity.

Among the above, it was confirmed that in a case where the composition contains the high-molecular-weight compound A having a poly(oxyalkylene) structure, the coatability is more excellent.

Among the above, it was confirmed that in a case where the composition contains the high-molecular-weight compound A having a poly(oxyalkylene) structure and having a weight-average molecular weight of 5,000 to 11,500 or less, the coatability is more excellent.

Production of Transfer Film and Use Example Thereof

Production of Transfer Film and Use Example 1 Thereof: Example 14

Using a slit-shaped nozzle, the prepared thermoplastic resin composition 1 prepared in Example 9 was applied onto a polyethylene terephthalate film (Lumirror 16KS40 (manufactured by Toray Industries, Inc.)) having a thickness of 16 μm so that the width was 1.0 μm and the average film thickness of the composition layer after drying was a thickness of 2.0 μm, and it was allowed to pass through, over 60 seconds, a drying zone of 3 m in which the temperature was set to 80° C. and the film surface wind speed was set to be 0.2 m/see by adjusting the intake amount and the exhaust amount, thereby obtaining a laminate A of the temporary support and the thermoplastic resin layer.

Subsequently, the coating amount was adjusted so that the width was 1.0 μm and the average film thickness of the composition layer after drying was 1.0 μm, and using a slit-shaped nozzle, a water-soluble resin composition described later was applied onto the thermoplastic resin layer of the produced laminate A. Then, the laminate A was allowed to pass through, over 60 seconds, a drying zone of 3 m in which the temperature was set to 100° C. and the film surface wind speed was set to be 3 m/sec by adjusting the intake amount and the exhaust amount, thereby obtaining a laminate B in which a water-soluble resin layer was formed on the thermoplastic resin layer.

(Water-Soluble Resin Composition)

According to the following prescription, components were mixed with stirring to prepare a water-soluble resin composition.

Water-soluble resin ("PVA 205", manufactured by KURARAY Co., Ltd.) 32.2 parts by mass Water-soluble resin (polyvinylpyrrolidone, manufactured by Nippon Shokubai Co., Ltd.) 14.9 parts by mass MEGAFACE F444 (manufactured by DIC Corporation) 0.01 parts by mass Ion exchange water 524.0 parts by mass Methanol (manufactured by Mitsubishi Gas Chemical Company, Inc.) 429.0 parts by mass Subsequently, the coating amount was adjusted so that the width was 1.0 μm and the average film thickness of the composition layer after drying was 2.0 μm, and using a slit-shaped nozzle, the photosensitive resin composition 1 prepared in Example 1 was applied onto the water-soluble resin layer of the produced laminate B. Then, the laminate B was allowed to pass through, over 60 seconds, a drying zone of 3 m in which the temperature was set to 80° C. and the film surface wind speed was set to be 0.2 m/see by adjusting the intake amount and the exhaust amount, thereby obtaining a laminate in which a photosensitive resin layer was formed on the water-soluble resin layer.

Finally, a polyethylene terephthalate film having a thickness of 16 μm (Lumirror 16KS40 (manufactured by Toray Industries, Inc.)) was subjected to pressure bonding as a cover film to produce a transfer film (Example 14).

A copper layer having a thickness of 200 nm was provided on a polyethylene terephthalate (PET) film having a thickness of 100 μm by a sputtering method, and a PET substrate attached with a copper layer was prepared.

The prepared transfer film was wound forward and then laminated onto the PET substrate attached with a copper layer under laminating conditions of a laminating roll temperature of 100° C., a linear pressure of 1.0 MPa, and a linear speed of 4.0 m/min. At that time, the cover film was peeled off, and laminating was carried out so that the photosensitive resin layer in the transfer film was in contact with the copper layer. After exposure with an ultra-high pressure mercury lamp through a line-and-space pattern mask (Duty ratio 1:1, line width: 20 m) without peeling off the temporary support, the temporary support was peeled off and developed. Development was carried out using a 1.0% sodium carbonate aqueous solution at 25° C. for 30 seconds by shower development. In a case where a line-and-space pattern was formed according to the above method, good resolution was exhibited.

Production of Transfer Film and Use Example 2 Thereof: Example 15

Using a slit-shaped nozzle, the coating amount of the photosensitive resin composition was adjusted so that the width was 1.0 μm and the thickness of the photosensitive composition layer after drying was 8.0 μm, and the photosensitive resin composition 12 prepared in Example 12 was applied onto a temporary support of a polyethylene terephthalate film (Lumirror 16KS40 (manufactured by Toray Industries, Inc.)) having a thickness of 16 μm. Next, the obtained temporary support was allowed to pass through, over 60 seconds, a drying zone of 3 m in which the temperature was set to 80° C. and the film surface wind speed was set to be 0.2 m/sec by adjusting the intake amount and the exhaust amount, thereby obtaining a laminate C of the temporary support and the photosensitive resin layer.

Subsequently, the coating amount was adjusted so that the width was 1.0 μm and the average film thickness of the composition layer after drying was 80 nm, and using a slit-shaped nozzle, a resin composition (a composition for forming a refractive index adjusting layer) described later was applied onto the photosensitive resin layer of the produced laminate C. Then, the laminate C was allowed to pass through, over 60 seconds, a drying zone of 3 m in which the temperature was set to 80° C. and the film surface wind speed was set to be 3 m/sec by adjusting the intake amount and the exhaust amount, thereby obtaining a laminate in which a refractive index adjusting layer was formed on the photosensitive resin layer.

Finally, a polyethylene terephthalate film having a thickness of 16 μm (Lumirror 16KS40 (manufactured by Toray Industries, Inc.)) was subjected to pressure bonding as a cover film to produce a transfer film (Example 15).

Composition for Forming Refractive Index Adjusting Layer

These components were mixed with stirring according to the following prescription to prepare a composition for forming a refractive index adjusting layer. The following composition for forming a refractive index adjusting layer is used for forming a refractive index adjusting layer.

- NanoUse OZS-30M ($ZrO_2$ particles (containing tin oxide) methanol dispersion liquid (nonvolatile fraction: 30.5% by mass), manufactured by Nissan Chemical Industries, Ltd.) 4.34 parts by mass
- Ammonia water (25% by mass) 7.84 parts by mass
- Polymer P-7 obtained according to synthesis method described later 0.21 parts by mass
- ARUFON UC-3920 (manufactured by Toagosei Co., Ltd.) 0.08 parts by mass
- ARONIX TO-2349 (manufactured by Toagosei Co., Ltd.) 0.03 parts by mass
- Benzotriazole BT-LX (manufactured by JOHOKU CHEMICAL Co., Ltd.) 0.03 parts by mass
- Monoisopropanolamine 0.02 parts by mass
- MEGAFACE F444 (manufactured by DIC Corporation) 0.01 parts by mass
- Ion exchange water 21.7 parts by mass
- Methanol 65.8 parts by mass (Synthesis of Polymer P-7)

Propylene glycol monomethyl ether (270.0 g) was introduced into a three-neck flask, and the temperature was raised to 70° C. under a nitrogen stream while stirring.

On the other hand, allyl methacrylate (45.6 g, Fujifilm Wako Pure Chemical Corporation) and methacrylic acid (14.4 g) were dissolved in propylene glycol monomethyl ether (270.0 g), and further, V-65 (3.94 g, FUJIFILM Wako Pure Chemical Corporation) was dissolved therein to prepare a dropping liquid, which was added dropwise into the flask over 2.5 hours. The stirred state was maintained as it was, and the reaction was carried out for 2.0 hours. Then, the temperature of the contents in the flask was returned to room temperature, the contents in the flask were added dropwise into 2.7 L of ion-exchanged water in a stirred state, and reprecipitation was carried out to obtain a suspension. The suspension was filtered through Nutche (a Buchner funnel) in which a filter paper was placed, and the filtrate was further washed with ion-exchanged water to obtain a powder in a state of being wet. It was subjected to blast drying at 45° C., and it was confirmed that a constant weight was reached, whereby a resin A-7 was obtained as a powder at a yield of 70%. The amount of the residual monomer measured by using gas chromatography was less than 0.1% by mass with respect to the polymer solid content.

The protective film was peeled off from the obtained transfer film, and then lamination was carried out on both surfaces of COSMOSHINE A4300 (thickness: 50 m) of a polyethylene terephthalate film manufactured by TTOYOBO Co., Ltd., which had been subjected to a heat-treatment at 145° C. for 30 minutes, thereby forming a laminate having a layer structure of temporary support/photosensitive composition layer/refractive index adjusting layer/COSMOSHINE A4300 (thickness: 50 m)/refractive index adjusting layer/photosensitive composition layer/temporary support. The laminating conditions were a laminating roll temperature of 110° C., a linear pressure of 3 N/cm, and a transport speed of 2 m/min.

Then, using a proximity type exposure machine (manufactured by Hitachi High-Tech Corporation) having an ultra-high pressure mercury lamp, the entire surfaces of both surfaces were exposed at an exposure amount of 100 $mJ/cm^2$ (i-line) through the temporary support. After the temporary supports on both surfaces were peeled off, both surfaces were further exposed at an exposure amount of 400 $mJ/cm^2$ (i-line) and then post-baked at 145° C. for 25 minutes to cure the photosensitive composition layer, thereby forming a cured film.

In this way, a sample consisting of a cured film having a thickness of 10 m/a refractive index adjusting layer/COSMOSHINE A4300 (thickness: 50 m)/a refractive index adjusting layer/a cured film having a thickness of 10 μm was obtained. This was excellent in film uniformity, and the unevenness of the surface reflection was not observed, which was favorable.

Production of Transfer Film and Use Example 3 Thereof: Example 16

Using a slit-shaped nozzle, the photosensitive resin composition 1 prepared in Example 1 was applied onto a polyethylene terephthalate film (Lumirror 16KS40 (manufactured by Toray Industries, Inc.)) having a thickness of 16 μm so that the width was 1.0 μm and the average film thickness of the composition layer after drying was a thickness of 2.0 μm, and it was allowed to pass through, over 60 seconds, a drying zone of 3 m in which the temperature was set to 80° C. and the film surface wind speed was set to be 0.2 m/sec by adjusting the intake amount and the exhaust amount, thereby obtaining a laminate A of the temporary support and the photosensitive resin layer.

Next, a polyethylene terephthalate film having a thickness of 16 μm (Lumirror 16KS40 (manufactured by Toray Industries, Inc.)) was subjected to pressure bonding as a cover film to produce a transfer film (Example 16).

A copper layer having a thickness of 200 nm was provided on a polyethylene terephthalate (PET) film having a thickness of 100 μm by a sputtering method, and a PET substrate attached with a copper layer was prepared.

The prepared transfer film was wound forward and then laminated onto the PET substrate attached with a copper layer under laminating conditions of a laminating roll temperature of 100° C., a linear pressure of 1.0 MPa, and a linear speed of 4.0 m/min. At that time, the cover film was peeled off, and laminating was carried out so that the photosensitive resin layer in the transfer film was in contact with the copper layer. After exposure with an ultra-high pressure mercury lamp through a line-and-space pattern mask (Duty ratio 1:1, line width: 20 m) without peeling off the temporary support, the temporary support was peeled off and developed. Development was carried out using a 1.0% sodium carbonate aqueous solution at 25° C. for 30 seconds by shower development. In a case where a line-and-space pattern was formed according to the above method, good resolution was exhibited.

EXPLANATION OF REFERENCES

10: temporary support
12: thermoplastic resin layer
14: interlayer
16: negative tone photosensitive resin layer
18: cover film
100: transfer film

What is claimed is:

1. A composition comprising:

an alkali-soluble resin;

a polymerizable compound; and a compound A, wherein the compound A includes a high-molecular-weight compound which contains a constitutional unit derived from a monomer represented by General Formula (4A) and a constitutional unit derived from a monomer represented by General Formula (5), (4A)

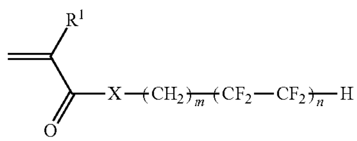

in General formula (4A), $R^1$ represents a hydrogen atom or a methyl group, X represents an oxygen atom, a sulfur atom, or —N($R^2$)—, m represents an integer of 1 to 6, n represents an integer of 2 to 6, and $R^2$ represents a hydrogen atom or an alkyl group having 1 to 4 carbon atoms, (5)

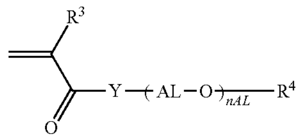

in General formula (5), $R^3$ represents a hydrogen atom or a methyl group, Y represents an oxygen atom, a sulfur atom, or —N($R^5$)—, AL represents an alkylene group which may have a substituent, nAL represents an integer of 2 or more, $R^4$ represents a hydrogen atom or a substituent, and $R^5$ represents a hydrogen atom or an alkyl group having 1 to 4 carbon atoms.

2. The composition according to claim 1, wherein the compound A is a high-molecular-weight compound having a weight-average molecular weight of 5,000 or more.

3. The composition according to claim 1, further comprising a polymerization initiator.

4. The composition according to claim 1, wherein the alkali-soluble resin is a thermoplastic resin.

5. The composition according to claim 1, further comprising black particles.

6. A transfer film comprising:

a temporary support; and one or more composition layers, wherein at least one layer of the composition layer is a layer formed of the composition according to claim 1.

7. A manufacturing method for a laminate, comprising:

an affixing step of bringing a substrate into contact with a surface of the transfer film according to claim 6 on a side opposite to the temporary support and affixing the transfer film to the substrate to obtain a transfer film-attached substrate;

an exposure step of subjecting the composition layer to pattern exposure;

a development step of developing the exposed composition layer to form a resin pattern; and a peeling step of peeling the temporary support from the transfer film-attached substrate between the affixing step and the exposure step, or between the exposure step and the development step.

8. A manufacturing method for a circuit wire, comprising:

an affixing step of bringing a surface of the transfer film according to claim 6 on a side opposite to the temporary support into contact with a substrate having a conductive layer and affixing the transfer film to the substrate having the conductive layer to obtain a transfer film-attached substrate;

an exposure step of subjecting the composition layer to pattern exposure;

a development step of developing the exposed composition layer to form a resin pattern;

an etching step of subjecting the conductive layer in a region where the resin pattern is not disposed to an etching treatment; and a peeling step of peeling the temporary support from the transfer film-attached substrate between the affixing step and the exposure step, or between the exposure step and the development step.

9. A manufacturing method for an electronic device, comprising:

the manufacturing method for a laminate according to claim 7, wherein the electronic device includes the resin pattern as a cured film.

10. The composition according to claim 1, wherein in General formula (4A), n represents 2 or 3.

* * * * *